US012647992B2

(12) United States Patent     (10) Patent No.:   US 12,647,992 B2

Yi et al.     (45) Date of Patent:    Jun. 2, 2026

(54) REPETITION OF A TRANSPORT BLOCK VIA A PLURALITY OF CARRIERS

(71) Applicant: Ofinno, LLC, Reston, VA (US)

(72) Inventors: Yunjung Yi, Vienna, VA (US); Esmael Hejazi Dinan, McLean, VA (US); Ali Cagatay Cirik, Chantilly, VA (US); Hua Zhou, Vienna, VA (US); Bing Hui, Herndon, VA (US); Hyukjin Chae, San Diego, CA (US); Nazanin Rastegardoost, McLean, VA (US); Hyoungsuk Jeon, Centreville, VA (US)

(73) Assignee: Ofinno, LLC, Reston, VA (US)

( * ) Notice: Subject to any disclaimer, the term of this patent is extended or adjusted under 35 U.S.C. 154(b) by 643 days.

(21) Appl. No.: 18/054,683

(22) Filed: Nov. 11, 2022

(65) Prior Publication Data

US 2023/0074086 A1     Mar. 9, 2023

Related U.S. Application Data

(63) Continuation of application No. PCT/US2021/031907, filed on May 12, 2021.

(60) Provisional application No. 63/024,797, filed on May 14, 2020.

(51) Int. Cl.
| | |
|---|---|
| *H04W 72/23* | (2023.01) |
| *H04L 5/00* | (2006.01) |
| *H04W 72/0446* | (2023.01) |
| *H04W 72/0453* | (2023.01) |

(52) U.S. Cl.
CPC ........... *H04W 72/23* (2023.01); *H04L 5/0051* (2013.01); *H04W 72/0446* (2013.01); *H04W 72/0453* (2013.01)

(58) Field of Classification Search
CPC ............. H04W 72/23; H04W 72/0446; H04W 72/0453; H04L 5/0051
See application file for complete search history.

(56) References Cited

U.S. PATENT DOCUMENTS

| | | |
|---|---|---|
| 9,295,043 B2 | 3/2016 | Papasakellariou et al. |
| 2018/0123769 A1 | 5/2018 | Pelletier et al. |
| 2019/0253200 A1 | 8/2019 | Salem et al. |

(Continued)

FOREIGN PATENT DOCUMENTS

| | | |
|---|---|---|
| WO | 2019/138521 A1 | 7/2019 |
| WO | 2020/033647 A1 | 2/2020 |

OTHER PUBLICATIONS

3GPP TR 36.824 V11.0.0 (Jun. 2012); Technical Report; 3rd Generation Partnership Project; Technical Specification Group Radio Access Network; Evolved Universal Terrestrial Radio Access (E-UTRA); LTE coverage enhancements; (Release 11).

(Continued)

*Primary Examiner* — Elton Williams

(74) *Attorney, Agent, or Firm* — Patrick Moon; Kavon Nasabzadeh; Jacob L. Mangan

(57) ABSTRACT

A wireless device determines a size of a resource allocation field based on a first bandwidth part of a first uplink carrier and a second bandwidth part of a second uplink carrier. The wireless device receives a downlink control information (DCI) comprising the resource allocation field indicating resources of the first uplink carrier and the second uplink carrier. The wireless device transmits one or more uplink signals via the resources.

16 Claims, 29 Drawing Sheets

(56) References Cited

U.S. PATENT DOCUMENTS

| | | | | | |
|---|---|---|---|---|---|
| 2019/0296956 | A1* | 9/2019 | John Wilson | ......... | H04W 28/20 |
| 2020/0296758 | A1* | 9/2020 | Li | ........................... | H04L 5/001 |
| 2020/0358586 | A1* | 11/2020 | Takeda | .............. | H04W 72/0453 |
| 2022/0150924 | A1* | 5/2022 | Gao | .................. | H04W 72/1268 |

OTHER PUBLICATIONS

3GPP TS 38.211 V15.4.0 (Dec. 2018); Technical Specification; 3rd Generation Partnership Project; Technical Specification Group Radio Access Network; NR; Physical channels and modulation; (Release 15).

3GPP TS 38.213 V16.0.0 (Dec. 2019); Technical Specification; 3rd Generation Partnership Project; Technical Specification Group Radio Access Network; NR; Physical layer procedures for control (Release 16).

3GPP TS 38.212 V16.01.0 (20192020-1203); Technical Specification; 3rd Generation Partnership Project; Technical Specification Group Radio Access Network; NR; Multiplexing and channel coding; (Release 16).

3GPP TS 38.214 V16.01.0 (20192020-1203); Technical Specification; 3rd Generation Partnership Project; Technical Specification Group Radio Access Network; NR; Physical layer procedures for data; (Release 16).

3GPP TS 38.331 V16.0.0 (Mar. 2020); Technical Specification; 3rd Generation Partnership Project; Technical Specification Group Radio Access Network; NR; Radio Resource Control (RRC) protocol specification; (Release 16).

RP-191761; 3GPP TSG-RAN Meeting #85; Newport Beach, USA, Sep. 16-20, 2019; Title: Further views on Rel-17 coverage enhancements work area; Source: Huawei, HiSilicon; Agenda item: 8.1.5; Document for: Discussion.

RP-191886; 3GPP TSG RAN Meeting #85; Newport Beach, USA, Sep. 16-19, 2019; Agenda item: 8.1.5; Source: China Telecom (Email discussion moderator); Title: Summary of email discussion on NR coverage enhancement; Document for: Discussion.

RP-191887; 3GPP TSG RAN Meeting #85; Newport Beach, USA, Sep. 16-20, 2019; Source: China Telecom, [Samsung]; Title: New SID on NR coverage enhancement; Document for: Discussion; Agenda Item: 8.1.5.

RP-192562; 3GPP TSG RAN Meeting #86; Sitges, Spain, Dec. 9-12, 2019; Agenda item: 9.1.1; Source: China Telecom (Email discussion moderator); Title: Summary of Phase 2 email discussion on NR coverage enhancement; Document for. Discussion.

RP-192564; 3GPP TSG RAN Meeting #86; Sitges, Spain, Dec. 9-12, 2019; Source: China Telecom, [Samsung]; Title: New SID on NR coverage enhancement; Document for: Approval; Agenda Item: 9.1.1.

RP-192831; 3GPP TSG RAN Meeting #86; Sitges, Spain, Dec. 9-12, 2019; Source: Ericsson; Title: Discussion on NR coverage enhancements in Rel 17; Agenda Item: 9.1.1; Document for: Discussion.

RP-192901; 3GPP TSG RAN Meeting #86; Sitges, Spain, Dec. 9-12, 2019; Title: Motivation paper and first results on Rel.17 Coverage Enhancements; Source: Nomor Research GmbH, Facebook; Type: Discussion; Document for. Decision; Agenda Item: 9.1.1—Proposals led by RAN1.

RP-192977; 3GPP TSG RAN Meeting #86; Sitges, Spain, Dec. 9-12, 2019; Source: ZTE, Sanechips; Title: Views on coverage enhancements in Rel-17; Agenda Item: 9.1.1; Document for: Discussion and Decision.

RP-193080; 3GPP TSG RAN Meeting #86; Sitges, Spain, Dec. 9-12, 2019; Title: Motivation paper and first results on Rel.17 Coverage Enhancements; Source: Nomor Research GmbH, Facebook , Reliance Jio, Saankhya Labs, IITH, IITM, CeWIT, Tejas Networks, Radisys.; Type: Discussion; Document for: Decision; Agenda Item: 9.1.1—Proposals led by RAN1.

RP-193147; 3GPP TSG RAN Meeting #86; Sitges, Spain, Dec. 9-12, 2019; Source: China Telecom, Samsung; Title: New SID on NR coverage enhancement; Document for: Approval; Agenda Item: 9.1.1.

RP-193240; 3GPP TSG RAN Meeting #86; Sitges, Spain, Dec. 9-12, 2019; Source: China Telecom; Title: New SID on NR coverage enhancement; Document for: Approval; Agenda Item: 9.1.1.

RP-191900; 3GPP TSG RAN Meeting #85; Newport Beach, USA, Sep. 16-20, 2019; Agenda item: 8.1.5; Title: Views on NR coverage enhancements; Source: Vivo.

RP-192064; 3GPP TSG RAN#85; Newport Beach, USA; Sep. 16-20, 2019; A.I. 8.1.5; Title: Rel-17 Considerations on Coverage Enhancements; Source: MediaTek Inc.

RP-192543; 3GPP TSG-RAN Wg Meeting #86; Sitges, Spain, Dec. 9-12, 2019; Title: Views on NR coverage enhancements in Rel-17; Source: Vivo.

International Search Report and Written Opinion of the International Searching Authority mailed Oct. 15, 2021 in International Application No. PCT/US2021/031907.

* cited by examiner

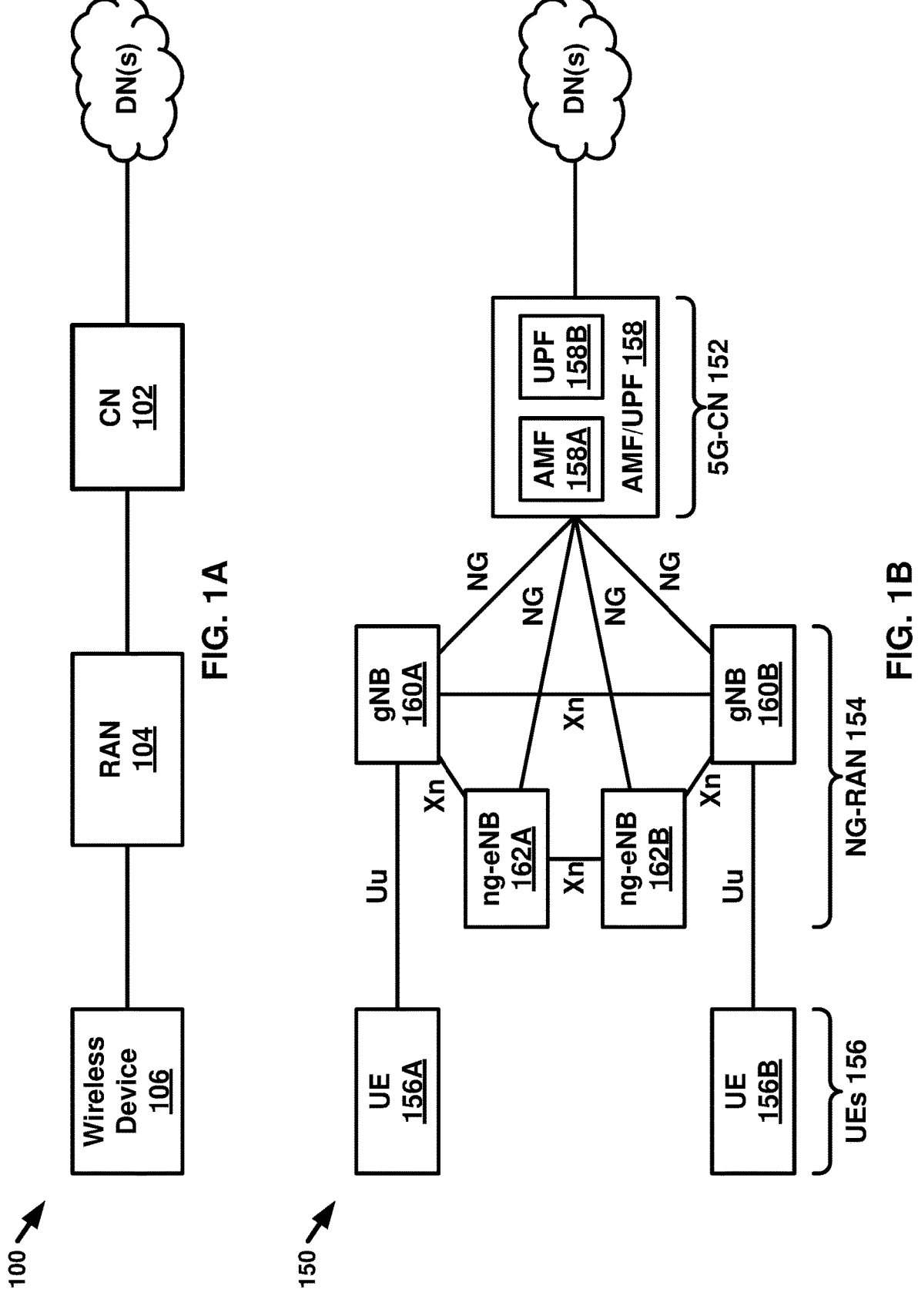

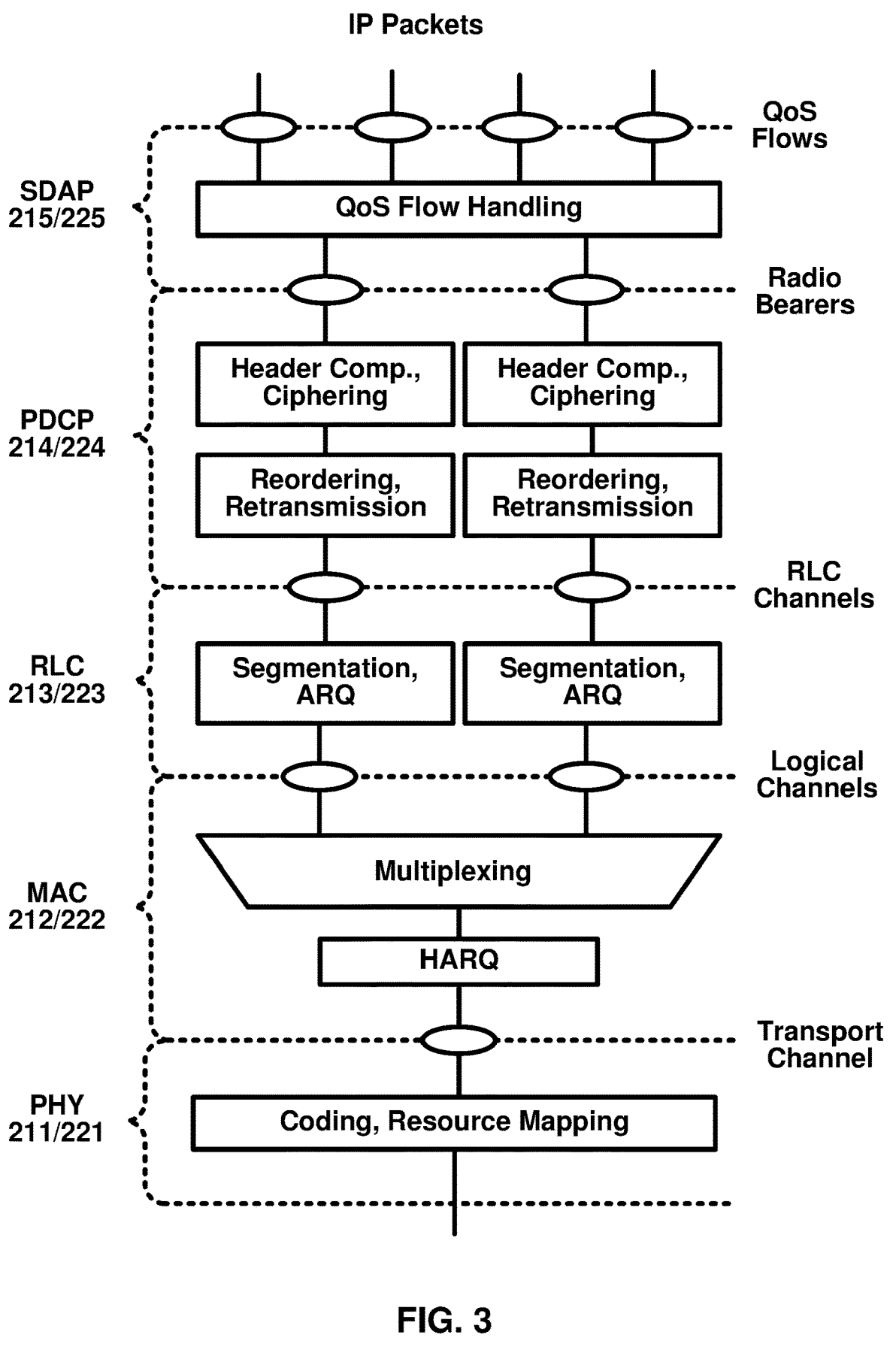

IP Packets

QoS
Flows

SDAP
215/225

QoS Flow Handling

Radio
Bearers

PDCP
214/224

| Header Comp., Ciphering | Header Comp., Ciphering |

| Reordering, Retransmission | Reordering, Retransmission |

RLC
Channels

RLC
213/223

| Segmentation, ARQ | Segmentation, ARQ |

Logical
Channels

Multiplexing

MAC
212/222

HARQ

Transport
Channel

PHY
211/221

Coding, Resource Mapping

FIG. 3

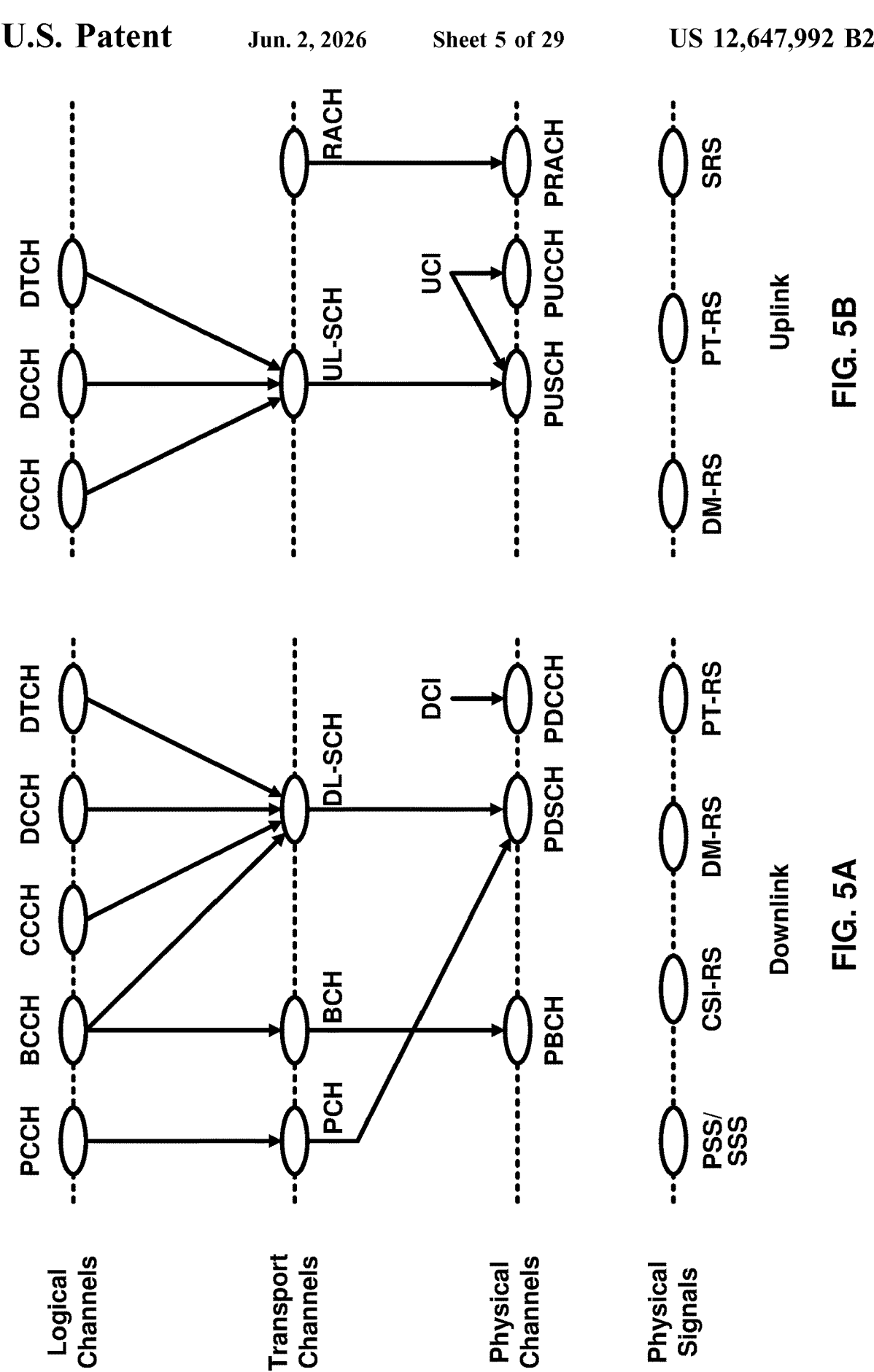

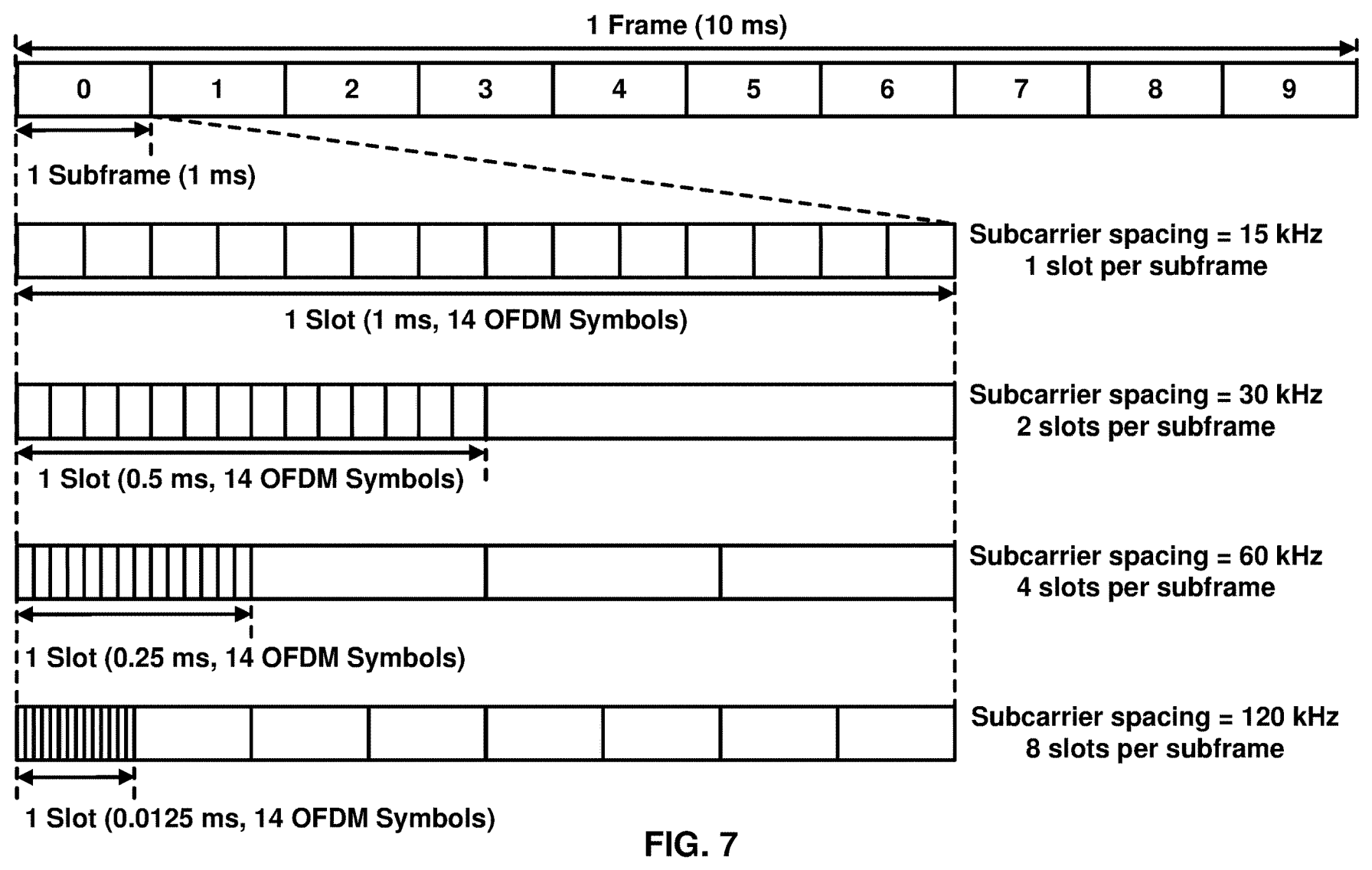

1 Frame (10 ms)

| 0 | 1 | 2 | 3 | 4 | 5 | 6 | 7 | 8 | 9 |

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

BS

Configuration 1330

Preamble 1341

Msg A 1331

1342 Transport block

Msg B 1332

UE

BS

Configuration 1320

Msg 1 1321

Msg 2 1322

UE

BS

Configuration 1310

Msg 1 1311

Msg 2 1312

Msg 3 1313

Msg 4 1314

UE

| DL/UL | Carrier indicator | UL/SUL | BWP index | Frequency domain RA |
|---|---|---|---|---|

| Frequency domain RA |
|---|

| Time domain RA | FH | MCS | NDI |
|---|---|---|---|

| HARQ process # | 1st DAI | 2nd DAI |
|---|---|---|

| RV | SRI | PMI | Antenna ports |
|---|---|---|---|

| TPC | | | |
|---|---|---|---|

| SRS request | CSI request | CBGTI | PTRS |
|---|---|---|---|

| Beta offset | DMRS | UL-SCH | Open loop power | Priority | Invalid OS | Scell dormancy |
|---|---|---|---|---|---|---|

FIG. 17

Non-simultaneous Transmission
(e.g., RV = 0 in UL#1, RV = 2, 3 in UL#2)

UL Carrier/ Panel #1

UL Carrier/ Panel #2

PUSCH carrying TB

TB

Simultaneous Transmission
(e.g., RV of TB = 0 in UL#1, RV of TB = 2, 3 in UL#2)

UL Carrier/ Panel #1

UL Carrier/ Panel #2

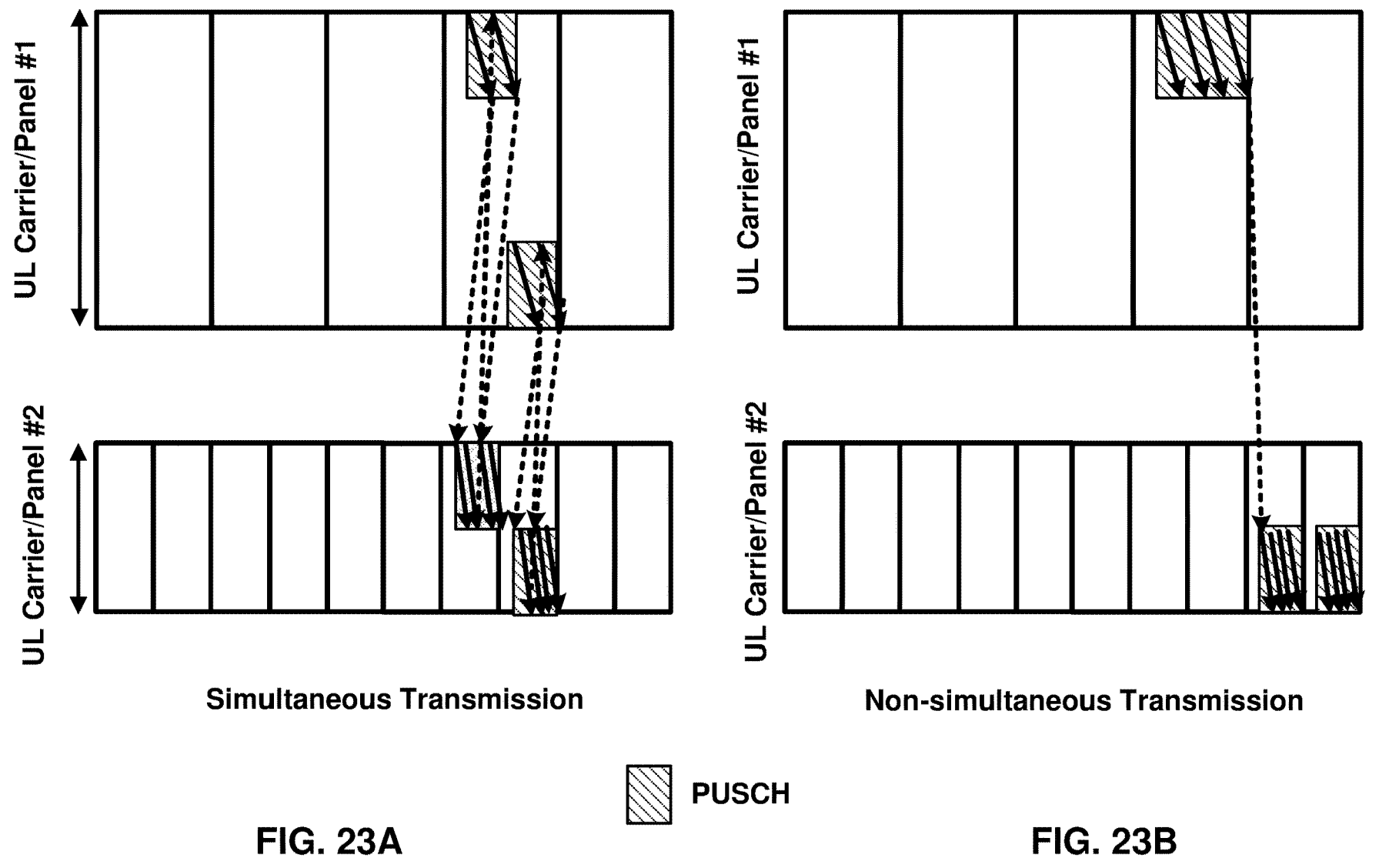

UL Carrier/Panel #1

UL Carrier/Panel #2

Non-simultaneous Transmission

FIG. 23B

PUSCH

UL Carrier/Panel #1

UL Carrier/Panel #2

Simultaneous Transmission

| $rv_{id}$ indicated by the DCI scheduling the PUSCH | $rv_{id}$ to be applied to $n^{th}$ transmission occasion | | | |
|---|---|---|---|---|
| | $n \bmod 4 = 0$ | $n \bmod 4 = 1$ | $n \bmod 4 = 2$ | $n \bmod 4 = 3$ |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

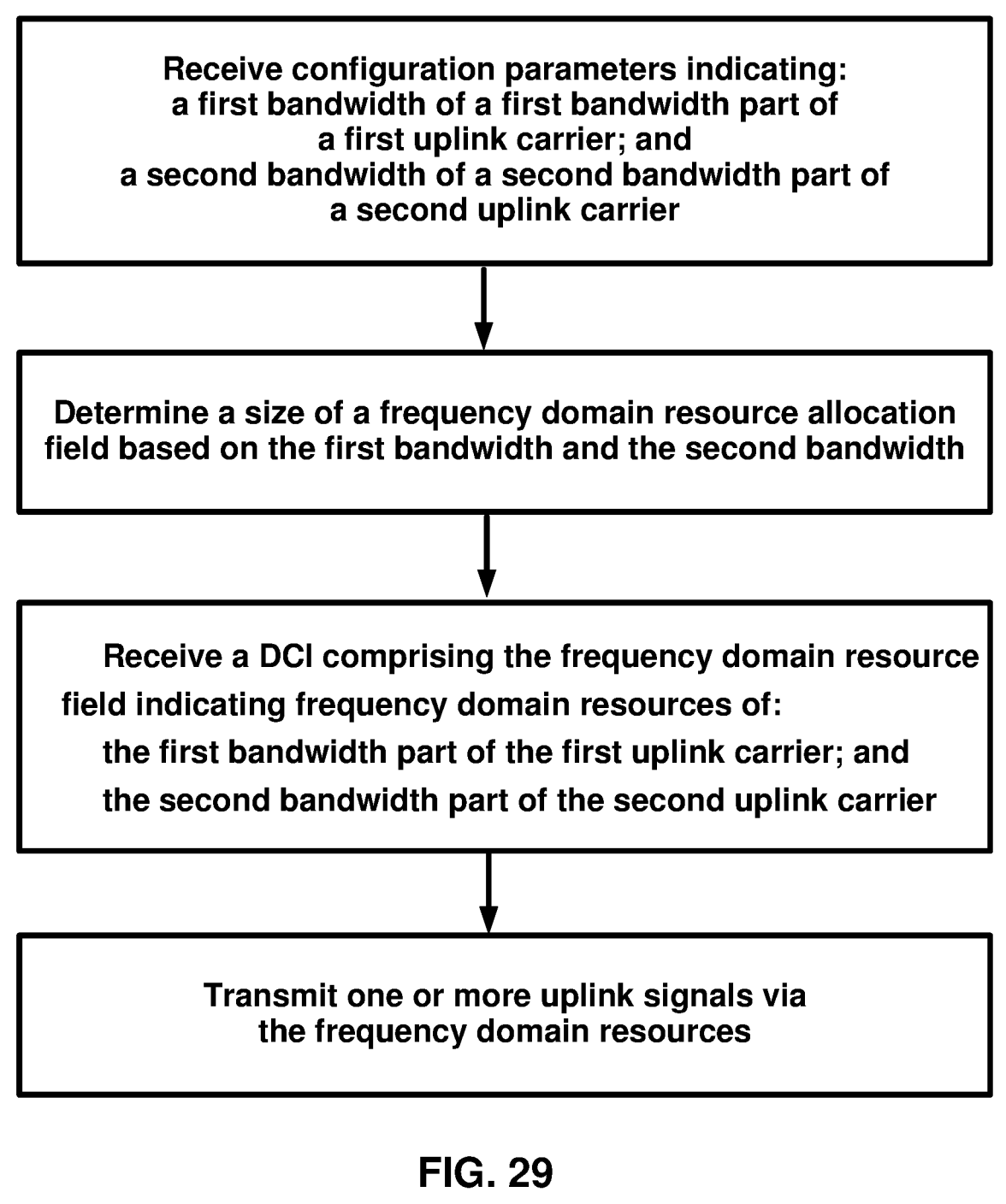

Receive configuration parameters indicating:
a first bandwidth of a first bandwidth part of
a first uplink carrier; and
a second bandwidth of a second bandwidth part of
a second uplink carrier Determine a size of a frequency domain resource allocation
field based on the first bandwidth and the second bandwidth Receive a DCI comprising the frequency domain resource
field indicating frequency domain resources of:
    the first bandwidth part of the first uplink carrier; and
    the second bandwidth part of the second uplink carrier Transmit one or more uplink signals via
the frequency domain resources

FIG. 29

REPETITION OF A TRANSPORT BLOCK VIA A PLURALITY OF CARRIERS

CROSS-REFERENCE TO RELATED APPLICATIONS

This application claims the benefit of International Application No. PCT/US2021/031907, filed May 12, 2021, which claims the benefit of U.S. Provisional Application No. 63/024,797, filed May 14, 2020, all of which are hereby incorporated by reference in their entireties

BRIEF DESCRIPTION OF THE DRAWINGS

Examples of several of the various embodiments of the present disclosure are described herein with reference to the drawings.

FIG. 1A and FIG. 1B illustrate example mobile communication networks in which embodiments of the present disclosure may be implemented.

FIG. 3 illustrates an example of services provided between protocol layers of the NR user plane protocol stack of FIG. 2A.

FIG. 5A and FIG. 5B respectively illustrate a mapping between logical channels, transport channels, and physical channels for the downlink and uplink.

FIG. 7 illustrates an example configuration of an NR frame into which OFDM symbols are grouped.

FIG. 17 illustrates an example of one or more DCI fields of a DCI format 0_1.

FIG. 23A illustrates an example of a RV mapping over a plurality of carriers as per an aspect of an embodiment of the present disclosure.

FIG. 23B illustrates an example of a RV over a plurality of carriers as per an aspect of an embodiment of the present disclosure.

FIG. 26 illustrates an example of a TDRA-table applied for a plurality of carriers as per an aspect of an embodiment of the present disclosure.

FIG. 29 illustrates a flow diagram as per an aspect of an embodiment of the present disclosure.

DETAILED DESCRIPTION

Figure 2A:
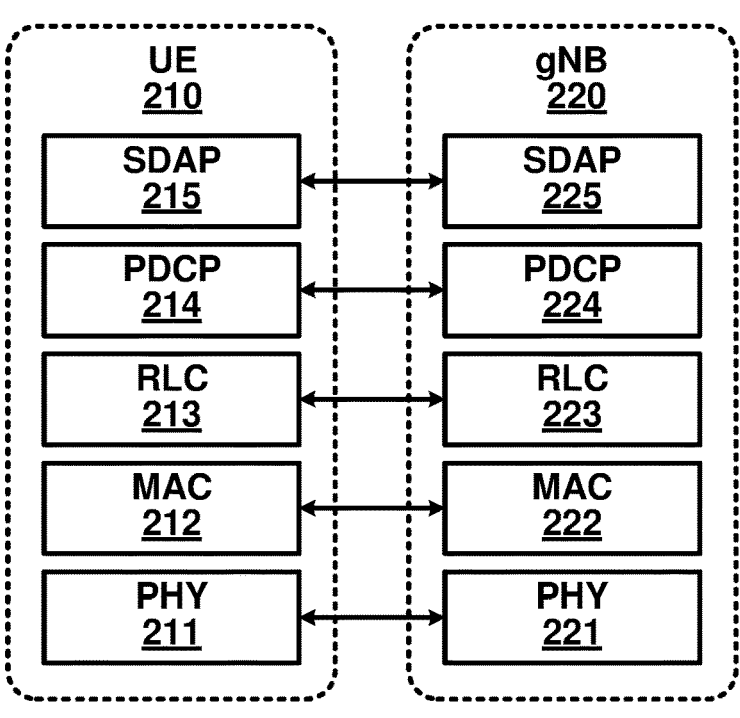
FIG. 2A and FIG. 2B respectively illustrate a New Radio (NR) user plane and control plane protocol stack.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2B:
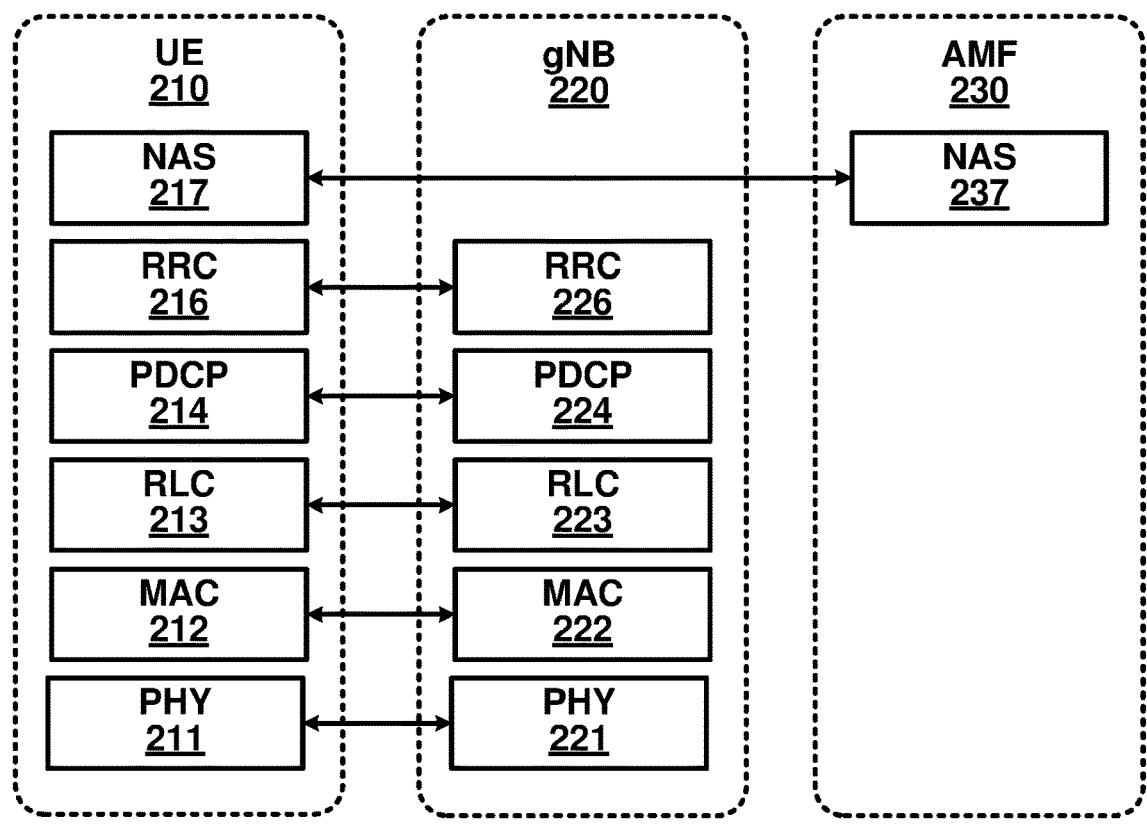

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
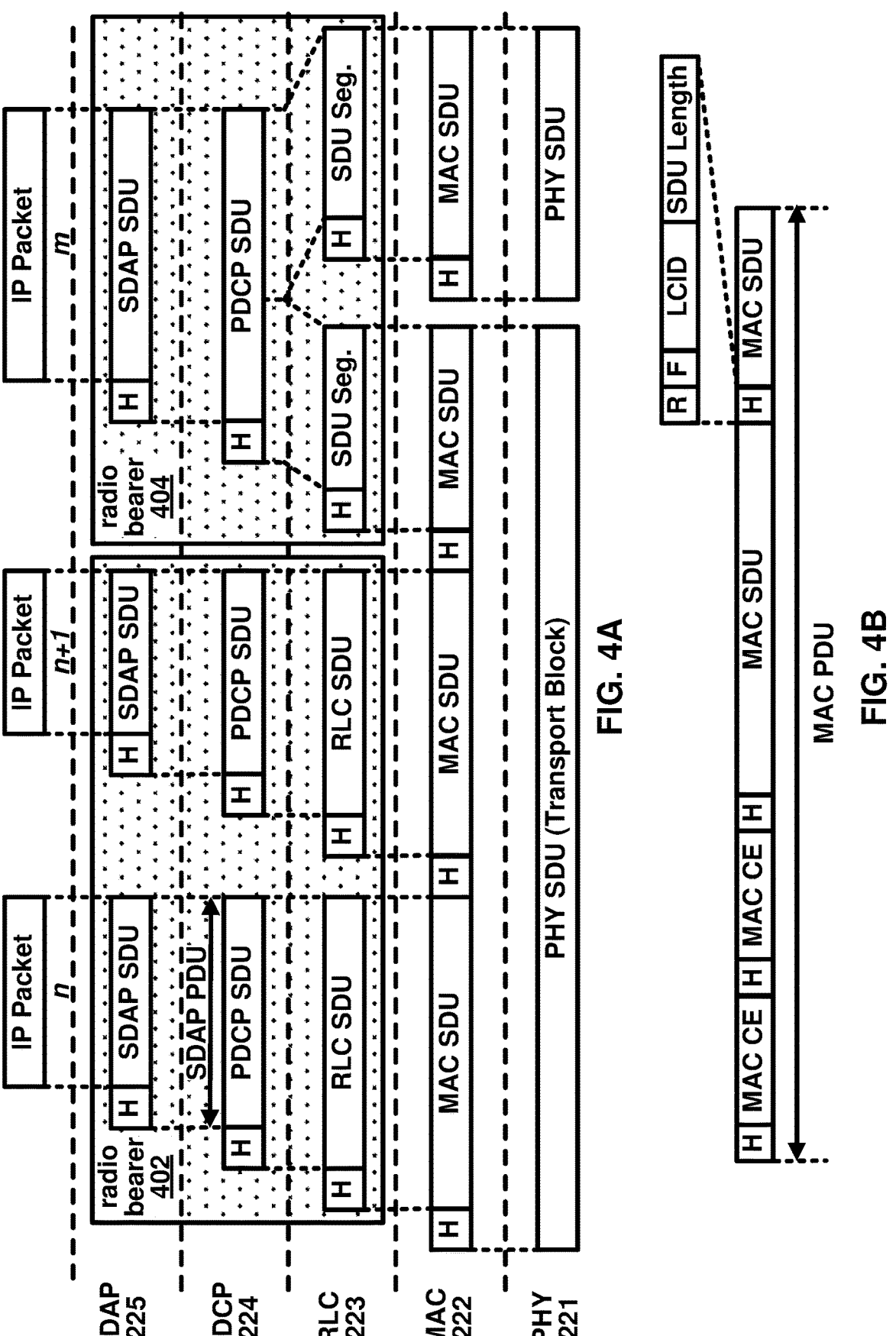
FIG. 4A illustrates an example downlink data flow through the NR user plane protocol stack of FIG. 2A.
FIG. 4B illustrates an example format of a MAC sub-header in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG.

4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
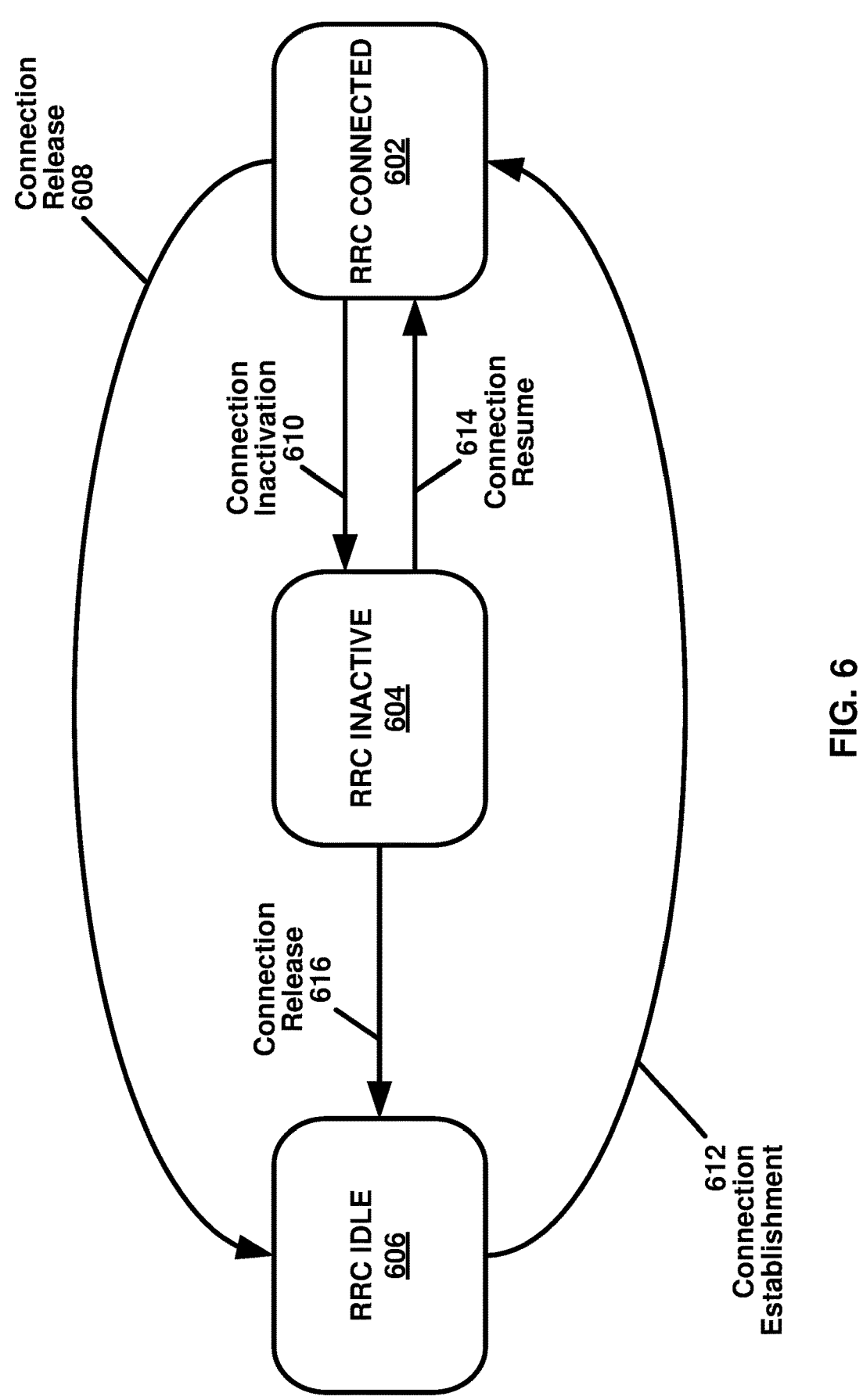
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
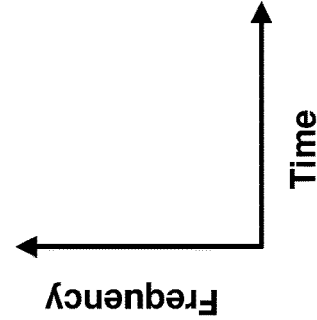
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORE-SETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
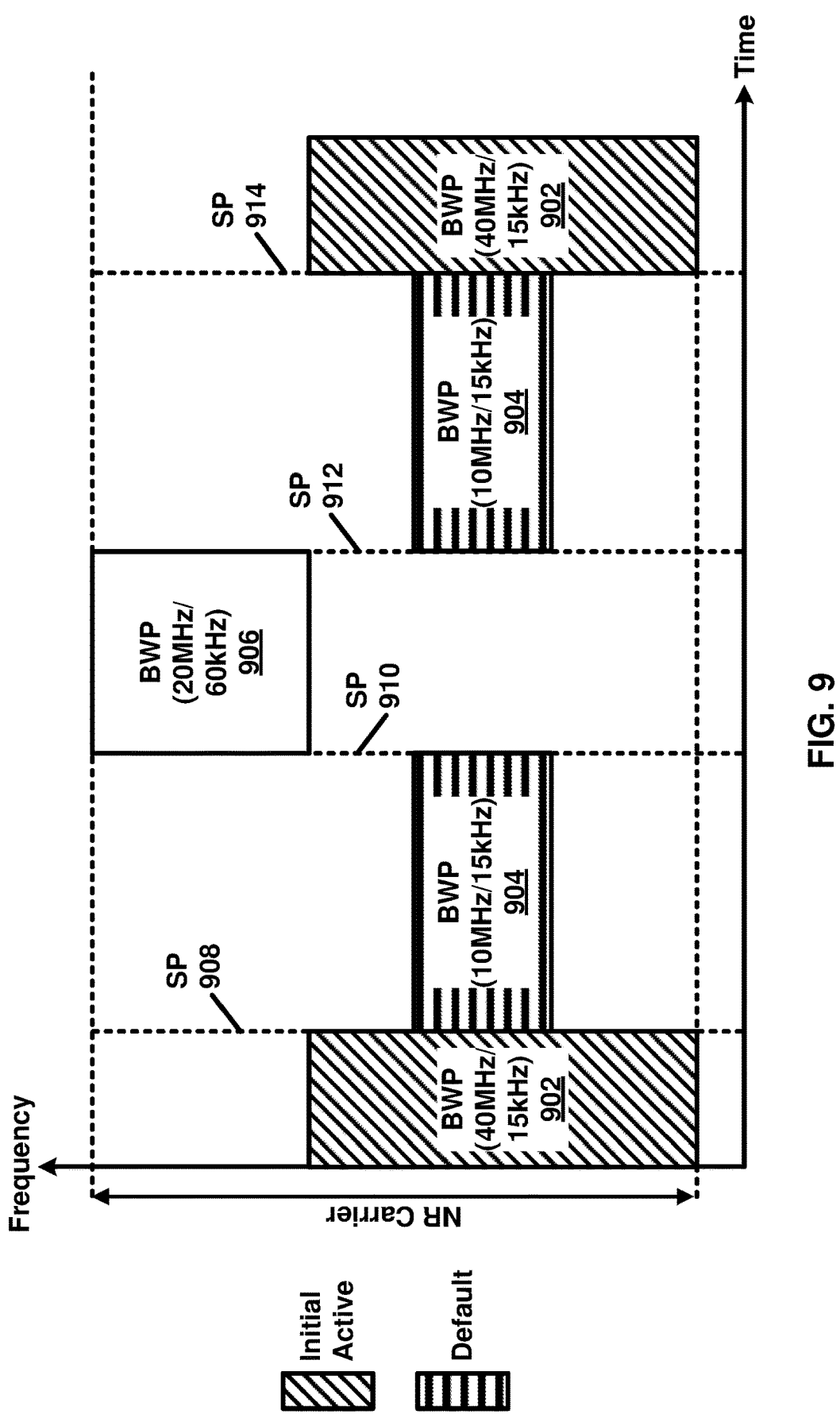
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
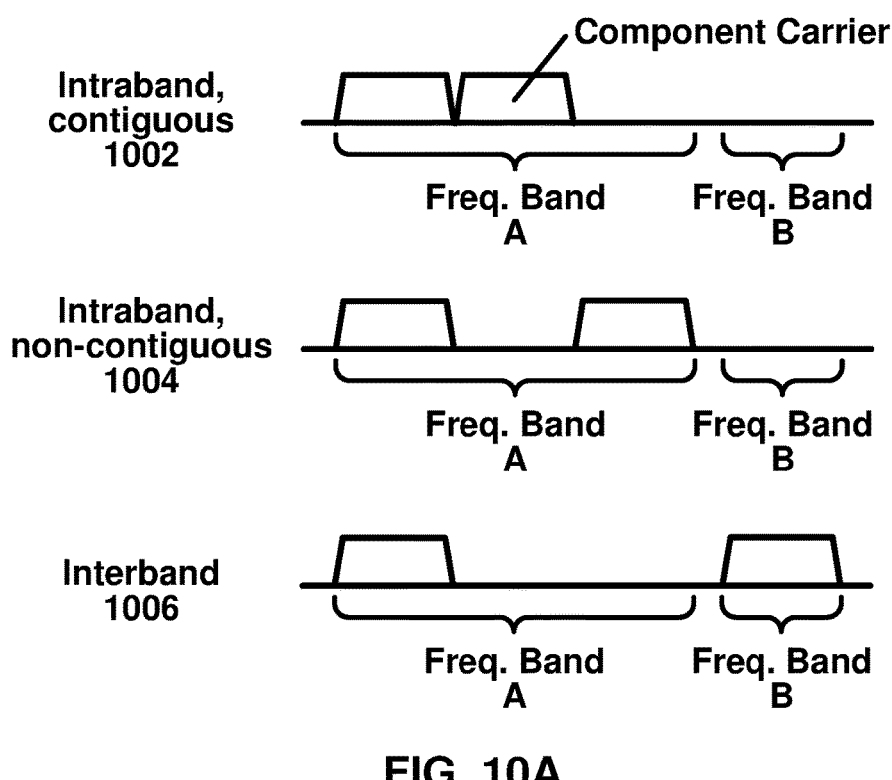
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
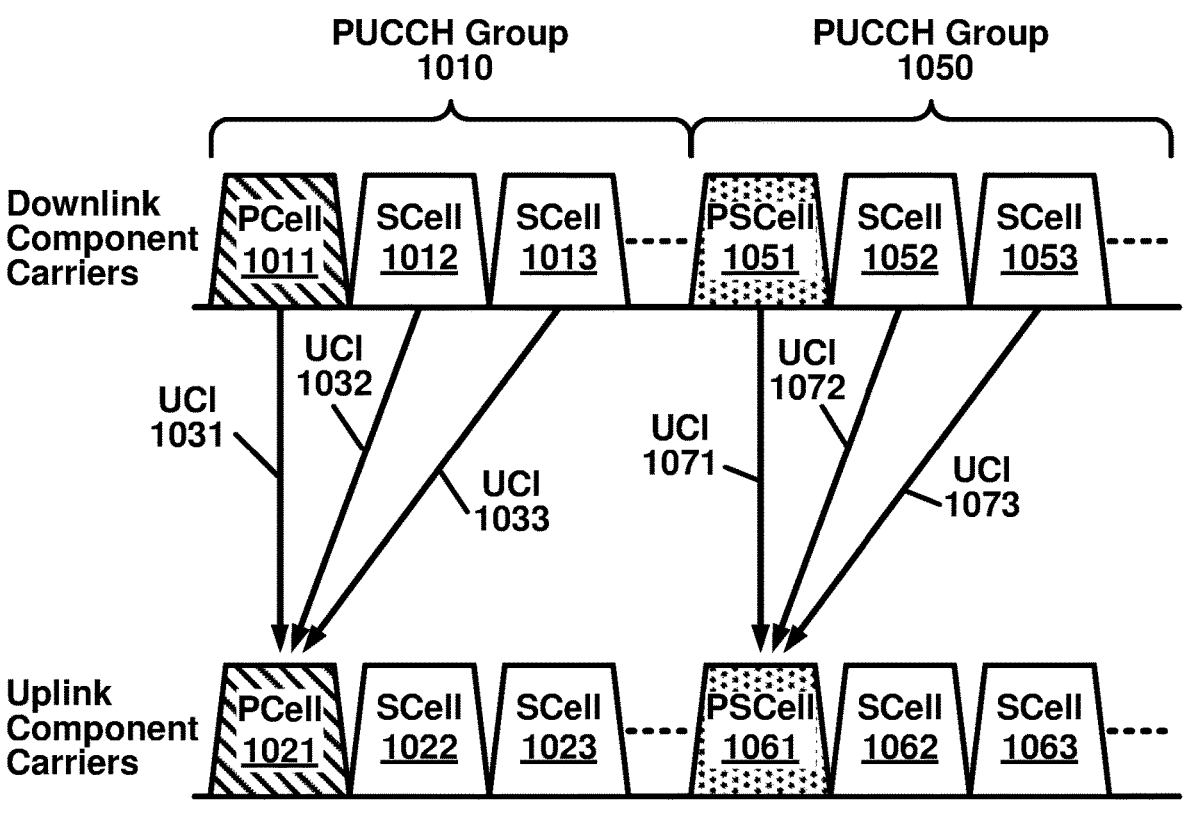
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
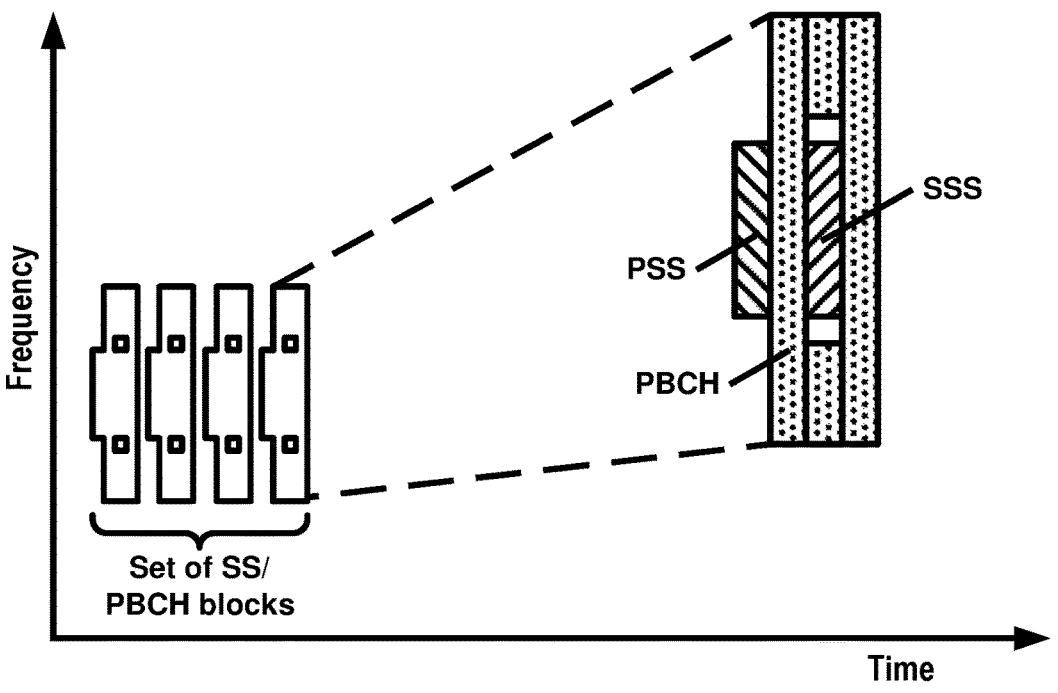
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
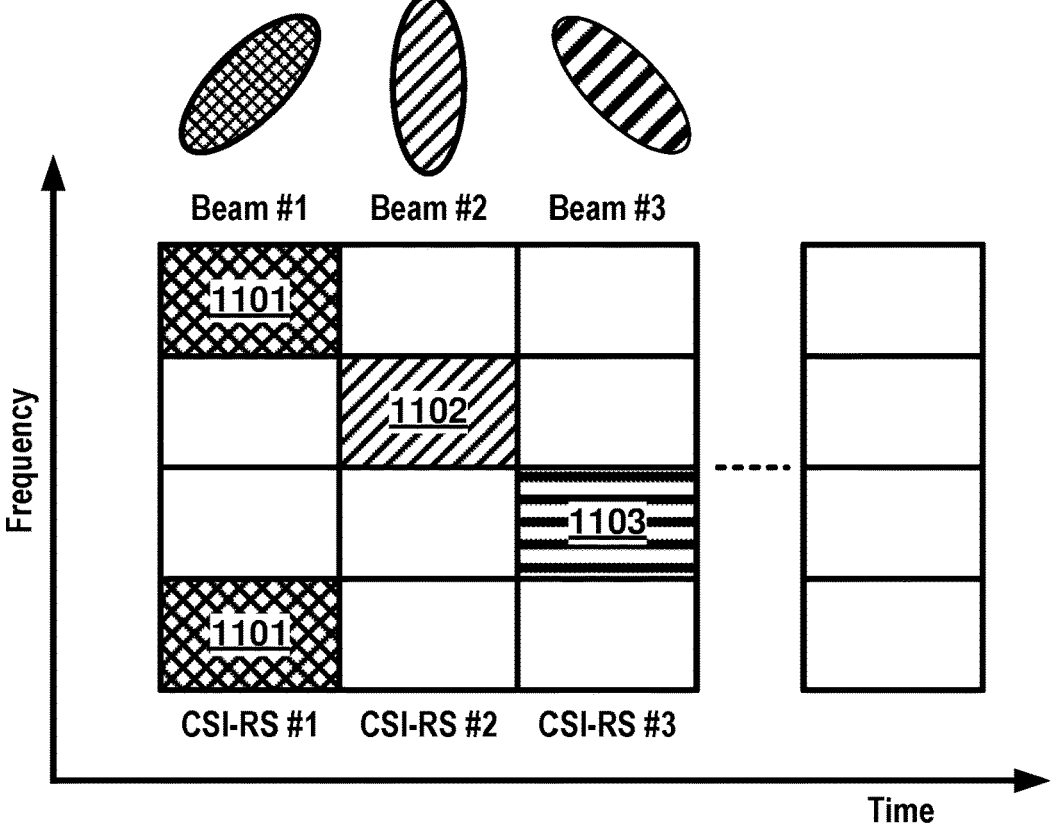
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figures 12A, 12B:
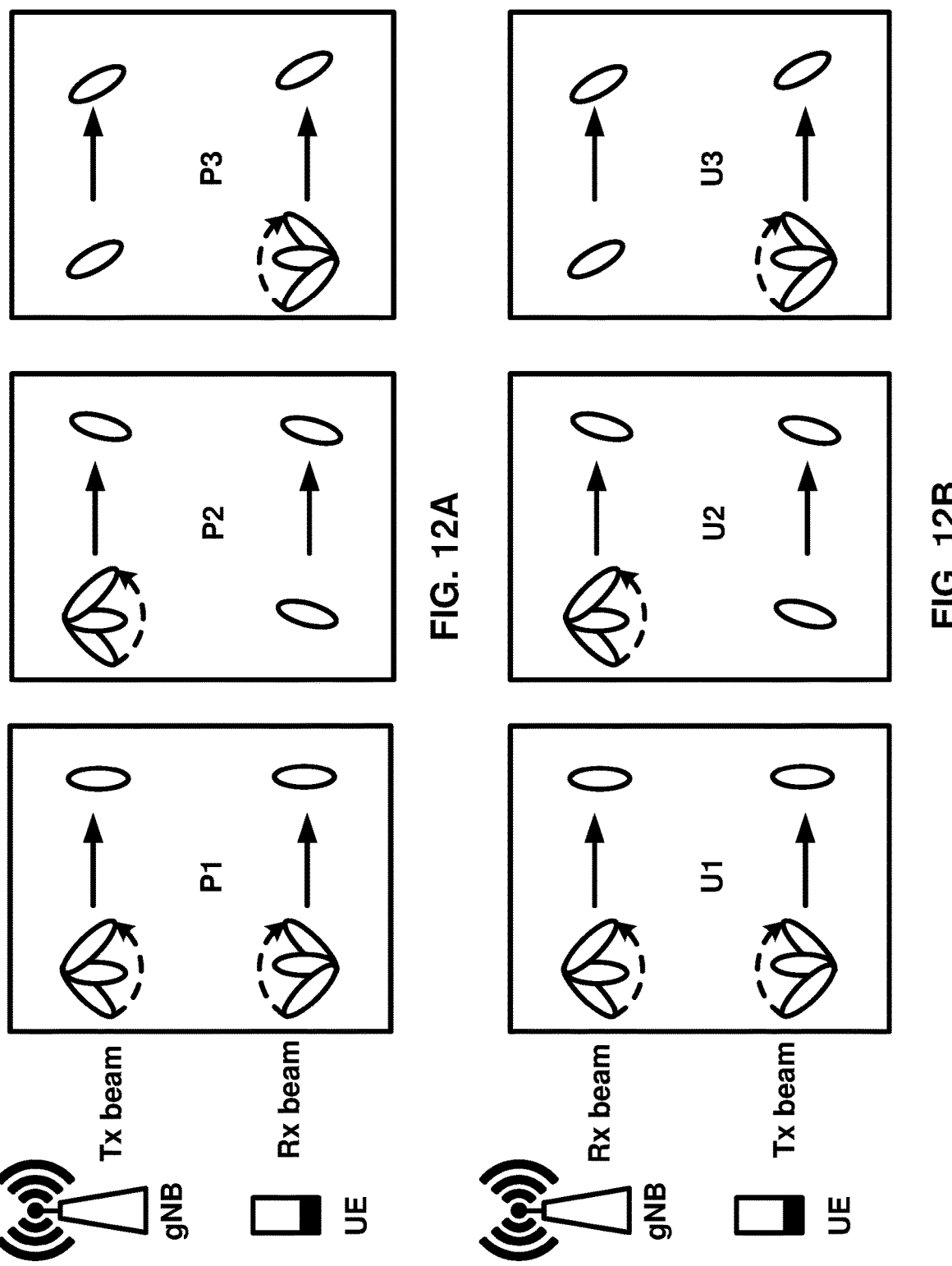
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beam-forming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beam-forming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figures 13A, 13B, 13C:
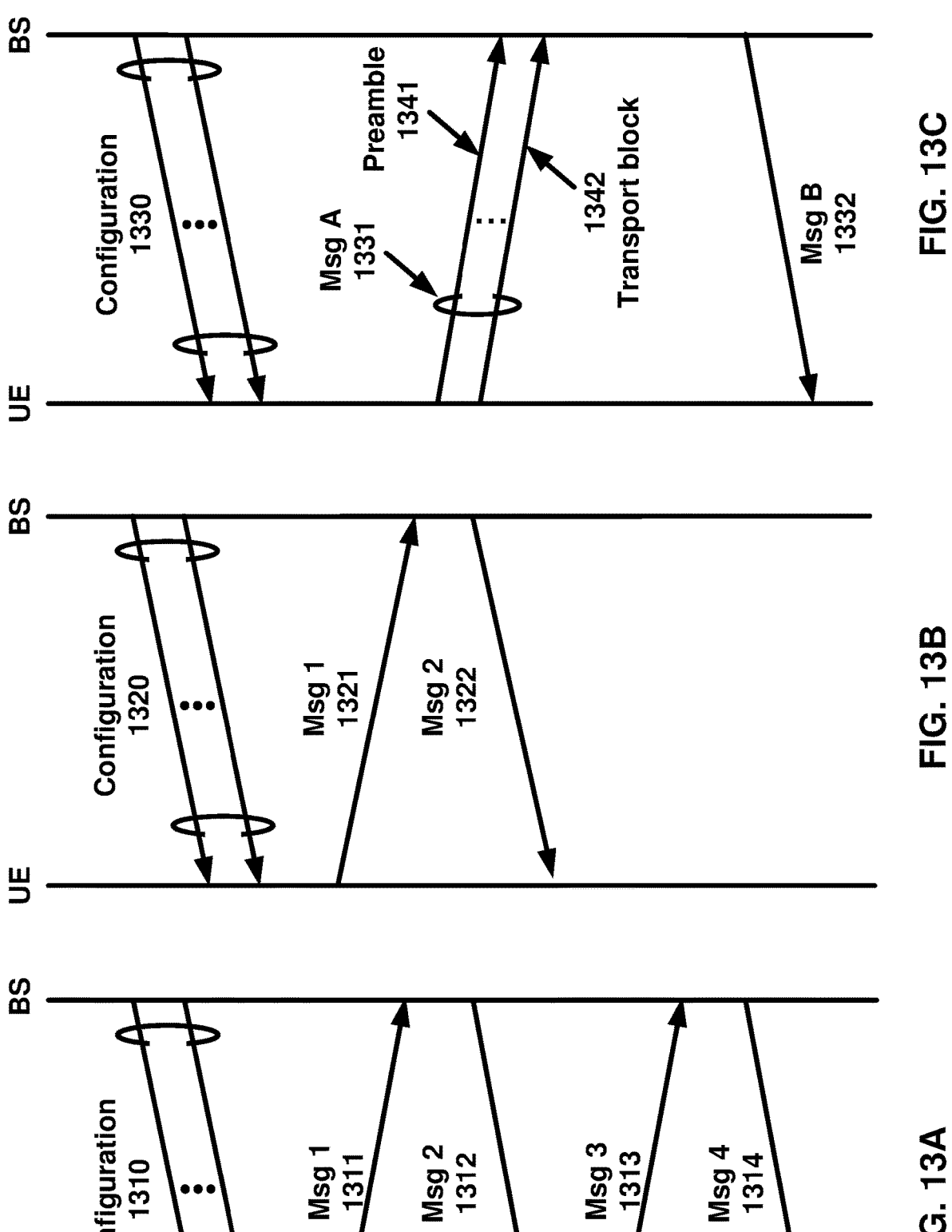
FIG. 13A, FIG. 13B, and FIG. 13C respectively illustrate a four-step contention-based random access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_I-NACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI=1+s\_id+14\times t\_id+14\times 80\times f\_id+14\times 80\times 8\times ul\_carrier\_id,$$

where s_id may be an index of a first OFDM symbol of the PRACH occasion (e.g., $0 \le s\_id < 14$), t_id may be an index of a first slot of the PRACH occasion in a system frame (e.g., $0 \le t\_id < 80$), fid may be an index of the PRACH occasion in the frequency domain (e.g., $0 \le f\_id < 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
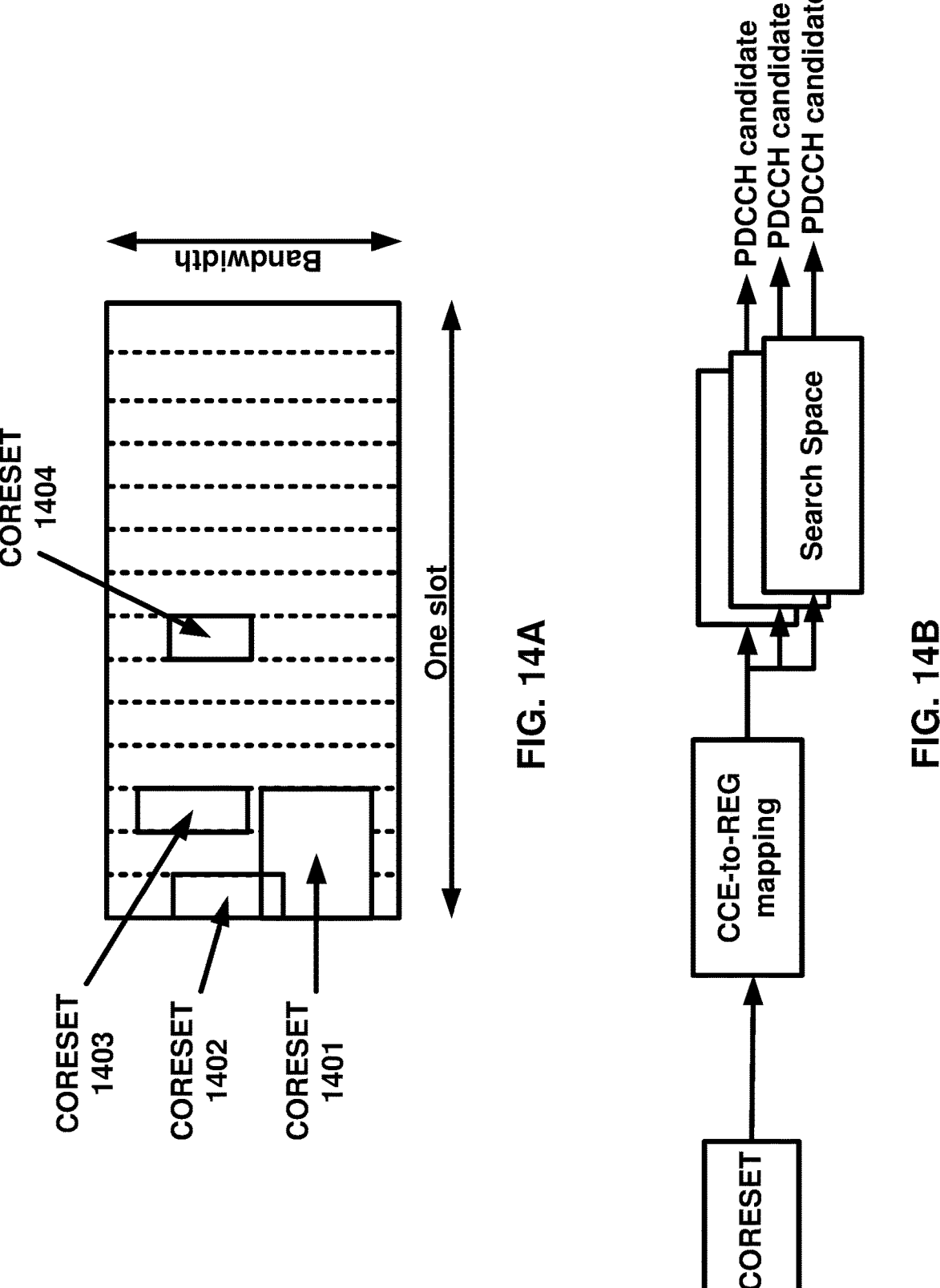
FIG. 14A illustrates an example of CORESET configurations for a bandwidth part.
FIG. 14B illustrates an example of a CCE-to-REG mapping for DCI transmission on a CORESET and PDCCH processing.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
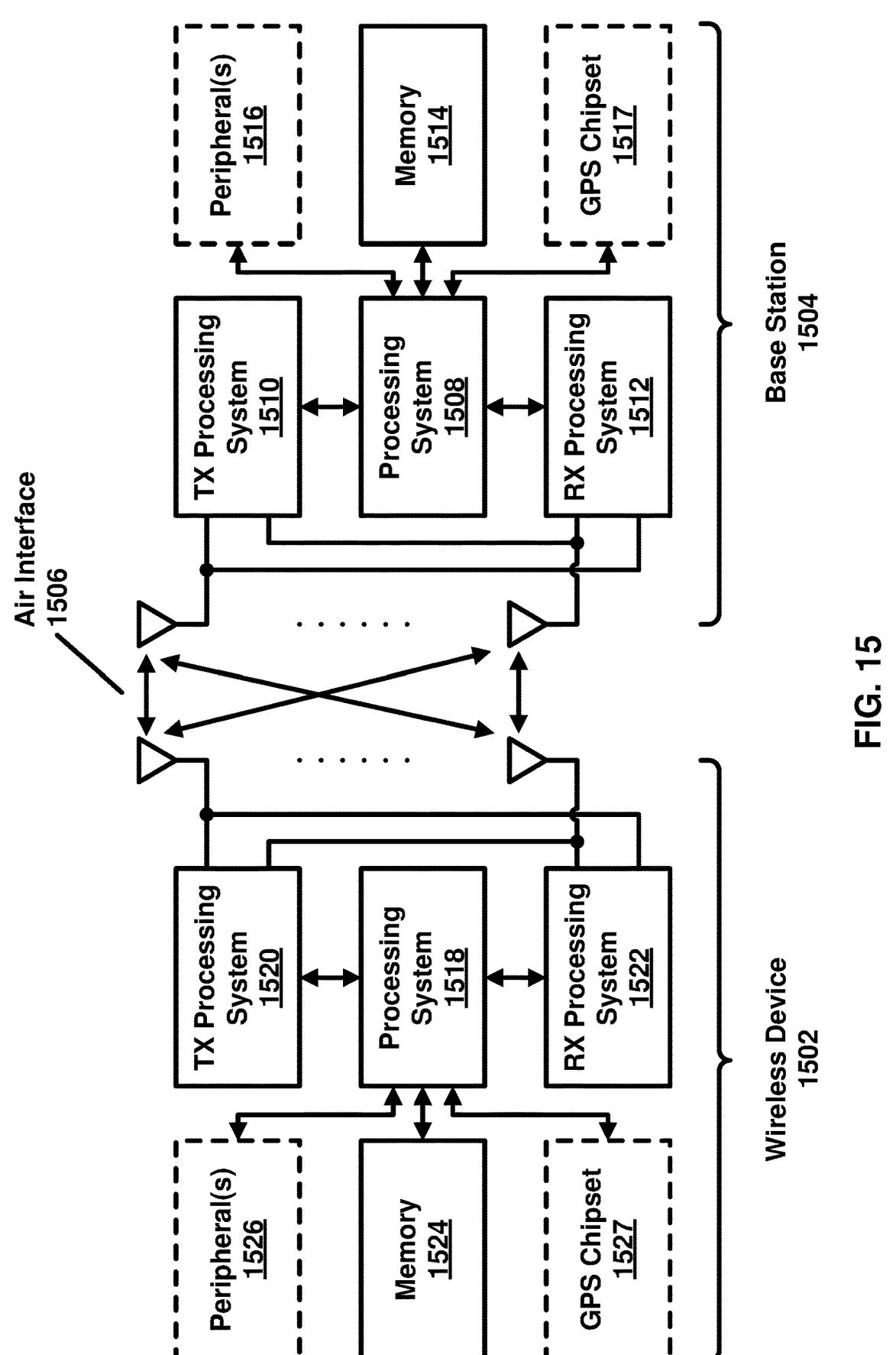
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory

1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a micro-controller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
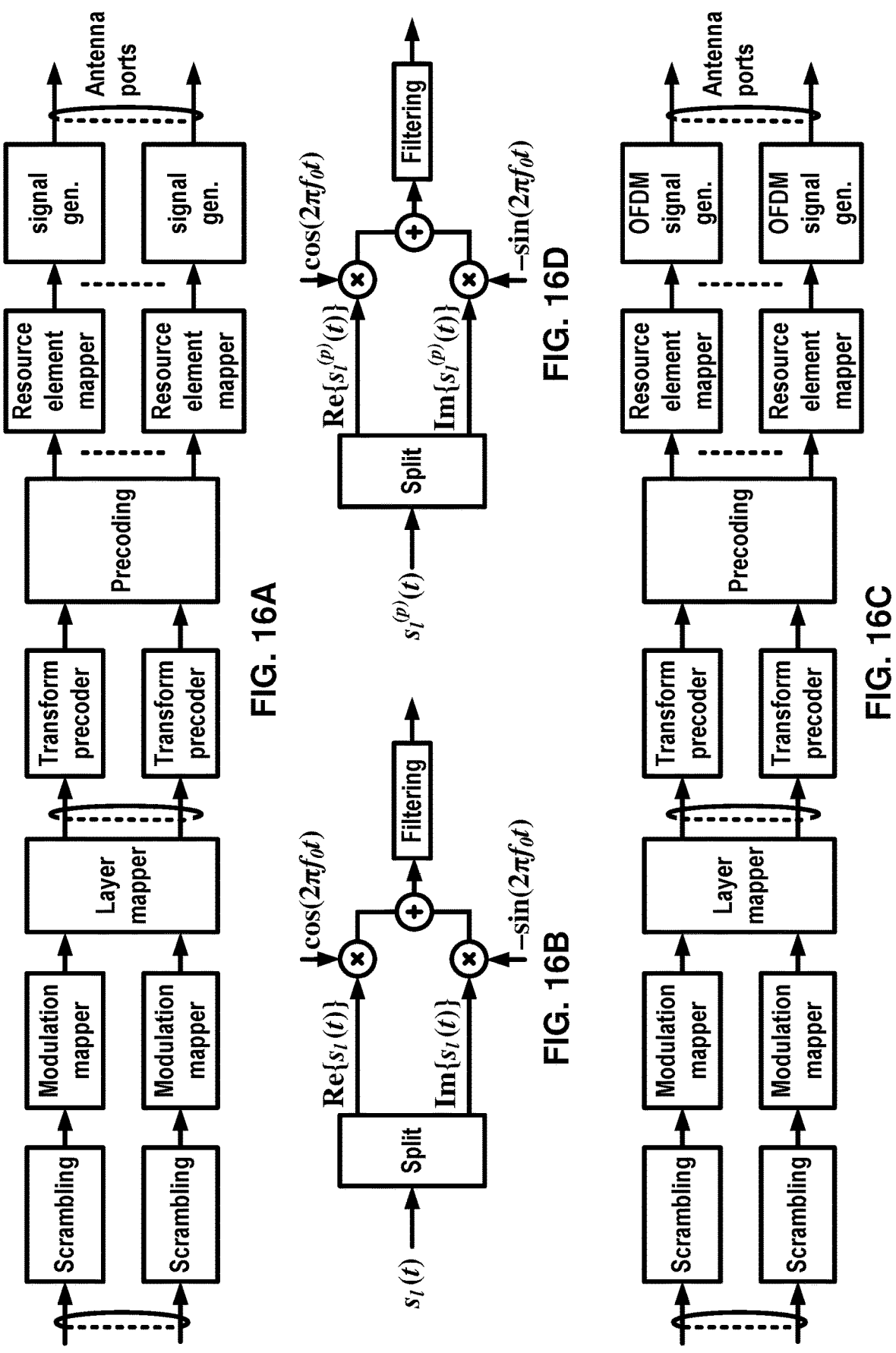
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

In an example, a base station and a wireless device may use a plurality of downlink control information (DCI) formats to communicate control information to schedule downlink data and/or uplink data or to deliver control information. For example, a DCI format 0_0 may be used to schedule an uplink resource for a PUSCH over a cell. A DCI format 0_1 may be used to schedule one or more PUSCHs in one cell or may be used to indicate downlink feedback information for configured grant PUSCH (CG-DFI). A DCI format 0_2 may be used to schedule a resource for a PUSCH in one cell. Similarly, for downlink scheduling, a DCI format 1_0 may schedule a resource for a PDSCH in one cell. A DCI format 1_1 may be used to schedule a PDSCH in one cell or trigger one shot HARQ-ACK feedback. A DCI format 1_2 may be used to schedule a resource for a PDSCH in one cell. There are one or more DCI formats carrying non-scheduling information. For example, a DCI format 2_0 may be used to indicate a slot formation information for one or more slots of one or more cells. A DCI format 2_2 may be used to indicate one or more transmit power control commands for PUCCH and PUSCH. A DCI format 2_3 may be used to indicate one or more transmit power control for SRS. A DCI format 2_4 may be used to indicate an uplink cancellation information. A DCI format 2_5 may be used to indicate a preemption information. A DCI format 2_6 may be used to indicate a power saving state outside of DRX active time. A DCI format 3_0 or 3_1 may be used to schedule NR sidelink resource or LTE sidelink resource in one cell.

A DCI format may comprise one or more DCI fields. A DCI field may have a DCI size. A wireless device may determine one or more bitfield sizes of one or more DCI fields of the DCI format based on one or more radio resource control (RRC) configuration parameters by a base station. For example, the one or more RRC configuration parameters may be transmitted via master information block (MIB). For example, the one or more RRC configuration parameters may be transmitted via system information blocks (SIBs). For example, the one or more RRC configuration parameters may be transmitted via one or more a wireless device specific messages. For example, the wireless device may determine one or more DCI sizes of one or more DCI fields of a DCI format 0_0 based on the one or more RRC configuration parameters transmitted via the MIB and/or the SIB s. The wireless device may be able to determine the one or more DCI sizes of the DCI format 0_0 without receiving any the wireless device specific message. Similarly, the wireless device may determine one or more DCI sizes of one or more second DCI fields of a DCI format 1_0 based on the one or more RRC configuration parameters transmitted via the MIB and/or the SIB s. For example, the DCI format 0_0 and the DCI format 1_0 may be called as fallback DCI for scheduling uplink data and downlink data respectively.

For example, the wireless device may determine one or more first DCI sizes of one or more first DCI fields of a DCI format 0_1 based on one or more RRC configuration parameters transmitted via the MIB and/or the SIBs and/or the wireless device specific RRC message(s). The wireless device may determine one or more bitfield sizes of the one or more first DCI fields based on the one or more RRC configuration parameters. For example, FIG. 17 may illustrate the one or more first DCI fields of the DCI format 0_1. In FIG. 17, there are one or more second DCI fields that may present in the DCI format 0_1 regardless of the wireless device specific RRC message(s). For example, the DCI format 0_1 may comprise a 1-bit DL/UL indicator where the bit is configured with zero ('0') to indicate an uplink grant for the DCI format 0_1. DCI field(s) shown in dotted boxes may not be present or a size of the DCI field(s) may be configured as zero. For example, a carrier indicator may be present when the DCI format 0_1 is used to schedule a cell based on cross-carrier scheduling. The carrier indicator may indicate a cell index of a scheduled cell by the cross-carrier scheduling. For example, UL/SUL indicator (shown UL/SUL in FIG. 17) may indicate whether a DCI based the DCI format 0_1 schedules a resource for an uplink carrier or a supplemental uplink. The UL/SUL indicator field may be present when the wireless device is configured with a supplemental uplink for a scheduled cell of the DCI. Otherwise, the UL/SUL indicator field is not present.

A field of BWP index may indicate a bandwidth part indicator. The base station may transmit configuration parameters indicating one or more uplink BWPs for the scheduled cell. The wireless device may determine a bit size of the field of BWP index based on a number of the one or more uplink BWPs. For example, 1 bit may be used. The number of the one or more uplink BWPs (excluding an initial UL BWP) is two. The field of BWP index may be used to indicate an uplink BWP switching. The wireless device may switch to a first BWP in response to receiving the DCI indicating an index of the first BWP. The first BWP is different from an active uplink BWP (active before receiving the DCI).

A DCI field of frequency domain resource allocation (frequency domain RA in FIG. 17) may indicate uplink resource(s) of the scheduled cell. For example, the base station may transmit configuration parameters indicating a resource allocation type 0. With the resource allocation type 0, a bitmap over one or more resource block groups (RBGs) may schedule the uplink resource(s). With a resource allocation type 1, a starting PRB index and a length of the scheduled uplink resource(s) may be indicated. The base station may transmit configuration parameters indicating a dynamic change between the resource allocation type 0 and the resource allocation type 1 (e.g., 'dynamicswitch'). The wireless device may determine a field size of the frequency domain RA field based on the configured resource allocation type and a bandwidth of an active UL BWP of the scheduled cell. For example, when the resource allocation type 0 is configured, the bitmap may indicate each of the one or more RBGs covering the bandwidth of the active UL BWP. A size of the bitmap may be determined based on a number of the one or more RBGs of the active UL BWP. For example, the wireless device may determine the size of the frequency domain RA field based on the resource allocation type 1 based on the bandwidth of the active uplink BWP (e.g., ceil (log 2(BW(BW+1)/2), wherein BW is the bandwidth of the active uplink BWP).

The wireless device may determine a resource allocation indicator value (RIV) table, where an entry of the table may comprise a starting PRB index and a length value. For example, when the dynamic change between the resource allocation type 0 and the resource allocation type 1 is used, a larger size between a first size based on the resource allocation type 0 (e.g., the bitmap size) and a second size based on the resource allocation type 1 (e.g., the RIV table size) with additional 1 bit indication to indicate either the resource allocation type 0 or the resource allocation type 1. For example, the frequency domain RA field may indicate a frequency hopping offset. The base station may use K (e.g., 1 bit for two offset values, 2 bits for up to four offset values) bit(s) to indicate the frequency hopping offset from one or more configured offset values, based on the resource allocation type 1. The base station may use ceil(log 2(BW(BW+ 1)/2)–K bits to indicate the uplink resource(s) based on the resource allocation type 1, when frequency hopping is enabled.

A DCI field of time domain resource allocation (time domain RA shown in FIG. 17) may indicate time domain resource of one or more slots of the scheduled cell. The base station may transmit configuration parameters indicating one or more time domain resource allocation lists of a time domain resource allocation table for an uplink BWP of the scheduled cell. The wireless device may determine a bit size of the time domain RA field based on a number of the one or more time domain resource allocation lists of the time domain resource allocation table. The base station may indicate a frequency hopping flag by a FH flag (shown as FH in FIG. 17). For example, the FH flag may present when the base station may enable a frequency hopping of the scheduled cell or the active UL BWP of the scheduled cell. A DCI field of modulation and coding scheme (MCS) (shown as MCS in FIG. 17) may indicate a coding rate and a modulation scheme for the scheduled uplink data. A new data indicator (NDI) field may indicate whether the DCI schedules the uplink resource(s) for a new/initial transmission or a retransmission. A redundancy version (RV) field may indicate one or more RV values (e.g., a RV value may be 0, 2, 3, or 1) for one or more PUSCHs scheduled over the one or more slots of the scheduled cells. For example, the DCI may schedule a single PUSCH via one slot, a RV value is indicated. For example, the DCI may schedule two PUSCHs via two slots, two RV values may be indicated. A number of PUSCHs scheduled by a DCI may be indicated in a time domain resource allocation list of the one or more time domain resource allocation lists.

A DCI field of hybrid automatic repeat request (HARQ) process number (HARQ process # in FIG. 17) may indicate an index of a HARQ process used for the one or more PUSCHs. The wireless device may determine one or more HARQ processes for the one or more PUSCHs based on the index of the HARQ process. The wireless device may determine the index for a first HARQ process of a first PUSCH of the one or more PUSCHs and select a next index as a second HARQ process of a second PUSCH of the one or more PUSCHs and so on. The DCI format 0_1 may have a first downlink assignment index (1st DAI) and/or a second DAI (2nd DAI). The first DAI may be used to indicate a first size of bits of first HARQ-ACK codebook group. The second DAI may be present when the base station may transmit configuration parameters indicating a plurality of HARQ-ACK codebook groups. When there is no HARQ-ACK codebook group configured, the wireless device may assume the first HARQ-ACK codebook group only. The second DAI may indicate a second size of bits of second HARQ-ACK codebook group. The first DAI may be 1 bit when a semi-static HARQ-ACK codebook generation mechanism is used. The first DAI may be 2 bits or 4 bits when a dynamic HARQ-ACK codebook generation mechanism is used.

A field of transmission power control (TPC shown in FIG. 17) may indicate a power offset value to adjust transmission power of the one or more scheduled PUSCHs. A field of sounding reference signal (SRS) resource indicator (SRI) may indicate an index of one or more configured SRS resources of an SRS resource set. A field of precoding information and number of layers (shown as PMI in FIG. 17) may indicate a precoding and a MIMO layer information for the one or more scheduled PUSCHs. A field of antenna ports may indicate DMRS pattern(s) for the one or more scheduled PUSCHs. A field of SRS request may indicate to trigger a SRS transmission of a SRS resource or skip SRS transmission. A field of CSI request may indicate to trigger a CSI feedback based on a CSI-RS configuration or skip CSI feedback. A field of code block group (CBG) transmission information (CBGTI) may indicate HARQ-ACK feedback(s) for one or more CBGs. A field of phase tracking reference signal (PTRS)-demodulation reference signal (DMRS) association (shown as PTRS in FIG. 17) may indicate an association between one or more ports of PTRS and one or more ports of DM-RS. The one or more ports may be indicated in the field of antenna ports. A field of beta_offset indicator (beta offset in FIG. 17) may indicate a code rate for transmission of uplink control information (UCI) via a PUSCH of the one or more scheduled PUSCHs. A field of DM-RS sequence initialization (shown as DMRS in FIG. 17) may present based on a configuration of transform precoding. A field of UL-SCH indicator (UL-SCH) may indicate whether a UCI may be transmitted via a PUSCH of the one or more scheduled PUSCHs or not. A field of open loop power control parameter set indication (open loop power in FIG. 17) may indicate a set of power control configuration parameters. The wireless device is configured with one or more sets of power control configuration parameters. A field of priority indicator (priority) may indicate a priority value of the one or more scheduled PUSCHs. A field of invalid symbol pattern indicator (invalid OS) may indicate one or more unavailable/not-available OFDM symbols to be used for the one or more scheduled PUSCHs. A field of SCell dormancy indication (Scell dormancy) may indicate transitioning between a dormant state and a normal state of one or more secondary cells.

Note that additional DCI field(s), though not shown in FIG. 17, may present for the DCI format 0_1. For example, a downlink feedback information (DFI) field indicating for one or more configured grant resources may present for an unlicensed/shared spectrum cell. For example, the unlicensed/shared spectrum cell is a scheduled cell. When the DCI format 0_1 is used for indicating downlink feedback information for the one or more configured grant resources, other DCI fields may be used to indicate a HARQ-ACK bitmap for the one or more configured grant resources and TPC commands for a scheduled PUSCH. Remaining bits may be reserved and filled with zeros (0's).

Figure 18:
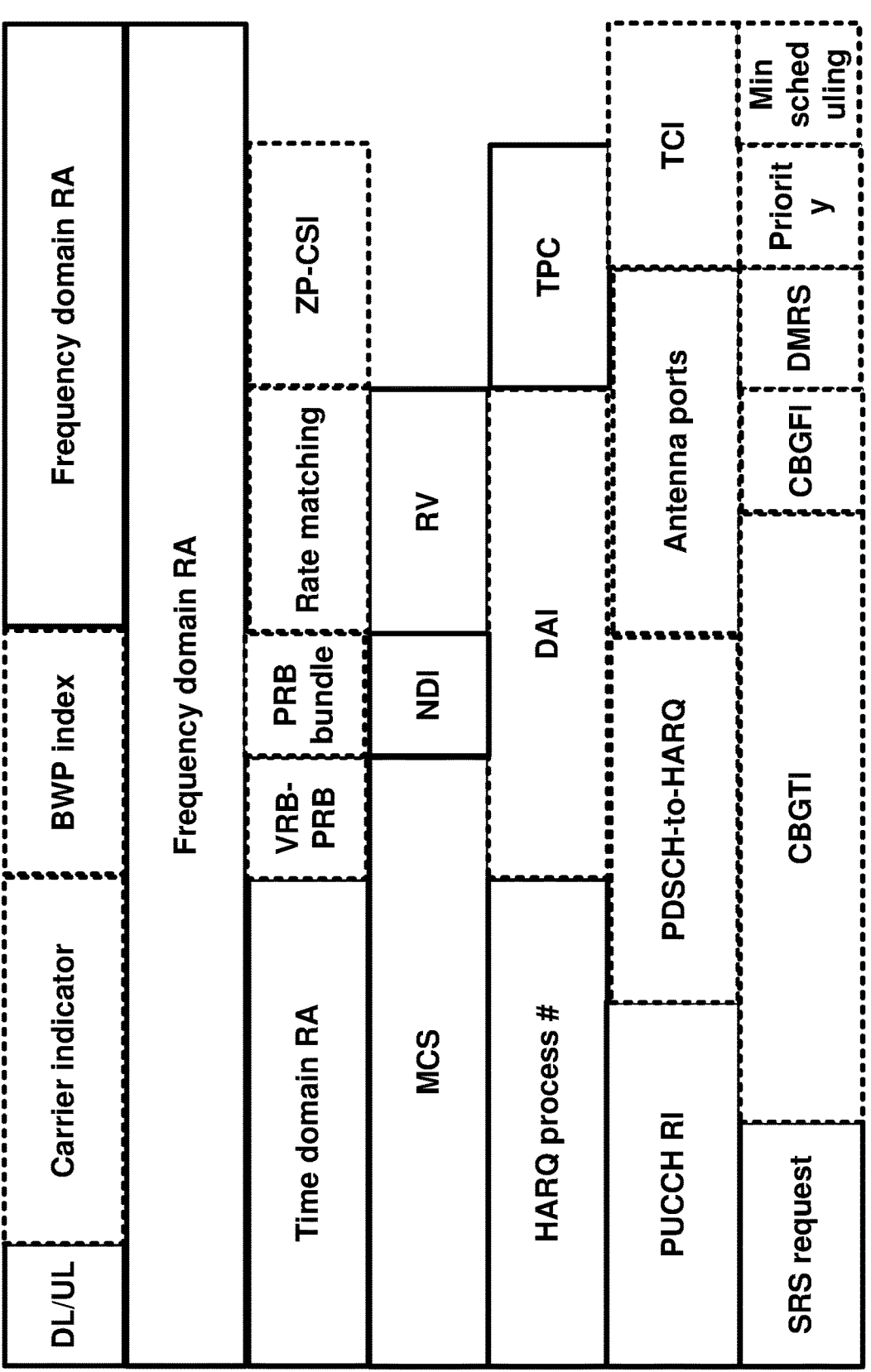
FIG. 18 illustrates an example of one or more DCI fields of a DCI format 1_1.

FIG. 18 shows an example of a DCI format 1_1. For example, the DCI format 1_1 may schedule a downlink resource for a scheduled downlink cell. The DCI format 1_1 may comprise one or more DCI fields such as an identifier for DCI formats (DL/UL), a carrier indicator, bandwidth part indicator (BWP index), a frequency domain resource assignment (frequency domain RA), a time domain resource assignment (time domain RA), a virtual resource block to physical resource block mapping (VRB-PRB), Physical resource block (PRB) bundling size indicator (PRB bundle), rate matching indicator (rate matching), zero power CSI-RS (ZP-CSI), a MCS, a NDI, a RV, a HARQ process number, a downlink assignment index (DAI), a TPC command for a PUCCH, a PUCCH resource indicator (PUCCH-RI), a PDSCH-to-HARQ_feedback timing indicator (PDSCH-to- HARQ in FIG. 17), an antenna ports, a transmission configuration indication (TCI), a SRS request, a CBG transmission information (CBGTI), a CBG flushing out information (CBGFI), DMRS sequence initialization (DMRS), a priority indicator (priority), and a minimum applicable scheduling offset indicator.

For example, the VRB-PRB field may indicate whether a mapping is based on a virtual RB or a physical RB. For example, the PRB bundle may indicate a size of PRB bundle when a dynamic PRB bundling is enabled. For example, the rate matching may indicate one or more rate matching resources where the scheduled data may be mapped around based on the rate matching. For example, the ZP-CSI field may indicate a number of aperiodic ZP CSI-RS resource sets configured by the base station. For example, the DCI format 1_1 may also include MCS, NDI and RV for a second transport block, in response to a max number of codewords scheduled by DCI may be configured as two. The DCI format 1_1 may not include MCS, NDI and RV field for the second transport block, in response to the max number of codewords scheduled by DCI may be configured as one. For example, the DAI field may indicate a size of bits of HARQ-ACK codebook. The TPC field may indicate a power offset for the scheduled PUCCH. The wireless device may transmit the scheduled PUCCH comprising HARQ-ACK bit(s) of the scheduled downlink data by the DCI. The PUCCH-RI may indicate a PUCCH resource of one or more PUCCH resources configured by the base station. The PDSCH-to-HARQ field may indicate a timing offset between an end of a scheduled PDSCH by the DCI and a starting of the scheduled PUCCH. The field of antenna ports may indicate DMRS patterns for the scheduled PDSCH. The TCI field may indicate a TCI code point of one or more active TCI code points/active TCI states. The base station may transmit configuration parameters indicating one or more TCI states for the scheduled cell. The base station may active one or more second TCI states of the one or more TCI states via one or more MAC CEs/DCIs. The wireless device may map an active TCI code point of the one or more active TCI code points to an active TCI of the one or more second TCI states. For example, the CBGTI may indicate whether to flush a soft buffer corresponding to a HARQ process indicated by the HARQ process #. For example, the Min scheduling field may indicate enable or disable applying a configured minimum scheduling offset (e.g., when a minimum scheduling offset is configured) or select a first minimum scheduling offset or a second minimum scheduling offset (e.g., when the first minimum scheduling offset and the second minimum scheduling offset are configured).

In an example, two downlink resource allocation schemes, type 0 and type 1, are supported. A wireless device may determine a frequency domain resource based on a DCI based on a fallback DCI format such as DCI format 0_1 based on a resource allocation type 1. A base station may transmit configuration parameters indicating a dynamic switch between the type 0 and the type 1 resource allocation via an indication in a DCI. The configuration parameters may comprise 'dynamicswitch' to enable dynamic switching between the type 0 and the type 1 via the DCI. The dynamic switching may be supported for a DCI based on a non-fallback DCI format such as DCI format 1_1 or DCI format 1_2. The configuration parameters may comprise/indicate either the type 0 or the type 1 as a resource allocation type via an RRC signaling. The wireless device may determine a frequency domain resource based on a DCI based on the resource allocation configured via the RRC signaling, in response to 'dynamicswitch' being not configured. The wireless device may determine a frequency domain resource based on a frequency domain resource assignment field of a DCI based on an active downlink BWP of a cell. The cell is a scheduled cell. The DCI may indicate a BWP index. The wireless device may determine the frequency domain resource based on one or more configuration parameters of an indicated BWP by the BWP index. For a PDSCH scheduled with a DCI based on a fallback DCI format (e.g., DCI format 1_0) via any common search space, a RB numbering, to determine a frequency domain resource, may start from a lowest RB of a coreset. For example, the DCI has been received via the coreset. In other cases, the RB numbering may start from a lowest RB of an active BWP of the scheduled cell.

For example, a resource allocation type 0 may use a bitmap to indicate a frequency domain resource. The bitmap may indicate one or more resource block groups (RBGs) that may allocate the frequency domain resource. One RBG may represent a set of consecutive virtual resource blocks defined by a rgb-Size. For example, the rbg-Size may be indicated as a parameter of a PDSCH-Config under a servingCellConfig. For example, the rbg-Size may be determined based on a parameter of 'Configuration 1' or 'Configuration 2' and a bandwidth of an active BWP of a scheduled cell. For example, when the bandwidth of the active BWP is between 1 to 36 RBs, 'Configuration 1' indicates the rbg-Size of 2 and 'Configuration 2' indicates the rbg-Size of 4. For example, when the bandwidth of the active BWP is between 37 to 72 RBs, 'Configuration 1' indicates the rbg-Size of 4 and 'Configuration 2' indicates the rbg-Size of 8. For example, when the bandwidth of the active BWP is between 73 to 144 RBs, 'Configuration 1' indicates the rbg-Size of 8 and 'Configuration 2' indicates the rbg-Size of 16. For example, when the bandwidth of the active BWP is between 145 to 275 (or 550) RBs, 'Configuration 1' indicates the rbg-Size of 16 and 'Configuration 2' indicates the rbg-Size of 16. A number of RBGs (N_RBG) for a downlink BWP may present. A DCI field size of a frequency domain resource allocation based on the resource allocation type 0 would be ceil (N_RBG+(N_start_BWP mode P))/P) where a size of a first RBG is P−N_start_BWP mode P, a size of a last RBG is (N_start_BWP+bandwidth) mode P wherein is (N_start_BWP+bandwidth) mode P is greater than zero, a size of other RBGs are P, and P is the rbg-Size. The bitmap of N_RBG bits with one bitmap bit per a corresponding RBG, such that the corresponding RBG may be scheduled. The one or more RBGs may be indexed in an order of increasing frequency, and indexing may start from a lowest frequency of the active BWP. The order of the bitmap may be determined such that RBG #0 to RBG # N_RBG−1 may be mapped to most significant bit to least significant bit of the bitmap. The wireless device may assume an RBG is allocated in response to a corresponding bit of the bitmap being allocated/assigned as 1. The wireless device may assume a second RBG is not allocated in response to a corresponding bit of the bitmap being allocated/assigned as 0.

When a virtual RB to a physical RB mapping is enabled, the wireless device may determine one or more physical RBGs based on the indicated bitmap for the virtual RBGs. Otherwise, the indicated bitmap may determine the one or more physical RBGs.

For example, a resource allocation type 1, a frequency domain resource allocation may indicate a set of contiguously allocated non-interleaved or interleaved virtual resource blocks within an active bandwidth part of a scheduled cell. For example, a DCI may be scheduled via a USS.

The frequency domain resource allocation field based on the resource allocation type 1 may use a resource allocation/indicator value (RIV). The RIV may indicate a starting virtual RB (RB_start) and a length in terms of contiguously allocated virtual RBs (L_rbs). The RIV value may be determined as the RIV=bandwidth (L_rbs−1)+RB_start when (L_rbs−1) is smaller than or equal to floor (bandwidth/2), or the RIV=bandwidth (bandwidth−L_rbs+1)+(bandwidth−1−RB_start) otherwise. The bandwidth may represent a bandwidth of the active BWP.

A base station may enable a PRB bundling. A wireless device may assume a same precoding over a number RBs of the PRB bundle (e.g., two PRBs, four PRBs or the bandwidth). The base station may schedule the PRB bundle or not, and may not schedule partial PRB bundle to the wireless device.

Similar to downlink, for an uplink transmission, a few resource allocation types are supported. For the uplink transmission, a resource allocation type 0, resource allocation type 1 or resource allocation type 2 may be supported. The resource allocation type 0 may be used in response to a transform precoding being disabled. The resource allocation type 1 or the resource allocation type 2 may be used in response to the transform precoding being enabled or being disabled. For the uplink transmission, a 'dynamicswitch' may be configured. In response to the 'dynamicswitch', the wireless device may switch between the resource allocation type 0 and the resource allocation type 1 based on a DCI. The base station may configure a resource allocation type via an RRC signaling in response to the 'dynamicswitch' being not configured/enabled. The resource allocation type 2 may be used in response to an interlaced PUSCH being enabled. The wireless device may apply the resource allocation type 1 for a DCI based on a fallback DCI format such as a DCI format 0_0. The interlaced PUSCH is disabled for the fallback DCI format. When the interlaced PUSCH is enabled, the wireless device may apply the resource allocation type 2 for the DCI. The wireless device may determine a frequency domain resource based on a frequency domain resource allocation field of a DCI based on an active uplink BWP of a scheduled cell. The DCI may not comprise a BWP index. The wireless device may determine the frequency domain resource based on an indicated BWP by a BWP index when the DCI comprises the BWP index.

In an example, a resource allocation type 0 for an uplink transmission may use a bitmap indicating one or more RBGs within an active UL BWP of a scheduled cell. One RBG may represent a set of consecutive virtual resource blocks defined by a rbg-Size. The rbg-Size may be indicated as a parameter of a PUSCH-Config under a servingCellConfig. For example, the rbg-Size may be determined based on a parameter of 'Configuration 1' or 'Configuration 2' and a bandwidth of an active UL BWP of a scheduled cell. For example, when the bandwidth of the active UL BWP is between 1 to 36 RBs, 'Configuration 1' indicates the rbg-Size of 2 and 'Configuration 2' indicates the rbg-Size of 4. For example, when the bandwidth of the active UL BWP is between 37 to 72 RBs, 'Configuration 1' indicates the rbg-Size of 4 and 'Configuration 2' indicates the rbg-Size of 8. For example, when the bandwidth of the active UL BWP is between 73 to 144 RBs, 'Configuration 1' indicates the rbg-Size of 8 and 'Configuration 2' indicates the rbg-Size of 16. For example, when the bandwidth of the active UL BWP is between 145 to 275 (or 550) RBs, 'Configuration 1' indicates the rbg-Size of 16 and 'Configuration 2' indicates the rbg-Size of 16. A number of RBGs (N_RBG) for a uplink BWP may present. Determination of a bit of the bitmap of the uplink resource allocation type 1 is same as that of the downlink resource allocation type 1. In frequency range 1 (e.g., below 7 GHz), almost contiguous allocation may be supported. In frequency range 2 (e.g., above 7 GHz and below 52.6 GHz), contiguous resource allocation may be supported.

The resource allocation type 0 for an uplink transmission may follow similar procedure to the resource allocation type 0 for an downlink transmission.

The resource allocation type 2 may be used to indicate an interlaced resource allocation, wherein M is a number of interlaces. For example, a frequency domain resource allocation field may comprise a RIV. For the RIV between 0 and M (M+1)/2 (e.g., 0<=RIV<M(M+1)/2), the RIV may indicate a starting interlace index m_0 and a number of contiguous interlace indices L (L>=1). For example, when (L−1)<=floor (M/2), the RIV may define M (L−1)+m_0. Otherwise, the RIV may define M (M−L+1)+(M−1−m_0). For the RIV larger than or equal to M(M+1)/2 (e.g., RIV>=M(M+1)/2), the RIV may indicate a starting interlace index m_0 and a set of values 1 based on one or more set of values. For example, an entry may represent {RIV−M(M+1)/2, m_0,1}. For example, the one or more set of values may comprise {0, 0, {0, 5}}, {1, 0, {0, 1, 5, 6}}, {2, 1, {0, 5}}, {3, 1, {0, 1, 3, 5, 6, 7, 8}}, {4, 2, {0, 5}}, {5, 2, {0, 1, 2, 5, 6, 7}}, {6, 3, {0, 5}}, and/or {7, 4, {0, 5}}.

Resource allocation type and mechanism based on a DCI may be also applied to a configured grant configuration or semi-persistent scheduling configuration.

In an example, a base station may transmit a DCI. The DCI may comprise a time domain resource allocation field. A value of the time domain resource allocation field (e.g., m) may indicate a row index m+1 of a time domain resource allocation lists/a time domain resource allocation table. The base station may transmit configuration parameters indicating one or more time domain resource allocation tables. For example, a first time domain resource allocation table may be used for a fallback DCI format scheduled via a CSS. For example, a second time domain resource allocation table may be used for a fallback DCI format and/or a non-fallback DCI format via a USS. The wireless device may determine a time domain resource allocation table from the one or more time domain resource allocation tables for the DCI in response to receiving the DCI. The configuration parameters may comprise one or more time domain resource allocation entries for a time domain resource allocation table. One time domain resource allocation entry may comprise a starting and a length indicator value (SLIV), a PUSCH mapping type, and K2 value. The K2 may represent a scheduling offset between a scheduling DCI of a PUSCH and a starting slot index of the PUSCH. The one time domain resource allocation (TDRA) entry may comprise a repetition number (numberOfRepetitions). The one TDRA entry may comprise a starting symbol (startSymbol) and a length addition to the SLIV. For a PUSCH, scheduled by a non-fallback DCI format such as DCI format 0_1, a base station may transmit, to a wireless device, configuration parameters indicating PUSCHRepTypeIndicaor-ForDCIFormat0_1 to 'puschRep-TypeB' indicating a repetition type B. In response to being configured with 'puschRepTypeB', the wireless device may determine a resource based on a procedure for the repetition type B and a time domain resource allocation field of a DCI based on the DCI format 0_1. Similarly, the configuration parameters may comprise PUSCHRepTypeIndicator-ForDCIformat0_2 to 'puschRepTypeB' to apply the repetition type B for a second DCI based on a DCI format 0_2. When the base station may not configure PUSCHRepTypeIndicaor-ForDCIFormat0_1 indicating 'puschRepTypeB', the wireless device may determine a time domain resource based on a DCI based on a repetition type A.

For example, when the repetition type A is configured/enabled, the wireless device may determine a starting symbol S in a starting slot and a number of consecutive symbols L from the starting symbol S based on a SLIV value. For example, the SLIV value may define SLIV=14*(L−1)+S when (L−1) is smaller than or equal to 7 (half slot based on a normal CP). The SLIV value may define SLIV=14*(14−L+1)+(14−1−S) when (L−1) is larger than 7. For example, L would be greater than 0, and may be smaller than or equal to 14−S. For example, L would be greater than 0, and may be smaller than or equal to 14. In an uplink BWP with an extended CP, 12 OFDM symbols may be assumed for a slot. A SLIV value may be determined by 12*(L−1)+S or 12*(12−L+1)+(12−1−S) respectively based on L−1 being smaller than/equal to 6 or larger than 6. For the repetition type A, the configuration parameters may comprise/indicate a TypeA or TypeB for a PUSCH mapping type. For example, the base station may determine a first OFDM symbol comprising a DM-RS based on a fixed location (e.g., a first symbol of a slot) when the TypeA is configured for the PUSCH mapping type. For example, the base station may determine a first OFDM symbol comprising a DM-RS based on a starting OFDM symbol of the PUSCH in response to the TypeB being configured for the PUSCH mapping type.

For example, when the repetition type B is configured/enabled, the wireless device may determine a starting OFDM symbol S in a starting slot, and a number of consecutive OFDM symbols L based on a row of a time domain resource allocation table. For example, the row of the time domain resource allocation table may comprise startSymbol for the starting OFDM symbol S and length for the number of consecutive OFDM symbols L. For the repetition type B, the wireless device may assume that the TypeB is configured for the PUSCH mapping type. For example, when a TypeA is configured for a PUSCH mapping type, a staring OFDM symbol S, a length L, and S+L may represent one or more values. For example, {S, L, S+L} may be {0, {4, . . . , 14}, {4, . . . , 14}} for a normal CP, and {0, {4, . . . , 12}, {4, . . . , 12}} for an extended CP. When a TypeB is configured for the PUSCH mapping type, {S, L, S+L} may be {{0, . . . , 13}, {1, . . . , 14}, {1, . . . , 14} fora repetition type A, {1, . . . , 27} for a repetition type B} for the normal CP, and {{0, . . . , 11}, {1, . . . , 12}, {1, . . . , 12} } for the extended CP.

For a repetition type A, a wireless device may determine a repetition number K based on a row of a time domain resource allocation table. The row may comprise a number of repetitions. The wireless device may determine based on an RRC parameter, 'pusch-AggregationFactor' when the row may not comprise the number of repetitions. The wireless device may determine a single transmission based on the row may not comprise the number of repetitions nor the 'pusch-AggregationFactor' is configured. The wireless device may determine the single transmission of a transport block via a PUSCH scheduled by a fallback DCI such as a DCI format 0_0.

For a repetition type A with a repetition number K being larger than 1, a wireless device may apply a starting OFDM symbol S and a length L in a slot across K consecutive slots based on a single transmission layer. The wireless device may repeat a TB across the K consecutive slots applying same OFDM symbols in each slot. A same set of OFDM symbols may be determined over the K consecutive slots, where each slot corresponds to a repetition of the TB via a PUSCH. A redundancy version (RV) applied on a i-th transmission of the K consecutive slots may be determined based on a repetition type. For example, when a RV value indicated by a DCI is 0, a second RV value for i-th transmission occasion (when a repetition type A is configured) or i-th actual repetition (when a repetition type B is configured) may be determined as 0 for i mod 4=0, 2 for i mod 4=1, 3 for i mod 4=2, 4 for i mod 4=3. For example, A mod (e.g., modulo) B may result in a remainder of A divided by B. When the RV value is 2, the second RV value may be determined as 2 for i mod 4=0, 3 for i mod 4=1, 1 for i mod 4=2, 0 for i mod 4=3. When the RV value is 3, the second RV value may be determined as 3 for i mod 4=0, 1 for i mod 4=1, 0 for i mod 4=2, 0 for i mod 4=2. When the RV value is 1, the second RV value may be determined as 1 for i mod 4=0, 0 for i mod 4=1, 2 for i mod 4=2, 3 for i mod 4=3.

For a repetition type A, a PUSCH transmission of a slot over a plurality of slots may be omitted (e.g., skipped, dropped, cancelled) when the slot may not have a sufficient number of uplink OFDM symbols for the PUSCH transmission. For a repetition type B, a wireless device may determine one or more slots for a number of nominal repetition number N. For a i-th nominal repetition, wherein i is 0, . . . , N−1, wherein N may be configured by a base station via an RRC signaling or a time domain resource allocation of a DCI. The wireless device may determine a slot. The i-th nominal repetition may start, wherein a slot index would be Ks+floor ((S+iL)/N_slot_symbol), and a starting symbol in the slot may be given by mod (S+iL, N_slot_symbol). The N_slot_symbol may be 14 with a normal CP and 12 with an extended CP. The S may represent a starting OFDM symbol indicated by a time domain resource allocation field of a DCI and L may represent a length indicated by the time domain resource allocation field of the DCI. The wireless device may determine a second slot wherein the i-th nominal repetition may end wherein a second slot index of the second slot may be determined as Ks+floor ((S+(i+1)*L−1)/N_slot_symbol), and an ending symbol in the second slot may be determined as mod (S+(i+1)*L−1, N_slot_symbol). The Ks may be determined as a starting slot indicated by the time domain resource allocation field of the DCI. For example, the DCI may indicate a slot/scheduling offset (e.g., k0), where ks=kn+k0. For example, kn may represent a first slot when the wireless device receives the DCI.

When the wireless device is configured with the repetition type B, the wireless device may determine invalid OFDM symbol for PUSCH repetitions based on a tdd-UL-DL-ConfigurationCommon/a tdd-UL-DL-ConfigurationDedicated and/or an InvalidSymbolPattern indicated by an RRC signaling. For example, the wireless device may determine a downlink symbol based on the tdd-UL-DL-Configuration-Common or the tdd-UL-DL-ConfigurationDedicated as an invalid OFDM symbol for the repetition type B. The base station may transmit the InvalidSymbolPattern, a bitmap of OFDM symbols over one slot or two slots. A bit of the bitmap may indicate '1' to invalidate a corresponding OFDM symbol. When the corresponding OFDM symbol is invalidated, the wireless device may not use the corresponding OFDM symbol in transmission of a scheduled uplink signal.

The base station may further configure periodicityAndPattern. A bit of the periodicityAndPattern may correspond to a unit equal to a duration of the bitmap of the InvalidSymbolPattern. The wireless device may determine invalid OFDM symbol(s) based on the InvalidSymbolPattern and the periodicityAndPattern. For example, when a PUSCH is scheduled/activated by a non-fallback DCI format such as a DCI format 0_1/0_2 and InvalidSymbolPatternIndicator-ForDCIFormat0_1/0_2 is configured, an invalid symbol pattern indicator field may indicate 1, the wireless device may apply an invalid symbol pattern (e.g., InvalidSymbolPattern). Otherwise, the wireless device may not apply the invalid symbol pattern. When the InvalidSymbolPattern-Indicator-ForDCIFormat0_1/0_2 is not configured, the wireless device may not apply the invalid symbol pattern. The wireless device may determine remaining OFDM symbols. The remaining OFDM symbols may not comprise invalid OFDM symbol(s), the wireless device may consider the remaining OFDM symbols as valid OFDM symbols. When there is a sufficient number of valid OFDM symbols in a slot to transmit a PUSCH based on a scheduling DCI, the wireless device may determine an actual repetition of a slot wherein the slot may have consecutive sufficient valid consecutive OFDM symbols. The wireless device may skip the actual repetition based on a slot formation indication. The wireless device may apply a redundancy version based on the actual repetition.

In an example, a nominal repetition (e.g., a nominal PUSCH) may be determined based on a time domain resource allocation by a DCI. The nominal PUSCH may be used for determining a transport block size. The nominal PUSCH may be used for determining one or more DM-RS patterns/symbols for a transport block scheduled via the nominal PUSCH. The wireless device may determine one or more actual repetitions (e.g., one or more actual PUSCHs) based on a nominal repetition. The wireless device may divide the nominal repetition when one or more invalid OFDM symbols are present and/or a slot boundary is present. The wireless device may determine an actual PUSCH that is contiguous in time domain and is confined within a slot.

In an example, a row of a time domain resource allocation may comprise one or more resource assignments for one or more contiguous PUSCHs. A K2 (e.g., a slot/scheduling offset) of the row may indicate a first PSCH of the one or more contiguous PUSCHs. Each PUSCH of the one or more contiguous PUSCHs may be indicated/scheduled with a separate SLIV value and a PUSCH mapping type.

A similar mechanism may be used to schedule a time domain resource for a downlink data.

In existing technologies, a DCI may indicate time and/or frequency resources of a serving cell. A wireless device may transmit an uplink signal via the resources of the serving cell. A base station may transmit a plurality of DCIs scheduling resources via a plurality of serving cells. This may increase signaling overhead for example by adding cyclic shift redundancy bits (e.g., 24 bits) in each DCI of the plurality of DCIs. This may increase resource overhead by transmitting/allocating multiple control resources for the plurality of DCIs.

In existing technologies, a DCI may indicate resources of a serving cell. A wireless device may determine same resources of another serving cell based on the resources indicated by the DCI. For example, the DCI may schedule resources of a first cell. The wireless device may determine a same set of frequency and/or time domain resources based on the resources for a second cell. The wireless device may transmit an uplink signal based on a repetition via the first cell and the second cell. This may be limited in scheduling as same set of time and frequency resources may be applied for the first cell and the second cell.

Implementation of existing technologies may not support a first subcarrier spacing for the first cell and a second subcarrier spacing for the second cell, where the first sub-carrier spacing is different from the second subcarrier spacing. Implementation of existing technologies may not support scheduling different frequency domain and/or time domain resources across a plurality of cells via a single DCI.

In a simple approach of a DCI scheduling resources via a plurality of cells, the DCI may comprise a first frequency domain resource assignment field for a first cell and a second frequency domain resource assignment field for a second cell. The DCI may comprise a frequency domain resource assignment field for each cell of the plurality of cells. The DCI may comprise a time domain resource assignment field for each cell of the plurality of cells. Implementation of the simple approach may lead increased DCI size. For example, a first size of the first frequency domain resource assignment may be 10-15 bits. A sum of each frequency domain resource assignment field for each cell may linearly increase as a number of the plurality of cells. This may increase a larger DCI size of a DCI format scheduling resources of the plurality of cells.

A larger DCI size of the DCI format may require a larger resource to schedule a DCI. For example, an aggregation level for the DCI may increase and thus a required resource element for the DCI may be increased. This may increase scheduling burden as a base station needs to find a big chunk of control resources. This may increase blocking of control channel as big chunk of resources are used for the DCI, and the base station may need to use fragmented resources for scheduling control channels for other users.

Enhancements to reduce a DCI size for a DCI format scheduling resources of a plurality of cells are needed.

In an example, a wireless device may determine a size of a resource allocation field based on a first bandwidth part of a first cell and a second bandwidth part of a second cell. The wireless device may determine a single resource allocation field for a plurality of cells comprising the first cell and the second cell. The resource allocation field may be a frequency domain resource allocation field. The resource allocation field may be a time domain resource allocation field.

The wireless device may determine the size based on a sum of a first bandwidth of the first bandwidth part and a second bandwidth of the second bandwidth part. The wireless device may determine a resource block group (RBG) size based on the sum. For example, the size of the frequency domain assignment field may be determined as a number of RBGs in the sum of the first bandwidth and the second bandwidth. The wireless device may determine the size based on a larger value between the first bandwidth and the second bandwidth.

The wireless device may receive a DCI comprising the resource allocation field indicating resources of the first cell and the second cell. The wireless device may transmit one or more uplink signals via the resources. Example embodiments may reduce a size of a resource assignment field. For example, the wireless device may determine a larger RBG size by summing the first bandwidth and the second bandwidth compared to a RBG size of either the first bandwidth part or the second bandwidth part. For example, the wireless device may determine a same size of the resource assignment field compared to a single cell resource assignment by determining the size based on a largest bandwidth of the plurality of cells.

Example embodiments may provide a flexible scheduling over a plurality of cells, where the DCI may indicate different set of frequency and/or time domain resources over the plurality of cells.

In an example, a wireless device may generate an encoded bitstream for a transport block (e.g., based on a channel coding such as low density parity check code). The encoded bitstream may comprise a plurality of redundancy versions (RVs) based on a HARQ process. In existing technologies, a RV of the plurality of RVs may be mapped via resources of a PUSCH. The resources may be associated with a single coreset pool/TRP/beam/carrier. Based on implementation of existing technologies, the wireless device may map a first RV of the plurality of RVs via a first resource of a first PUSCH and a second RV of the plurality of RVs via a second resource of a second PUSCH. Implementation of existing technologies may not enable diversity gain, via a plurality of beams/coreset pools/TRPs/panels/carriers, for a single PUSCH comprising a single RV. For example, based on the implementation of existing technologies, the wireless device may need to transmit at least two RVs for diversity gain via a plurality of beams/coreset pools/TRPs/panels/carriers. This may increase resource consumption and may increase latency.

In an example, a wireless device may receive a DCI indicating a first time domain resource associated with a first coreset pool/first carrier of a cell. The DCI may further indicate a second time domain resource associated with a second coreset pool/second carrier of the cell. For example, a time domain resource may be associated with a coreset pool in response to a reference signal used for the time domain resource belonging to the coreset pool. The reference signal used to determine a spatial domain filter parameter for the time domain resource may be configured with/of the coreset pool (or a TRP/panel of the coreset pool). The wireless device may encode a transport block to a bit stream. The bit stream may comprise a plurality of redundancy versions (RVs) for a hybrid automatic repeat request (HARQ) process. The wireless device may map an RV, of the plurality of RVs of the transport block, to a physical shared channel (e.g., PUSCH). For example, the wireless device may map the RV in order of the first time domain resource and the second time domain resource. The wireless device may transmit the physical shared channel via the first time domain resource associated with the first coreset pool and the second time domain resource associated with the second coreset pool.

Example embodiments may enable/lead diversity gain of an uplink signal via an uplink channel. The diversity gain may be achieved via resources across a plurality of coreset pools/TRPs/panels/carriers/cells/beams.

In existing technologies, downlink control information may be repeated via a plurality of control channels (e.g., PDCCHs). A wireless device may receive the plurality of PDCCHs and perform soft combining before attempting to decode the downlink control information. To determine the plurality of PDCCHs scheduling a same DCI, a base station may need to configure an association rule or configuration parameters to determine a first candidate and a second candidate that schedules a same DCI. This may limit a flexibility in scheduling downlink control information for multiple users.

In an example, a base station may transmit a first DCI via a first PDCCH. The first DCI may indicate a first resource of a first coreset pool/carrier and a first HARQ process ID for a transport block. The base station may transmit a second DCI via a second PDCCH. The second DCI may indicate a second resource of a second coreset pool/second carrier and a second HARQ process ID for the transport block. For example, the second HARQ process ID may be same as the first HARQ process ID. For example, the second HARQ process ID is associated with the first HARQ process ID to schedule a same transport block. Based on the first DCI and the second DCI, the wireless device may transmit a first repetition of the transport block via the first resource and a second repetition of the transport block via the second resource.

Example embodiments may allow flexible repetition of downlink control information scheduling repetition resources across a plurality of cells. Example embodiments may reduce a wireless device complexity to support a repetition of uplink signals and/or downlink control signals.

In existing technologies for enhancing a coverage or reliability of a wireless device, a base station may transmit, to the wireless device, configuration parameters indicating enabling one or more repeated transmissions, by the wireless device, of a transport block over one or more slots via a cell. For example, the configuration parameters may comprise/indicate a number of repetitions of the transport block via one or more radio resource control (RRC) messages and/or one or more downlink control information (DCI)s scheduling uplink resources. The configuration parameters may comprise/indicate one or more cells to the wireless device. The base station may schedule uplink resource(s) of a first transport block with or without a repetition via a first cell of the one or more cells. The base station may schedule second uplink resource(s) of a second transport block with or without a repetition via a second cell of the one or more cells. The first transport block and the second transport block via the first cell and the second cell may be different. The configuration parameters may comprise/indicate one or more first HARQ processes for the first cell. A HARQ process of the one or more first HARQ processes is used for the first transport block. The configuration parameters may comprise/indicate one or more second HARQ processes for the second cell. A second HARQ process of the one or more second HARQ processes is used for the second transport block. Existing technologies may limit one or more repeated transmission of a single transport block via a single carrier and thus increase a latency with the one or more repeated transmission over one or more slots of the single carrier.

With recent technology enhancements, a wireless device may support a plurality of cells at a time. For example, the wireless device may support a first cell of a first frequency region (e.g., FR1, a frequency range below than 7 GHz). The wireless device may also support a second cell of a second frequency region (e.g., FR2, 7 GHz<=a frequency range<=52.6 GHz). The wireless device may support a frequency region with a radio frequency equipment, where the wireless device may support a first RF for the first range and a second RF for the second range. For example, the first RF and the second RF may operate independently. For example, the first RF and the second RF may have dedicated power amplifiers. For example, the wireless device may determine a first power class for the first RF or the first power class for the first frequency region. The wireless device may determine a second power class for the second RF or the second power class for the second frequency region. For example, the wireless device may have a first allowed power (e.g., a first maximum power) for the first RF or the first frequency region. For example, the wireless device may have a second allowed power (e.g., a first maximum power) for the second RF or the second frequency region. The wireless device may apply the first allowed power for one or more first uplink cells operating in the first frequency region. For example, a sum of transmission power of the one or more first uplink cells may not exceed the first allowed power. The wireless device may apply the second allowed power for one or more second uplink cells operating in the second frequency region. For example, a sum of transmission power of the one or more second uplink cells may not exceed the second allowed power.

Recent technology enhancements may allow a wireless device to transmit a first uplink transmission via a cell operating in a first frequency region. A first transmission power of the first uplink transmission may be a first allowed power. The recent technology enhancements may also allow the wireless device to transmit, simultaneously with the first uplink transmission, a second uplink transmission via a second cell operating in a second frequency region. A second transmission power of the second uplink transmission may be a second allowed power. The recent technology enhancements may allow utilizing a plurality of uplink carriers/cells/panels enhancing a sum of transmission power. Existing technologies of repeated transmission of a transport block (TB) via a cell may need an enhancement to utilize a plurality of uplink carriers/cells/panels based on the recent technology enhancements.

For example, a base station may schedule a DCI to a wireless device. The DCI may indicate a first resource assignment of a first resource via a first uplink carrier, a second resource assignment of a second resource via a second uplink carrier and a hybrid automatic repeat request (HARQ) process identifier. The HARQ process identifier may be used to indicating a transmit buffer corresponding to a transport block (TB). The TB maybe transmitted based on a repetition via the first uplink carrier and the second uplink carrier. The wireless device may transmit, in response to the receiving the DCI, the transport block via both the first resource of a first PUSCH associated with the first uplink carrier and the second resource of a second PUSCH associated with the second uplink carrier. The wireless device may encode a bitstream of the TB. The bitstream may be divided to four redundancy versions (e.g., 0, 1, 2, and 3). The wireless device may transmit the first PUSCH of a first RV of the bitstream. The wireless device may transmit the second PUSCH of a second RV of the bitstream. The base station may be able to perform soft-combining of the first PUSCH and the second PUSCH, in response to receiving the first PUSCH and the second PUSCH, based on the HARQ process identifier. The base station may be able to receive the TB by receiving either the first PUSCH or the second PUSCH or both the first PUSCH and the second PUSCH.

Embodiments may enhance a reliability of an uplink transmission of a TB. Embodiments may enhance latency by repeating the TB over a plurality of carriers. Embodiments may reduce control channel overhead by transmitting a DCI indicating resource assignments for the plurality of carriers.

In an example, a carrier (e.g., an uplink carrier or a downlink carrier) may comprise a plurality of resource blocks (RBs). A resource block may comprise a set of subcarriers (e.g., 1 RB=12 subcarriers). The carrier may be configured with one or more uplink BWPs. An uplink BWP may comprise a plurality of consecutive RBs and a numerology. A wireless device may transmit a TB via the carrier, whereas the wireless device may transmit a part of TB (e.g., a modulation symbol) via a subcarrier.

In an example, a wireless device may transmit a first PUSCH of a TB via a first uplink carrier and a second PUSCH of the TB via the second uplink carrier simultaneously based on the first uplink carrier may operate in a first frequency range and the second uplink carrier may operate in a second frequency range. For example, the first frequency range may be different from the second frequency range. The first frequency range may belong to a frequency range 1, a frequency range 2 or a frequency range 3. The second frequency range may belong to the frequency range 1, the frequency range 2 or the frequency range 3.

Figure 19:
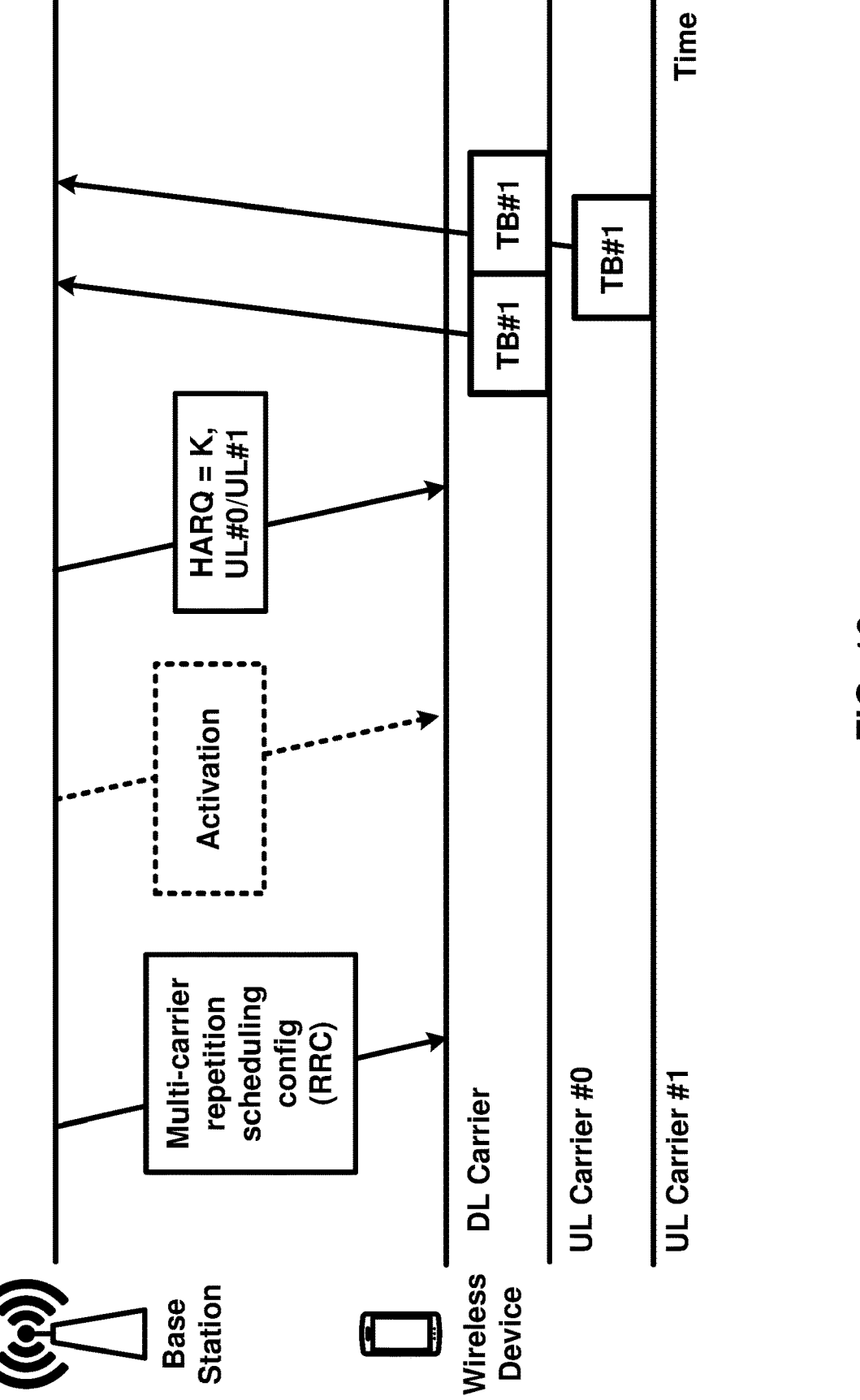
FIG. 19 illustrates an example of multi-carrier scheduling as per an aspect of an embodiment of the present disclosure.

FIG. 19 illustrates an example of embodiments of a multi-carrier scheduling. The wireless device may transmit a transport block via a first uplink carrier and a second uplink carrier. The base station may transmit configuration parameters indicating a downlink carrier (DL carrier) to the wireless device. The configuration parameters may comprise/indicate a first uplink carrier (UL carrier #0) and a second uplink carrier (UL carrier #2). The DL carrier and the first UL carrier may be associated with a cell. The second UL carrier may be associated with the cell. For example, the first UL carrier may be a non-supplemental uplink carrier and the second UL carrier may be a supplemental uplink carrier of the cell. For example, the first uplink carrier is associated with a first uplink panel and/or a first transmission and reception point (TRP) (e.g., a first coreset pool, a first coreset group) of the cell, and the second uplink carrier is associated with a second uplink panel and/or a second TRP (e.g., a second coreset pool, a second coreset group) of the cell. For example, the first uplink carrier is associated with non-supplemental uplink carrier of the cell and a first uplink panel and/or a first transmission and reception point (TRP) (e.g., a first coreset pool, a first coreset group) of the cell, and the second uplink carrier is associated with a supplemental uplink carrier of the cell and a second uplink panel and/or a second TRP (e.g., a second coreset pool, a second coreset group) of the cell. The second UL carrier may be associated with a second cell. The cell and the second cell may be different.

The base station may transmit one or more RRC messages comprising one or more configuration parameters indicating enabling a multi-carrier scheduling or a multi-carrier repetition scheduling. A DCI, based on the multi-carrier scheduling or the multi-carrier repetition scheduling, may comprise resource assignments of a plurality of cells for a number of repetitions of a TB over the plurality of cells. FIG. 19 shows a first transmission of an RRC signaling for configuring the multi-carrier repetition scheduling to the wireless device. A multi-carrier DCI may represent a DCI based on the multi-carrier scheduling or the multi-carrier repetition scheduling. For example, the one or more configuration parameters may comprise one or more control resource set (coreset)s and/or one or more search spaces. The DCI of the multi-carrier scheduling may be transmitted. The one or more configuration parameters may comprise a RNTI that may be used for the DCI of the multi-carrier scheduling. The RNTI may be different from a C-RNTI. The base station may transmit one or more MAC CEs/one or more DCIs to activate the multi-carrier scheduling.

FIG. 19 shows a second message of activation wherein second message of the activation may be optional. For example, the one or more MAC CEs may comprise a MAC CE activating and/or deactivating one or more secondary cells. The base station may transmit one or more DCIs. The one or more DCIs may indicate a BWP switching from a first BWP to a second BWP of a cell. The first BWP is an active BWP of the cell. The first BWP may not comprise one or more coresets of the multi-carrier scheduling. The second BWP may comprise one or more second coresets of the multi-carrier scheduling. For example, the one or more MAC CEs may comprise indication(s) of activating and/or deactivating a multi-carrier scheduling of a cell for one or more cells. For example, the one or more DCIs may comprise an indication to activate or deactivate the multi-carrier scheduling of the cell of the one or more cells.

The wireless device may activate the multi-carrier scheduling in response to receiving the one or more RRC messages. The one or more MAC CEs/the one or more DCIs may be optional. The base station may reconfigure to deactivate or activate the multi-carrier scheduling of a cell via RRC signaling. In response to activating the multi-carrier scheduling, the base station may transmit a DCI, based on the multi-carrier scheduling, comprising a HARQ process identifier (HARQ=K) and resource assignments for the first uplink carrier (UL carrier #0, UL #0) and for the second uplink carrier (UL carrier #1, UL #1). FIG. 19 illustrates a third transmission from the base station to the wireless device for the DCI with HARQ=K over the UL #0 and the UL #1. The DCI may be cyclic redundancy check (CRC) scrambled with the RNTI. The DCI may be transmitted via the one or more coresets and/or the one or more search spaces.

The DCI may indicate two uplink resources for two repetition of the TB via the first uplink carrier. The DCI may indicate one uplink resource for a repetition of the TB via the second uplink carrier as shown in FIG. 19. The configuration parameters may comprise/indicate a first number of repetition (e.g., two in FIG. 19) via the first uplink carrier. The configuration parameters may comprise/indicate a second number of repetition (e.g., one in FIG. 19) via the second uplink carrier. The wireless device may transmit the first number of repetitions via the first uplink carrier. The wireless device may transmit the second number of repetitions via the second uplink carrier. FIG. 19 illustrates that a box of TB #1 corresponds to a PUSCH. In FIG. 19, the wireless device transmits a first PUSCH (a first box via the UL Carrier #0) comprising the TB and a second PUSCH (a second box via the UL Carrier #0) comprising the TB via the first uplink carrier. The wireless device may transmit a third PUSCH (a first box via the UL Carrier #1) comprising the TB via the second uplink carrier. For example, the first PUSCH may transmit a first RV of the TB. The second PUSCH may transmit a second RV of the TB. The third PUSCH may transmit a third RV of the RB.

Figures 28A, 28B, 28C:
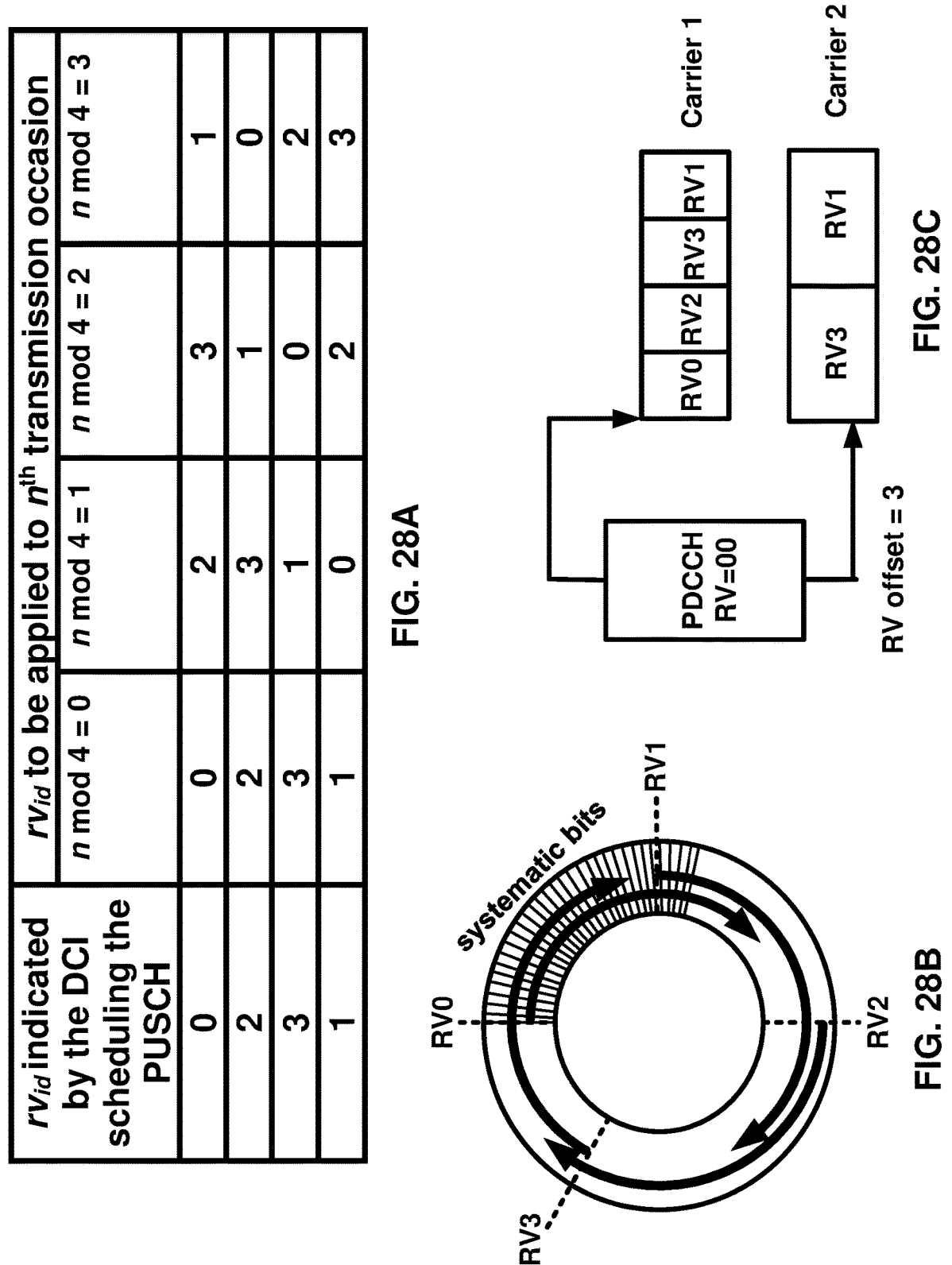
FIG. 28A illustrates an RV mapping table for repeated transmission as per an aspect of an embodiment of the present disclosure.
FIG. 28B illustrates an RV determination as per an aspect of an embodiment of the present disclosure.
FIG. 28C illustrates an RV mapping across a plurality of carriers as per an aspect of an embodiment of the present disclosure.

For example, the DCI may comprise a RV field indicating an index of the first RV. The second RV may be determined based on the first RV. For example, the second RV is a next RV of the first RV in a RV sequence (e.g., RV sequence is RV 0, RV 2, RV 3, and RV 1). For example, the third RV may be determined based on the first RV and one or more configuration parameters. The configuration parameters may comprise/indicate a RV offset. The third RV may be determined as the index of (the first RV+the RV offset) mod K. The K is a number of RVs (e.g., K=4). An index of RV may be determined as an order in the RV sequence. For example, an index of RV 3 is 3, and an index of RV 1 is 4. FIG. 28A-28C illustrates examples of a RV determination.

For example, the DCI may comprise a first RV field and a second RV field. The wireless device may determine the first RV and the second RV based on the first RV field. The wireless device may determine the third RV based on the second RV field. The DCI may comprise a plurality of RV fields. A RV field of the plurality of RV fields may correspond to one or more uplink transmissions of a transport block of an uplink carrier. In response to receiving the plurality of RV fields, the wireless device may determine one or more RVs for the one or more uplink transmissions of the TB of the uplink carrier. For example, the wireless device may determine the first RV as the indicated first RV field. The wireless device may determine the second RV as the next RV of the first RV. The wireless device may determine the third RV as the indicated second RV field. Embodiments of comprising a RV of a TB for a first uplink carrier in a multi-carrier DCI with an optional RRC configuration of a RV offset for the second uplink carrier for the TB may reduce a DCI signaling overhead while providing a flexibility configuring/indicating different RV(s) across the first uplink carrier and the second uplink carrier. Embodiments of configuring/indicating a first number of repetitions of the TB via the first uplink carrier and a second number of repetitions of the TB via the second uplink carrier may allow flexible repetition configuration across a plurality of carriers. Embodiments may enable assigning a repetition number for a carrier of the plurality of carriers based on a numerology of the carrier.

For example, the DCI may comprise a first frequency domain resource assignment field and a second frequency domain resource assignment field. The first frequency domain resource assignment field may indicate first resource(s) of the first uplink carrier in frequency domain. The second frequency domain resource assignment field may indicate a second resource of the second uplink carrier in frequency domain. For example, the DCI may comprise a first frequency domain resource assignment (RA) field. The first frequency domain RA field may indicate an entry of one or more frequency domain resource allocation lists. The entry may comprise a first field indicating first resource(s) of the first uplink carrier and a second field indicating second resource(s) of the second uplink carrier. An entry of the one or more frequency domain resource allocation lists may comprise a plurality of fields/sub-entries. A field/sub-entry may correspond to an uplink carrier. Embodiments may allow a low overhead DCI signaling while maintaining flexibility in assigning frequency domain resources over a plurality of cells.

For example, the DCI may comprise a first time domain resource assignment field and a second time frequency domain resource assignment field. The first time domain resource assignment field may indicate first resource(s) of the first uplink carrier in time domain. The second time domain resource assignment field may indicate a second resource of the second uplink carrier in time domain. For example, the DCI may comprise a first time domain resource assignment (RA) field. The first time domain RA field may indicate an entry of one or more time domain resource allocation lists. The entry may comprise a first field indicating first resource(s) of the first uplink carrier and a second field indicating second resource(s) of the second uplink carrier. An entry of the one or more time domain resource allocation lists may comprise a plurality of fields/sub-entries. A field/sub-entry may correspond to an uplink carrier. Embodiments may allow a low overhead DCI signaling while maintaining flexibility in assigning time domain resources over a plurality of cells.

In an example, the base station may transmit configuration parameters indicating the multi-carrier scheduling to the wireless device via one or more RRC messages. For example, the configuration parameters may comprise/indicate a cell index of the second uplink carrier for a serving cell configuration of the cell. The first uplink carrier is associated with the cell. The second uplink carrier may be configured as a complement/supplemental/additional carrier for the cell. The wireless device may be scheduled a repetition of a transport block via the first uplink carrier and the second uplink carrier. For example, the one or more RRC messages may comprise a RNTI. The RNTI may be used in a CRC scrambling of a DCI indicating a first resource of the first uplink carrier and a second resource of the second uplink carrier. The RNTI may be different from a C-RNTI or CS-RNTI or MCS-C-RNTI. A first DCI scrambled with the RNTI may indicate a multi-carrier DCI. A second DCI scrambled with the C-RNTI or the CS-RNTI or the MCS-C-RNTI may indicate a single-carrier DCI. The second DCI may comprise a resource assignment for the first uplink carrier. The wireless device may receive the first DCI and the second DCI via one or more search spaces of a BWP of a second cell. For example, the second cell may be the cell wherein self-carrier scheduling is used. For example, the second cell may be different from the cell wherein cross-carrier scheduling is used for the cell. The BWP of the second cell may be an active BWP of the second cell.

For example, the one or more RRC messages may comprise one or more search spaces and/or one or more coresets of the BWP of the second cell. The wireless device may be configured with the one or more search spaces and/or the one or more coresets for the BWP of the second cell. The wireless device may be additionally configured with one or more second search spaces and/or one or more second coresets for the BWP of the second cell. The wireless device may monitor one or more DCIs for the multi-carrier scheduling via the one or more search spaces and/or the one or more coresets. The wireless device may monitor second DCI(s) for a single-carrier scheduling via the one or more second search spaces and/or the one or more second coresets. For example, the one or more RRC messages may comprise one or more DCI formats supporting the multi-carrier DCI. For example, a DCI format of the one or more DCI formats may comprise one or more DCI fields indicating enabling of the multi-carrier scheduling. The one or more DCI fields may indicate whether a DCI based on the DCI format schedules resources for multi-carrier (e.g., indicating resources of a plurality of carriers) or resource(s) for single carrier (e.g., indicating resource(s) of a single carrier). The one or more RRC messages may comprise one or more time domain resource allocation lists. An entry of the one or more time domain resource allocation list may comprise a first time domain resource allocation for the first uplink carrier and a second time domain resource allocation for the second uplink carrier. The one or more RRC messages may comprise configuration parameters of a special BWP of the second cell. The special BWP may be configured with a multi-carrier scheduling. The wireless device may receive one or more DCIs of the multi-carrier scheduling in response to the special BWP being an active BWP of the second cell.

For example, the base station may transmit configuration parameters indicating an index of second carrier (e.g., a cell index of a third cell) in a ServingCellConfig of the cell. The first uplink carrier is associated with the cell. For example, the second carrier may be associated with the third cell. For example, the second carrier may be associated with the third cell as a non-supplemental uplink carrier. The ServingCellConfig may comprise one or more configuration parameters such as tdd-UL-DL-ConfigurationDedicated (e.g., a dedicated TDD DL/UL configuration), initialDownlinkBWP (e.g., initial downlink BWP of the cell), one or more downlink BWPs, and one or more uplink BWPs, uplinkConfig (e.g., configuration parameters for uplink transmission/uplink carrier), supplementalUplink (e.g., configuration parameters for supplemental uplink carrier of the cell), configuration parameters for control channels, configuration parameters for downlink data and uplink data parameters, and so on.

For example, the configuration parameters may comprise/indicate a parameter to enabling/disabling of a multi-carrier scheduling in the ServingCellConfig. The configuration parameters may comprise/indicate a supplemental uplink carrier for the cell. In response to receiving the parameter to enabling/disabling the multi-carrier scheduling for the cell, the wireless device may apply the multi-carrier scheduling over the uplink carrier and the supplemental uplink carrier associated with the cell. For example, the base station may transmit one or more configuration parameters of a multi-CarrierSchedulingConfig in the ServingCellConfig. For example, the multiCarrierSchedulingConfig may comprise a cell index and/or a frequency information of the second uplink carrier and/or one or more coresets to monitor a multi-carrier DCI and/or one or more search spaces to monitor the multi-carrier DCI and/or a RNTI used for CRC scrambling of the multi-carrier DCI.

In an example, a wireless device may receive one or more RRC messages indicating enabling of a multi-carrier scheduling of a plurality of downlink carriers. For example, similar to configuring a second multi-carrier scheduling for a plurality of downlink carriers, a base station may transmit one or more configuration parameters to enable the multi-carrier scheduling of the plurality of the downlink carriers. For example, a first multiCarrierSchedulingConfig (e.g., multiCarrierSchedulingConfig-DL) and a second multiCarrierSchedulingConfig (e.g., multiCarrierSchedulingConfig-UL) may be independently configured for a first cell. The multi-carrier scheduling for DL and/or UL may be enabled for the first cell. The wireless device may receive cross carrier scheduling configuration for the first cell. A second cell is a scheduling cell for the first cell. The wireless device may receive one or more multi-carrier DCIs via the second cell in response to being configured with the cross-carrier scheduling. In an example, a base station may transmit configuration parameters indicating a second cell as a complement/supplemental cell for a first cell to enable a multi-carrier scheduling across the first cell and the second cell.

A wireless device, in response to being configured with the second cell, may receive a first DCI comprising resource assignments of a first uplink carrier of the first cell and a second uplink carrier of the second cell. The wireless device may further receive a second DCI comprising resource assignments of a first downlink carrier of the first cell and a second downlink carrier of the second cell. The multi-carrier scheduling may be applied for both downlink and uplink carriers, when configured. In an example, a base station may transmit configuration parameters indicating one or more second uplink carriers for a first uplink carrier. The configuration parameters may comprise/indicate one or more cell indices of the one or more second uplink carriers and/or one or more frequency location information of the one or more second uplink carriers for the first uplink carrier. Similarly, the configuration parameters may comprise/indicate one or more second downlink carriers for a first downlink carrier. For example, the configuration parameters may comprise/indicate one or more second complement/supplemental cells for the first cell. A multi-carrier DCI may comprise resource assignments of the first cell and the one or more second complement/supplemental cells.

Embodiments based on two uplink carriers (e.g., a first uplink carrier and a second uplink carrier) may be extended to two downlink carriers and/or more than two uplink carriers and/or more than two downlink carriers. For example, embodiments related to the second uplink carrier may be similarly applied to the second downlink carrier in case of the two downlink carriers. For example, embodiments related to the second uplink carrier may be similarly applied to additional uplink carrier(s) of the more than two uplink carriers. For example, embodiments related to the second uplink carrier may be similarly applied to downlink carriers of the more than two downlink carriers excluding the first downlink carrier. The first downlink carrier is associated with a cell configured with the multi-carrier scheduling.

In an example, a base station may transmit configuration parameters indicating one or more first configuration parameters for a first uplink carrier and one or more second configuration parameters for a second uplink carrier. The wireless device may apply a parameter of the one or more second configuration parameters for the second uplink carrier. The wireless device may apply a second parameter of the one or more first parameters for the second uplink carrier. For example, the one or more second parameters may not comprise the second parameter. For example, a RBG size of the second uplink carrier may be determined based on a parameter of RBG size of the first uplink carrier. The RBG size of the second uplink carrier may not be configured for the second uplink carrier in the one or more second configuration parameters.

In an example, a base station may transmit configuration parameters indicating an uplink carrier and a supplemental uplink carrier for a first cell. The configuration parameters may comprise/indicate a downlink carrier associated with the first cell. For example, the uplink carrier may be associated with the downlink carrier, for example, a paired uplink spectrum of the downlink carrier is the uplink carrier. For example, an unpaired uplink spectrum of the downlink carrier, in case of TDD, is the uplink carrier. The supplemental uplink carrier may be associated as a non-supplemental uplink carrier (e.g., a normal uplink carrier) of a second cell. The supplemental carrier may be dedicated as the supplemental uplink carrier for the first cell. The supplemental uplink may not be associated with another cell as a non-supplemental uplink carrier. The supplemental uplink carrier may be an uplink spectrum of a paired spectrum or a second uplink spectrum of an unpaired spectrum. The supplemental uplink carrier may operate in a frequency of a band. The band may be defined as a long term evolution (LTE) band. The supplemental uplink carrier may operate in a second frequency of a second band. The second band may be defined as a new radio (NR) band.

In an example, a base station may transmit configuration parameters indicating a first UplinkConfig. An UplinkConfig may comprise configuration parameters related to an uplink carrier, in a ServingCellConfig. The ServingCellConfig may comprise configuration parameters related to a cell. The ServingCellConfig may comprise parameters related to a downlink carrier and the uplink carrier. The base station may also configure a second UplinkConfig for a supplemental uplink carrier of the cell, when the supplemental uplink carrier may present. An UplinkConfig may comprise parameters of initialUplinkBWP (an initial uplink BWP), one or more uplink BWPs, a firstActiveUplinkBWP-Id (a BWP index of a first active uplink BWP for a secondary cell), configuration parameters related to PUSCH transmission, configuration parameter(s) related to SRS carrier switching, a set of {uplink bandwidth, a subcarrier spacing} (a bandwidth information of an uplink carrier based on a specific subcarrier spacing for each subcarrier spacing supported by the uplink carrier), a bdFactorR (e.g., a blind decoding scaling factor), one or more CRS late matching pattern, one or more parameters related to uplink beams, and so on.

The configuration parameters may comprise/indicate a first pusch-ServingCellConfig of the first UplinkConfig for the uplink carrier. The configuration parameters may comprise/indicate a second pusch-ServingCellConfig of the second UplinkConfig for the second uplink carrier. A pusch-ServingCellConfig may comprise configuration parameters such as a codeBlockGroupTransmission (e.g., CBG transmission is enabled and/or configuration parameters related to CBG transmission), rateMatching (e.g., limitedBuffer rate matching is enabled or not), xOverhead (e.g., a number of resource elements of overhead in computing a transport block size (TBS) or a percentage of overhead in computing the TBS), a maximum MIMO layers, a processingType2Enabled (e.g., a fast processing time is enabled), and so on. An uplink BWP of the uplink carrier may comprise one or more configuration parameters for supporting PUCCH and/or PUSCH transmission. The wireless device may share M HARQ processes (e.g., M=16) between the uplink carrier and the supplemental uplink carrier of the first cell.

In an example, a multi-carrier DCI may comprise a first resource of the uplink carrier of the first cell and a second resource of the supplemental uplink carrier of the first cell. The wireless device may receive the multi-carrier DCI via a second cell. The second cell is the first cell based on self-carrier scheduling and the second cell may be a scheduling cell for the first cell based on cross-carrier scheduling. When the supplemental uplink carrier is the second carrier of the multi-carrier scheduling for the first cell, the wireless device may expect one or more configuration parameters related to PUSCH are commonly applied to the uplink carrier and the supplemental uplink carrier. For example, the configuration parameters may comprise/indicate one or more first parameters of the supplemental uplink carrier for a PUSCH transmission. The configuration parameters may comprise/indicate one or more second parameters for a PUSCH transmission based on the multi-carrier scheduling for the uplink carrier and the supplemental uplink carrier. The wireless device may receive a first DCI comprising a resource assignment of the supplemental uplink carrier scheduling a first TB via a first PUSCH. The first DCI may schedule a single cell. The wireless device may apply the one or more first parameters for the first PUSCH via the supplemental uplink carrier. The wireless device may receive a second DCI comprising a first resource assignment of the uplink carrier and a second resource assignment of the supplemental uplink carrier scheduling a second TB via the second PUSCH(s). The wireless device may apply the one or more second parameters for the second PUSCH(s) via the supplemental uplink carrier.

Figure 20:
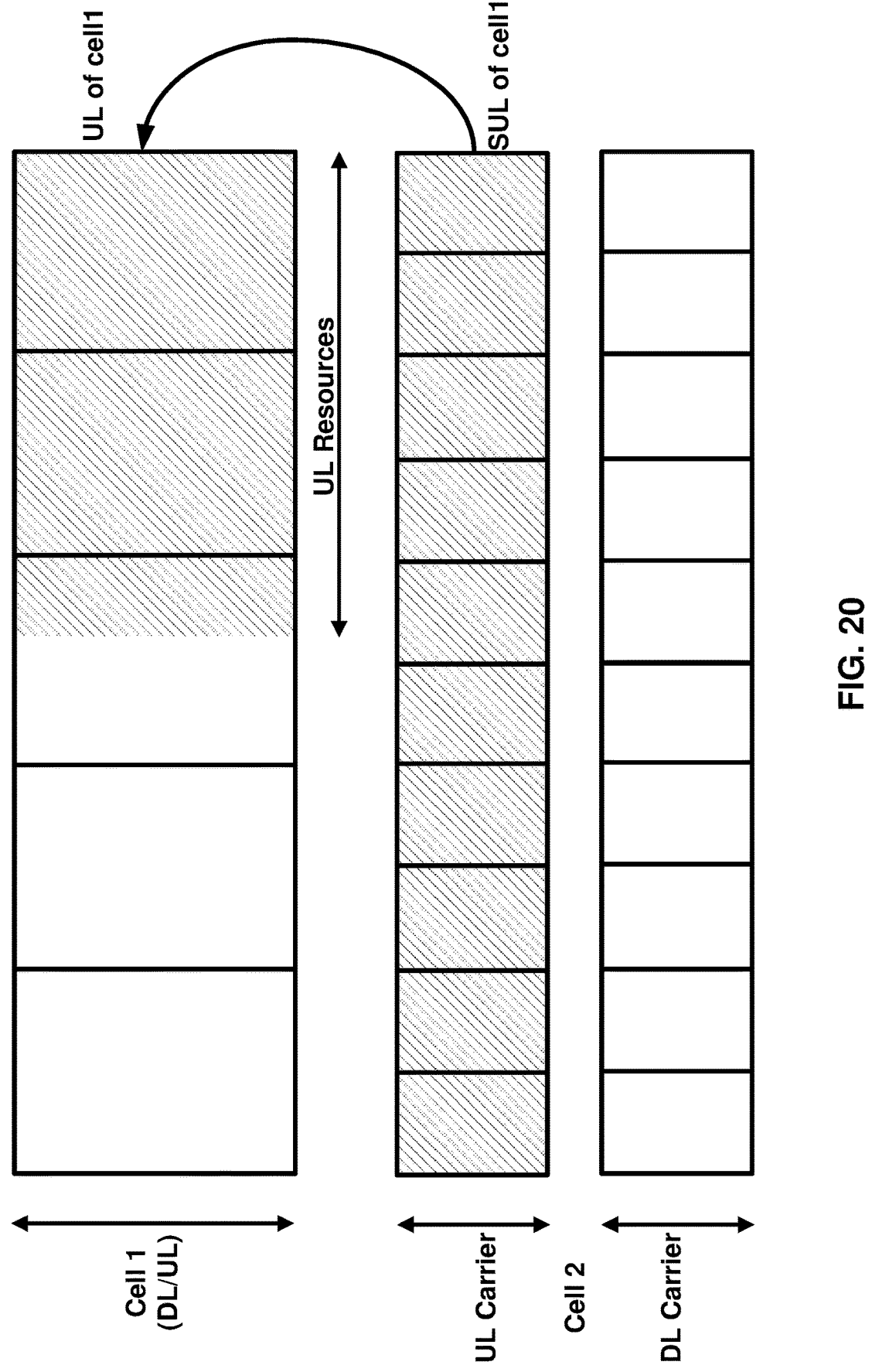
FIG. 20 illustrates an example of a scenario of multi-carrier scheduling based on an uplink carrier and a supplemental uplink carrier as per an aspect of an embodiment of the present disclosure.

FIG. 20 illustrates an example of a scenario of a multi-carrier scheduling based on an uplink carrier and a supplemental uplink carrier. In the example, the base station may transmit configuration parameters indicating a first cell (Cell 1) and a second cell (Cell 2) to the wireless device. The first cell may comprise a first downlink carrier and a first uplink carrier wherein the first downlink carrier and the first uplink carrier may operate in an unpaired spectrum. For example, resources shown in FIG. 20 as UL resources may operate as uplink resources. The base station may operate a TDD duplexing in the unpaired spectrum between the first downlink carrier and the first uplink carrier. The uplink resources shown as UL resources may be used for the first uplink carrier. The second cell may comprise a second downlink carrier and a second uplink carrier wherein the second downlink carrier and the second uplink carrier may operate in a paired spectrum. The second uplink carrier may have uplink resources in each slot. Based on the paired spectrum, the second downlink carrier and the second uplink carrier may operate an FDD duplexing. The configuration parameters may comprise/indicate the second uplink carrier as a supplemental uplink carrier for the first cell. The second uplink carrier may be a normal uplink carrier of the second cell. The second uplink carrier may be the supplemental uplink carrier of the first cell. The wireless device may be configured with a multi-carrier scheduling for the first cell. A multi-carrier DCI may indicate a first resource of the first uplink carrier and a second resource of the second uplink carrier as the supplemental uplink carrier.

In an example, the configuration parameters may comprise/indicate a first PUSCH-Config for a first BWP of the first uplink carrier. The configuration parameters may comprise/indicate a second PUSCH-Config for a second BWP of the second uplink carrier as the normal uplink carrier of the second cell. The configuration parameters may comprise/indicate a third PUSCH-Config for the second BWP of the second uplink carrier as the supplemental uplink carrier of the first cell. The wireless device may receive a first DCI, based on a multi-carrier scheduling, indicating a first resource of the first uplink carrier and a second resource of the second uplink carrier as the supplemental uplink carrier. In determining one or more DCI fields and/or one or more values carried over the one or more DCI fields, the wireless device may apply the third PUSCH-Config for the supplemental uplink (e.g., the second uplink carrier) of the first cell. The wireless device may receive a second DCI, based on a single carrier scheduling, comprising a third resource assignment of the second uplink carrier. In determining one or more second DCI fields and/or one or more second values carried over the one or second more DCI fields, the wireless device may apply the second PUSCH-Config for the second uplink carrier of the second cell. The wireless device may determine the second PUSCH-Config or the third PUSCH-Config, for the second uplink carrier, to determine one or more values of one or more DCI fields of a DCI format based on whether the DCI format is for a single-carrier scheduling or a multi-carrier scheduling.

In an example, the first DCI may comprise a DCI field of a BWP index. The first DCI is for scheduling uplink resources. For example, the first DCI may also comprise a DCI field of UL/SUL indicator. The wireless device may apply one or more DCI fields of the first DCI on the first resource. The UL/SUL indicator indicates the first uplink carrier. The wireless device may apply the one or more DCI fields of the first DCI on the second resource. The UL/SUL indicator indicates the supplemental uplink carrier/the second uplink carrier. For example, a RV field of the one or more DCI fields may indicate whether the indicated RV is mapped either the first resource or the second resource based on the UL/SUL indicator. The wireless device may apply the indicated BWP index for the first uplink carrier (UL) or the second uplink carrier (SUL) based on the UL/SUL indicator. In response to being configured with the multi-carrier scheduling, the wireless device may apply a repetition of a scheduled TB for the second uplink carrier and apply the scheduled TB for the first uplink carrier in response to the UL/SUL indicator indicates the UL. In response to being configured with the multi-carrier scheduling, the wireless device may apply a repetition of a scheduled TB for the first uplink carrier and apply the scheduled TB for the second uplink carrier in response to the UL/SUL indicator indicates the SUL.

In an example, the second downlink carrier may be configured as a supplemental downlink of the first cell. The second downlink carrier may be configured as a normal downlink for the second cell. The second downlink carrier may be configured with one or more coresets. The wireless device may receive one or more DCIs via the one or more coresets scheduling the second cell. The second downlink carrier may be configured with one or more second coresets. The wireless device may receive one or more second DCIs via the one or more second coresets scheduling the first downlink carrier and the second downlink carrier (or the first cell and the second cell). Embodiments may increase a reliability of a TB via a repeated transmission of an UL and a SUL carrier associated with a cell.

In an example, a base station may not enable a multi-carrier scheduling. The base station may transmit a first DCI comprising a resource assignment for a transport block, based on a HARQ process number, via an uplink carrier of a first cell. The base station may transmit a second DCI comprising a second resource assignment for the transport block, based on the HARQ process number, via a supplemental uplink carrier of the first cell. The wireless device may receive the first DCI and the second DCI in a slot of a second cell. The second cell is a scheduling cell for the first cell. The wireless device may transmit a first RV of the transport block via a first resource of the uplink carrier indicated by the resource assignment. The wireless device may transmit a second RV of the transport block via a second resource of the supplemental uplink carrier indicated by the second resource assignment. Similarly, a wireless device may be configured with a supplemental downlink carrier for a downlink carrier of a third cell. The wireless device may receive a third DCI scheduling a third RV of a second TB via the downlink carrier. The wireless device may receive a fourth DCI scheduling a fourth RV of the second TB via the supplemental downlink carrier. The wireless device may combine the third RV of the TB and the fourth RV of the RB, in response to receiving the third DCI and the fourth DCI. The base station may transmit one or more configuration parameters to enable a repeated transmission of a TB via the uplink carrier and the supplemental uplink carrier (or via the downlink carrier and the supplemental downlink carrier). The one or more configuration parameters may comprise a RNTI, used for the first DCI and/or the second DCI. The one or more configuration parameters may comprise one or more HARQ processes, used for the first DCI and/or the second DCI. The one or more configuration parameters may comprise one or more search spaces, and/or one or more coresets, and/or one or more BWPs of the second cell, where the wireless device may receive the first DCI and/or the second DCI.

In an example, a base station may transmit configuration parameters indicating a supplemental downlink carrier for a first cell, additionally a downlink carrier of the first cell. The base station may transmit a first DCI comprising a first resource of the downlink carrier for a TB based on a first RV. The base station may transmit a second DCI comprising a second resource of the supplemental downlink carrier for the TB based on a second RV. The first DCI and the second DCI may be based on a non-fallback DCI format such as DCI format 1_1. The non-fallback DCI format (e.g., DCI format 1_1) may comprise a DL/SDL indicator, similar to a UL/SUL indicator. A fallback DCI format such as DCI format 1_0 may not comprise the DL/SDL indicator. The wireless device may assume that one or more DCIs based on the fallback DCI format may schedule resources of the downlink carrier. The wireless device may determine the first DCI or the second DCI based on the DL/SDL indicator. One or more configuration parameters for transmission of a PDSCH via the supplemental downlink carrier may be configured separately from one or more second configuration parameters of transmission of a second PDSCH via the second downlink carrier. The second downlink carrier of the second cell may be configured as the supplemental downlink carrier of the first cell.

In an example, the base station may transmit one or more MAC CEs and/or one or more DCIs to activating the supplemental downlink carrier. For example, a reserved bit of existing SCell activation/deactivation MAC CEs may indicate to enable or disable the supplemental downlink carrier.

For example, when the downlink carrier and the supplemental downlink carrier may transmit a single TB based on a first DCI and a second DCI, the wireless device may expect PDSCH transmission for a TB on the serving cell may overlap in time domain. For example, the base station may transmit configuration parameters indicating enabling a repetition of a TB across the downlink carrier and the supplemental downlink carrier of the first cell. For example, the configuration parameters may comprise/indicate a parameter of carrier-diversity. For example, the configuration parameters may comprise/indicate a parameter of a carrier-repetition. For example, the configuration parameters may comprise/indicate a parameter of a multi-carrier-diversity. For example, the base station may transmit configuration parameters indicating a parameter of a supplemental downlink repetition. When the parameter is configured or the repetition across DL/SDL is enabled, the wireless device may expect to receive PDSCH transmission(s) via the downlink carrier and the supplemental downlink carrier for a TB of the first cell. For example, for the wireless device with two downlink carriers of the first cell without being configured/enabled with the repetition across the carrier, the wireless device may not expect to be scheduled with PDSCH for a TB on the first cell via a different downlink carrier than a downlink carrier used for the PDSCH initial transmission of that TB. The wireless device may expect to receive the PDSCH of the TB via the different downlink carrier than the downlink carrier used for the PDSCH initial transmission of that TB. The wireless device is configured/enabled with the repetition across the carriers. When the wireless device is enabled with the repetition across carriers, the wireless device may expect that a first PDSCH of a TB via the downlink carrier and a second PDSCH of the TB via the supplemental downlink carrier may overlap in time.

Similarly, for an uplink transmission, when a wireless device is configured/enabled with a repetition across a plurality of uplink carriers, the wireless device may expect to transmit a first PUSCH of a TB via an uplink carrier and a second PUSCH of the TB via a supplemental uplink carrier. The first PUSCH and the second PUSCH may overlap in time. Embodiments may increase a reliability of a TB via a repeated/simultaneous transmission of an UL and a SUL carrier associated with a cell.

In an example, a base station may transmit configuration parameters indicating a first uplink panel and a second uplink panel. The first panel and the second panel may be associated with a first cell. The configuration parameters may comprise/indicate a multi-panel (or a multi-carrier) scheduling. A DCI indicating a first resource via the first uplink panel and a second resource via the second uplink panel. The DCI may comprise a HARQ process identifier of a transport block. The wireless device may transmit a first RV of the TB via the first uplink panel and the wireless device may transmit a second RV of the TB via the second uplink panel. The wireless device may be configured with a first repetition number of the TB via the first uplink panel via RRC signaling, MAC CE and/or DCI signaling. The wireless device may be configured with a second repetition number of the TB via the second uplink panel via RRC signaling, MAC CE and/or DCI signaling. In response to receiving the DCI, the wireless device may transmit one or more PUSCHs of the TB (e.g., based on repetition) via the first uplink panel. The wireless device may transmit one or more second PSCHs of the TB (e.g., based on repetition) via the second uplink panel.

In an example, a base station may transmit configuration parameters indicating a first transmission and reception point (TRP) and a second TRP. The first TRP and the second TRP may be associated with a second cell. The configuration parameters may comprise/indicate a multi-TRP (or a multi-carrier) scheduling. The first TRP and the second TRP (e.g., based on a multi-TRP scheduling) may be used for downlink and/or uplink signals. A second DCI indicating a first resource via the first TRP and a second resource via the second TRP. The second DCI may comprise a HARQ process identifier of a transport block. The wireless device may receive a first RV of the TB via the first TRP and the wireless device may receive a second RV of the TB via the second TRP. The wireless device may be configured with a first repetition number of the TB via the first TRP and/or a second repetition number of the TB via the second TRP via RRC signaling, MAC CE and/or DCI signaling.

Figure 21:
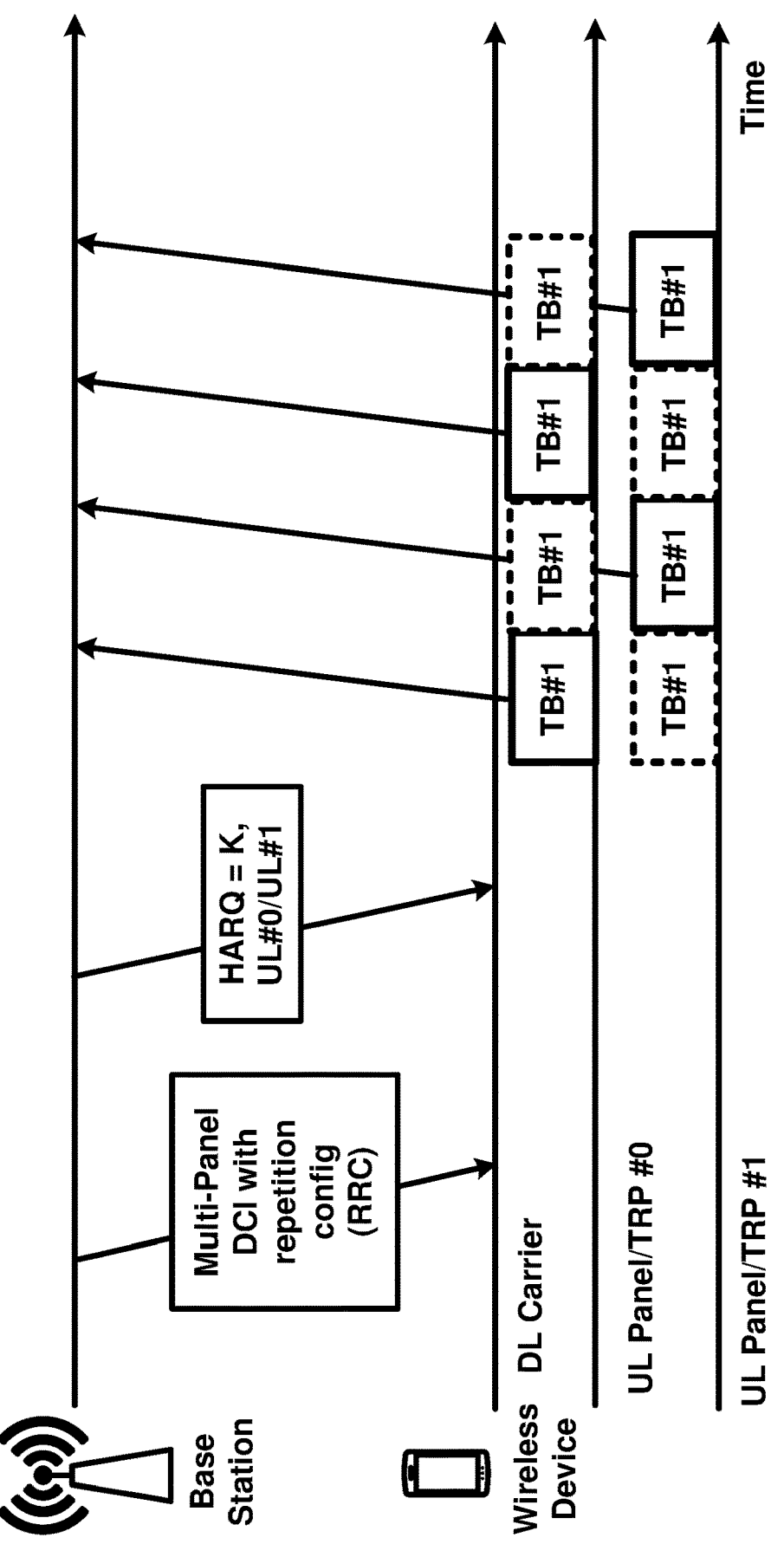
FIG. 21 illustrates a scenario of a multi-panel or a multi-TRP as per an aspect of an embodiment of the present disclosure.

FIG. 21 illustrates a scenario of a multi-panel or a multi-TRP as per an aspect of an embodiment of the present disclosure. The base station may transmit configuration parameters indicating a multi-panel (or a multi-TRP) scheduling (e.g., multi-panel DCI with repetition config) across/via a first uplink panel or a first TRP (e.g., UL Panel/TRP #0) and a second uplink panel or a second TRP (e.g., UL Panel/TRP #1). The base station transmits a DCI comprising a HARQ process indicator (HARQ=K). The DCI may indicate first resource(s) via the first uplink panel and second resource(s) via the second uplink panel. For example, the DCI may indicate a first repetition number via the first uplink panel and a second repetition number via the second uplink panel. For example, FIG. 21 illustrates two repetitions for the first uplink panel and two repetitions for the second uplink panel in case the wireless device may switch between the first uplink panel and the second uplink panel. A PUSCH transmission, shown in a dotted lined box in FIG. 21, of the transport block (TB #1) may be skipped when the wireless device may switch between the first uplink panel and the second uplink panel (e.g., a TDM transmission across a plurality of panels). The wireless device may drop the PUSCH transmission shown the in dotted lined box in response to skipping the PUSCH transmission. The wireless device may not transmit the PUSCH transmission in response to dropping the PUSCH.

The DCI may indicate four repetitions for the first uplink panel and the second uplink panel when the wireless device may transmit data via the first uplink panel and the second uplink panel simultaneously. For example, the wireless device may transmit one or more PUSCHs shown in dotted lined boxes as well as one or more second PUSCHs shown in solid lined boxes. The wireless device may transmit one or more PUSCHs of the transport block shown in dotted lined boxed when the wireless device supports simultaneous transmission via the first uplink panel and the second uplink panel. The wireless device may be indicated with a first repetition number via the first uplink panel and a second repetition number via the second uplink panel. The first repetition number may be different or same to the second repetition number.

The wireless device may transmit a repetition of a transport block via the first panel and the second panel. The wireless device may transmit one or more transport blocks via resources via the first panel and the second panel. For example, the wireless device may transmit a first transport block via resources of the first panel. The wireless device may transmit a second transport block via resources of the second panel.

In an example, a panel may refer a set of antenna arrays. A panel may be a set of reference signals. A panel may be a hardware of a wireless device that the wireless device may enable to activate or deactivate. A panel may comprise one or more beams and/or spatial domain filter parameters. An uplink panel may refer a wireless device's panel used for transmission of uplink signals.

In an example, a TRP may refer a base station hardware component where the TRP may comprise a set of TCI states or reference signals. TRP may be referred as a transmission and reception antenna array.

A similar example, to the example shown in FIG. 21, of a plurality of TRP may be considered. For example, a base station may transmit configuration parameters indicating a first TRP associated with a first cell and a second TRP associated with the first cell to a wireless device. The configuration parameters may comprise/indicate a first coreset pool for the first TRP. The configuration parameters may comprise/indicate a second coreset pool for the second TRP. The base station may transmit a first DCI indicating a first resource assignment of a first resource via the first TRP and a second resource assignment of a second resource via the second TRP via either a first coreset of the first coreset pool and/or a second coreset of the second coreset pool, wherein self-carrier scheduling is configured. The first DCI may indicate one or more first RVs of the TB transmitted via the first TRP and one or more second RVs of the TB transmitted via the second TRP. The first DCI may comprise a frequency domain resource assignment. The frequency domain resource assignment may indicate the first resource and the second resource. The first resource may be same to the second resource in frequency domain. The first DCI may indicate a time domain resource assignment. The time domain resource assignment may indicate the first resource and the second resource. The first resource and the second resource may be same in a time domain. The wireless device may receive a PDSCH via a first TRP in a slot over the first resource/the second resource, wherein each slot over the first resource/the second resource may transmitted via the first TRP and the second TRP in a round robin manner. The wireless device may transmit a PUSCH via/to a first TRP in a slot over the first resource/the second resource, wherein each slot over the first resource/the second resource may be transmitted via/to the first TRP and the second TRP in a round robin manner. In an example, a wireless device may have a separate RF equipment for an uplink panel. Repeated/simultaneous transmission of a TB across a plurality of uplink panels may increase a reliability of the TB.

Note that embodiments in the specification may be applied to various scenarios, for example, across a plurality of cells, across a plurality of (uplink or downlink) carriers, across an uplink carrier and a supplemental uplink, across a downlink carrier and a supplemental downlink carrier, a plurality of panels, a plurality of TRPs, a plurality of coreset pools, a plurality of beams, a plurality of spatial domain filter parameters, and so on.

In an example, a first panel or a first TRP may correspond to one or more reference signals comprising a first reference signal. A second panel or a second TRP may correspond to one or more second reference signals comprising a second reference signal. First resources based on (e.g., associated with, configured with) the first reference signal may be considered as resources associated with a first carrier in the specification. Second resources based on (e.g., associated with, configured with) the second reference signal may be considered as resources associated with a second carrier in the specification. Resources of the first carrier may be referred as resources of the first TRP, first panel or first reference signal. Resources of the second carrier may be referred as resources of the second TRP, second panel or second reference signal.

In an example, a base station may transmit a first DCI. The first DCI may indicate a first resource assignment of one or more first resources via a first uplink carrier and a second resource assignment of one or more second resources via a second uplink carrier. The first DCI may indicate resources of a plurality of carriers. For example, a wireless device may transmit a PUSCH in a slot of the one or more firs resources or of the one or more second resources. The first DCI may indicate a HARQ process identifier of a TB. The first DCI may indicate a first RV applied for the one or more first resources and a second RV applied for the one or more second resources. In response to receiving the first DCI, the wireless device may encode the TB and generate encoded bits of the TB. The wireless device may transmit a RV of the encoded bits via a PUSCH. The wireless device may divide the encoded bits of the TB to K RVs (e.g., K=4). For example, a first segment may correspond to a first RV (RV=0), and a last segment may correspond to RV=3. Based on a RV value, the wireless device may transmit different segment of the encoded bits of the TB. The wireless device may determine a first number of repetitions via the first uplink carrier based on the first DCI. For example, the first DCI may comprise the first number of repetitions. For example, the first DCI may indicate the first number of repetitions via indicating an entry of a time domain resource allocation. The entry may comprise the first number of repetitions. Similarly, the wireless device may determine a second number of repetitions via the second uplink carrier based on the first DCI. The first DCI may comprise the second number of repetitions. The first DCI may indicate the second number of repetitions via the entry of the time domain resource allocation.

Based on the first RV, the wireless device may determine one or more first RV values for one or more first PUSCHs via the first uplink carrier. For example, the wireless device may determine the first RV for a first PUSCH of the one or more first PUSCHs. The wireless device may increment a RV value based on a RV sequence (e.g., select a next RV value next to the first RV) for a second PUSCH of the one or more PUSCHs. The wireless device may apply the RV sequence over the one or more first PUSCHs. For example, the RV sequence may be 0, 2, 3, 1 (RV=0, RV=2, RV=3, RV=1). For example, the first RV is 2. The first PUSCH of the one or more first PUSCH comprises RV=2. The second PUSCH of the one or more P first PUSCHs comprises RV=3, and so on. The wireless device may determine the number of one or more first PUSCHs based on the first number of repetitions. Similarly, the wireless device may determine one or more second RV values for one or more second PUSCHs via the second uplink carrier based on the second RV. For example, the wireless device may determine the second RV based on the first RV. For example, the second RV=the first RV+offset. The offset may be configured by a base station. The second RV may be modulo by K (e.g., K=4) so that a RV is selected from the RV sequence.

The wireless device may transmit the one or more first RVs of the TB via the one or more first PUCHs via the first uplink carrier. The wireless device may transmit the one or more second RVs of the TB via the one or more second PUSCHs via the second uplink carrier. Embodiments of separate RV(s) over an uplink carrier of a TB may not increase a wireless device complexity. The embodiments may increase a reliability of the TB.

Figures 22A, 22B:
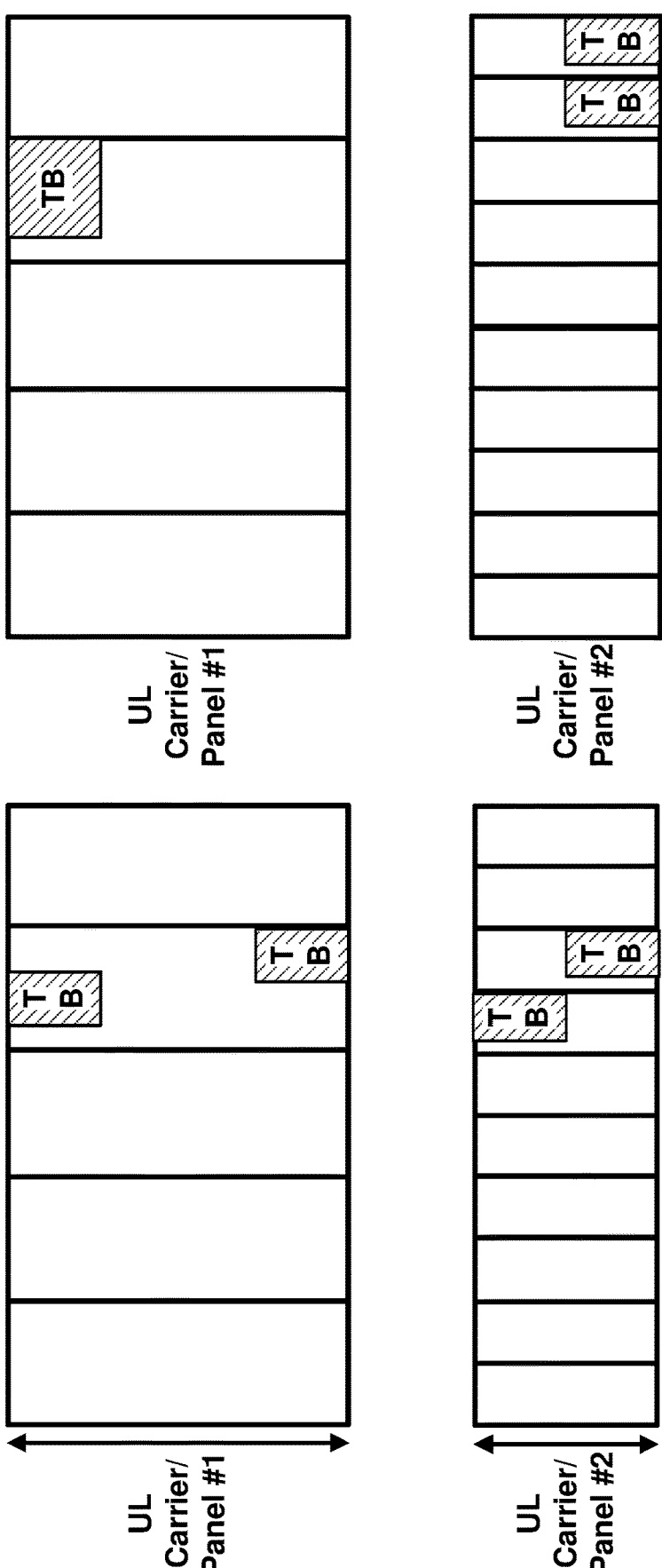
FIG. 22A illustrates an example of mapping redundancy versions (RVs) over a plurality of carriers as per an aspect of an embodiment of the present disclosure.
FIG. 22B illustrates an example of mapping RVs over a plurality of carriers as per an aspect of an embodiment of the present disclosure.

FIG. 22A illustrates an example of mapping one or more first RVs of a TB via a first uplink carrier/panel (UL Carrier/Panel #1) and one or more second RVs of the TB via a second uplink carrier/panel (UL Carrier/Panel #2) as per an aspect of an embodiment of the present disclosure. Note that example embodiments may be also applied via a first TRP (corresponding to the first uplink carrier/panel) and a second TRP (corresponding to the second uplink carrier/panel). For example, the first uplink carrier or the first panel may be associated with a first cell (e.g., Cell 1). The second uplink carrier may be associated with a second cell or may be dedicated as an uplink carrier for the repetition for the first cell. For example, the second uplink carrier may be a paired uplink spectrum. The second panel may be associated with the first cell. The base station may transmit a first DCI indicating a first resource of a PUSCH in a third slot via the first uplink carrier. The first DCI may further indicate second resources of two PUSCHs in 7-th slot and 8-th slot via the second uplink carrier. The wireless device may support simultaneous transmission via the first uplink carrier and the second uplink carrier.

The first DCI may indicate RV=0 for the PUSCH via the first uplink carrier. The first DCI may indicate RV=2 for the two PUSCHs via the second uplink carrier. The wireless device may determine one or more RVs for the second uplink carrier based on a RV sequence (e.g., RV sequence=0, 2, 3, 1). The wireless device may determine a next RV as 3 (a next RV of RV=2) for a second PUSCH of the two PUSCHs. The wireless device may transmit a first PUSCH of RV=0 via the first uplink carrier. The wireless device may perform an intra-slot frequency hopping across the first PUSCH. The intra-slot frequency hopping is enabled for the first PUSCH. The wireless device may transmit a second PUSCH of RV=2 via the second uplink carrier. The wireless device may transmit a third PSCH of RV=3 via the second uplink carrier. The wireless device may not perform an intra-slot hopping for the second PUSCH and the third PUSCH. The wireless device may perform an inter-slot hopping for the second uplink carrier. A first frequency location of the second PUSCH may be different form a second frequency location of the third PUSCH based on the inter-slot hopping.

FIG. 22B illustrates an example of mapping one or more first RVs of a TB via a first uplink carrier/panel (UL Carrier/Panel #1) and one or more second RVs of the TB via a second uplink carrier/panel (UL Carrier/Panel #2) as per an aspect of an embodiment of the present disclosure. The wireless device may not support simultaneous transmission via the first uplink carrier and the second uplink carrier. For example, a second DCI may indicate a first resource of a first PUSCH via the first uplink carrier at fourth slot. The second DCI may further indicate second resources of a second PUSCH and a third PUSCH via the second uplink carrier at 9-th slot and 10-th slot. The second DCI may indicate a first RV=0 and a second RV=2. The wireless device may determine a third RV for the third PUSCH based on the RV sequence. For example, the third RV is 3. The wireless device transmits the first RV=0 of a TB via the first PUSCH. In the example, the wireless device may not be configured/indicated with an intra-slot hopping for the first PUSCH. The wireless device may not apply the intra-slot hopping.

The wireless device transmits the second RV=2 via the second PUSCH via the second uplink carrier. The wireless device transmits the third RV=3 via the third PUSCH via the second uplink carrier. The wireless device may not be configured/indicated with an intra-slot hopping nor an inter-slot hopping. The wireless device may determine a second frequency location of the third PUSCH same to a first frequency location of the second PUSCH.

In an example, a base station may transmit a first DCI for a first uplink carrier and a second uplink carrier. The first DCI may indicate a first resource for the first uplink carrier. The first DCI may further indicate a second resource for the second uplink carrier. The first DCI may comprise a HARQ process identifier for a TB. In response to receiving the first DCI, the wireless device may generate encoded bits of the TB. The wireless device may map the encoded bits (e.g., a RV of the encoded bits) across the first resource and the second resource via the first uplink carrier and the second uplink carrier. The wireless device may determine a plurality of RVs of the encoded bits (refer to FIG. 28A-28C). The wireless device may determine RV=0 (e.g., first RV) that comprises systematic bits of the encoded bits. The wireless device may determine or map the plurality of RVs in contiguous parts of the encoded bits as shown in FIG. 28B. A RV may comprise a bitstream or a set of bits. A RV may be a portion of the encoded bits. A RV may comprise contiguous bits of the encoded bits.

For example, the wireless device may transmit a PUSCH across the first uplink carrier and the second uplink carrier. For example, the wireless device may determine a transport block size (TBS) based on the first resource and the second resource. The wireless device may determine a first number of resource elements of the first resource and a second number of resource elements of the second resource. The wireless device may determine the TBS based on a sum of the first number of resource elements and the second number of resource elements. The wireless device may map the RV of the encoded bits across the first resource and the second resource. The wireless device may map the RV based on a rule. For example, the wireless device may determine a first resource element (RE) from resource elements of the first resource and resource elements of the second resource based on a lowest frequency location and an earliest timing. The wireless device may determine a second RE. The second RE is a next (available) RE in frequency domain from the first RE. The wireless device may map the RV in a first OFDM symbol of the first resource and the second resource from a first RE of a lowest (or highest) frequency location to a second RE of a highest (or lowest) frequency location RE, and then move to a next OFDM symbol. For example, the wireless device may determine resource in an order of time first (map early resource first) and frequency second in a same time domain resource.

For example, the wireless device may determine the OFDM symbol based on a first subcarrier spacing of the first uplink carrier and a second subcarrier spacing of the second uplink carrier. For example, the wireless device may determine the OFDM symbol based on a smaller subcarrier spacing between the first subcarrier spacing and the second subcarrier spacing. For example, the first uplink carrier may have the smaller subcarrier spacing. The wireless device may map data over N symbols of the second uplink carrier corresponding to a OFDM symbol of the first uplink carrier, before moving to the next OFDM symbol, wherein N is determined based on the first subcarrier spacing and the second subcarrier spacing. For example, when the second subcarrier spacing is 4 times of the first subcarrier spacing, N is 4 (e.g., the second subcarrier spacing=N*the first subcarrier spacing). Embodiments of a mapping across a plurality of carriers may increase a reliability and a gain of a frequency diversity.

FIG. 23A illustrates an example of data mapping across a plurality of carriers as per an aspect of an embodiment of the present disclosure. The wireless device may support simultaneous transmission across the plurality of carriers. FIG. 23A/23B show similar scenario as to FIG. 22A/22B. For example, four OFDM symbols are allocated via the first uplink carrier (UL #1). Two of four OFDM symbols in each slot over two slots are allocated via the second slot. The base station may enable an intra-slot hopping for the first uplink carrier and an inter-slot hopping for the second uplink carrier. The wireless device may map encoded bits of a TB starting from the first uplink carrier wherein the first uplink carrier has a lower frequency than the second uplink carrier. The wireless device may map based on a frequency first and a time second rule (e.g., first map across different frequency resources in a same time domain resource, and then map across different time domain resources).

The wireless device may select REs in a first OFDM symbol based on a subcarrier of the first uplink carrier (as the first uplink carrier has smaller subcarrier spacing than the second carrier). The wireless device may map the encoded bits (or a RV of the encoded bits) in the first ODM symbol REs starting from a lowest frequency RE. For example, an arrow in FIG. 23A shows a mapping sequence of an OFDM symbol. The wireless device may start from the first uplink carrier and map over a first OFDM symbol of the four symbols. Then, the wireless device may move to the second uplink carrier, and map two OFDM symbols as two OFDM symbols of the second uplink carrier map to a single OFDM symbol of the first uplink carrier. Next, the wireless device moves back to the first uplink carrier and move to a next OFDM symbol. The wireless device may map across a first frequency region of the first uplink carrier in each OFDM symbol, then may move to the second uplink carrier and map across a second frequency region of the second uplink carrier in every two OFDM symbols. The example shows that a second subcarrier spacing of the second uplink carrier is twice of the subcarrier spacing of the first uplink carrier. The wireless device may continue mapping across the first uplink carrier and the second uplink carrier based on the frequency first and the time second rule.

The wireless device may map a single PUSCH across a plurality of slots of the second uplink carrier where a mapping granularity of a PUSCH may be determined based on the first uplink carrier or an uplink carrier with a smaller subcarrier spacing. The wireless device may be configured with a first overhead applied for the first resource of the first uplink carrier. The wireless device may be configured with a second overhead applied for the second resource of the second uplink carrier. The wireless device may use the first overhead and the second overhead in determining the TBS of the TB. The wireless device may transmit the single PUSCH via the plurality of the slots of the second uplink carrier.

FIG. 23B illustrates an example of a data mapping (e.g., a RV) wherein the wireless device may not support a simultaneous transmission as per an aspect of an embodiment of the present disclosure. The wireless device is scheduled with four OFDM symbols of the first uplink carrier and two of four OFDM symbols of the second uplink carrier across two slots. The wireless device may map the encoded bits starting from the first carrier of a slot then move to the second uplink carrier. The wireless device may map the encoded bits the slot of the first uplink carrier and the slots of the second uplink carrier.

In an example, a wireless device may receive a DCI indicating a first time domain resource that is associated with a first coreset pool (e.g., a first TRP) of a cell. The DCI may further indicate a second time domain resource that is associated with a second corset pool (e.g., a second TRP) of the cell. For example, the second time domain resource may occur after the first time domain resource. The wireless device may encode a transport block to a bit stream (e.g., encoded bits) where the bit stream may comprise a plurality of redundancy versions (RVs) for a HARQ process. The wireless device may map an RV of the RVs to a PUSCH in order of the first time domain resource and the second time domain resource. The wireless device may transmit the PUSCH via the first time domain resource associated with the first coreset pool and the second time domain resource associated with the second coreset pool.

The first time domain resource may be associated with the first coreset pool in response to the first time domain resource being configured with a first TCI state of the first coreset pool. The second time domain resource may be associated with the second coreset pool in response to the second time domain resource being configured with a second TCI state of the second coreset pool. The first TCI state may correspond to a first carrier and the second TCI state may correspond to a second carrier. The first carrier of a cell may be associated with the first coreset pool/first TRP. The second carrier of the cell may be associated with the second coreset pool/second TRP.

In an example, a base station may transmit a first DCI indicating a first frequency domain resource assignment for a first uplink carrier and a second frequency domain resource assignment for a second uplink carrier to schedule a transport block based on a HARQ process identifier. For example, a base station may transmit configuration parameters indicating a resource allocation type 0 for the first uplink carrier. The configuration parameters may comprise/indicate the resource allocation type 0 for the second uplink carrier. The configuration parameters may comprise/indicate a same resource allocation type for the first uplink carrier and the second uplink carrier. The configuration parameters may comprise/indicate a resource allocation type. The resource allocation type may be applied to both the first uplink carrier and the second uplink carrier. The configuration parameters may comprise/indicate a parameter of either Configuration 1 or Configuration 2 for a rbg-Size determination. The wireless device may determine a first rbg-Size of the first uplink carrier based on the parameter and a bandwidth of an active uplink BWP of the first uplink carrier. The wireless device may determine a second rbg-Size of the second uplink carrier based on the first rbg-Size.

For example, a first active UL BWP of the first uplink carrier may have a bandwidth of 100 RBs. A second active UL BWP of the second uplink carrier may have a bandwidth of 50 RBs. Based on, e.g., Configuration 1, the wireless device may determine the first rbg-Size as 8 based on a determination rule. The wireless device may determine the second rbg-Size as 8 based on the first rbg-Size. For example, the wireless device may determine a rbg-Size of a bandwidth 50 RBs based on Configuration 1 as 4 based on the determination rule. The wireless device may determine the second rbg-Size. The second rbg-Size may be different from the rbg-Size determined based on the determination rule.

In an example, the DCI may comprise a frequency domain resource allocation field. A value of the frequency domain resource allocation field may be applied for both the first uplink carrier and the second uplink carrier. For example, a resource allocation type may be configured as the resource allocation type 0, based on a bitmap of one or more RBGs. The wireless device may determine a size of the frequency domain resource allocation field based on the first rbg-Size, a first bandwidth of the first active UL BWP of the first uplink carrier and a second bandwidth of the second active UL BWP of the second uplink carrier. For example, the wireless device may determine the size based on a larger bandwidth between the first bandwidth and the second bandwidth. The wireless device may apply a bit of the bitmap of the frequency domain resource allocation field may indicate whether a first RBG of the first uplink carrier and a second RBG of the second uplink carrier, corresponding to the bit of the bitmap, are allocated.

In an example, the DCI may comprise a first frequency domain resource allocation field for the first uplink carrier and a second frequency domain resource allocation field for the second uplink carrier. The wireless device may apply the first frequency domain resource allocation field to determine a frequency resource of the first uplink carrier. The wireless device may apply the second frequency domain resource allocation field to determine a second frequency resource of the second uplink carrier. The wireless device may determine a TBS based on the resource of the first uplink carrier. The wireless device may determine the TBS based on a UL/SUL field of the DCI. For example, the UL/SUL may indicate the UL, the wireless device may determine the TBS based on the first uplink carrier. For example, the UL/SUL may indicate the SUL, the wireless device may determine the TBS based on the second uplink carrier. For example, the wireless device may apply an overhead parameter configured for the second uplink carrier to determine the TBS, in response to being based on the second uplink carrier.

In an example, a base station may transmit configuration parameters indicating a resource allocation type 1 for an uplink transmission. The configuration parameters may comprise/indicate the resource allocation type 1 for a first uplink carrier and a second uplink carrier. For example, a wireless device may apply the resource allocation type 1 for both the first uplink carrier and the second uplink carrier. The base station may transmit a DCI comprising a field (e.g., a frequency domain resource assignment) indicating a RIV (resource indicator/allocation value). The RIV may indicate a starting RB index and a length (e.g., number of RBs) in a frequency domain. Based on the RIV, the wireless device may determine a first starting RB index and a first length of the first uplink carrier based on a first bandwidth of a first active UL BWP of the first uplink carrier. Based on the RIV, the wireless device may determine a second starting RB index and a second length of the second uplink carrier based on a second bandwidth of a second active UL BWP of the second uplink carrier. For example, for an uplink carrier (e.g., each uplink carrier) of the first uplink carrier and the second uplink carrier, the wireless device may determine the RIV=bandwidth (length−1)+starting RB index. The bandwidth is the first bandwidth, the length is the first length and the starting RB index is the first starting RB index for the first uplink carrier; and the bandwidth is the second bandwidth, the length is the second length and the starting RB index is the second starting RB index for the second uplink carrier. Based on independent applying the RIV to an uplink carrier of the first uplink carrier and the second uplink carrier, the wireless device may determine a first number of RBs for the first uplink carrier and a second number of RBs for the second uplink carrier. The first number may be same or different from the second number. The indicated RIV value may be applied in each carrier based on parameters of the carrier.

In an example, the wireless device may determine the first starting RB index and the first length based on the RIV for the first uplink carrier. The wireless device may determine the second RB index and the second length based on the first starting RB index and the first length. For example, the wireless device may determine the second RB index as the first starting RB index. In an example, an RB index=0 of the first carrier may start from a lowest frequency resource block of the first active UL BWP of the first carrier. In an example, an RB index=0 of the second carrier may start from a lowest frequency resource block of the second active UL BWP of the second carrier. A first RB of the second active UL BWP of the second carrier has an index value of zero.

The wireless device may determine the second length same to the first length. The wireless device may determine a same number of RBs in the first uplink carrier and the second uplink carrier. For example, the wireless device may determine the second starting RB index same as the first starting RB index. The wireless device may determine the second length based on the first length and a first numerology of the first active UL BWP and a second numerology of the second active UL BWP. For example, the wireless device may determine the second length=floor (the first length/K), wherein the second numerology=the first numerology*K. The wireless device may determine a similar number of resource elements between the first uplink carrier and the second uplink carrier based on a scaling of a frequency domain resource allocation according to a ratio of numerologies/subcarrier spacings. The wireless device may determine a first time domain resource of the first uplink carrier and a second time domain resource of the second uplink carrier such that the first time domain resource may be fully overlapped with the second time domain resource.

In an example, a base station may transmit configuration parameters indicating a first PUSCH-Config for the first active UL BWP of the first uplink carrier associated with a first cell. The configuration parameters may comprise/indicate a second PUSCH-Config for the second active UL BWP of the second uplink carrier. A wireless device may apply one or more configuration parameters of the second PUSCH-Config for a multi-carrier scheduling/repetition. The configuration parameters may comprise/indicate a third PUSCH-Config for the second active UL BWP. The second uplink carrier may be associated with a second cell as a normal uplink carrier. The base station may not configure the second PUSCH-Config. The wireless device may follow one or more configuration parameters of the first PUSCH-Config when the base station may not configure the second PUSCH-Config. The wireless device may expect to have one or more second parameters of the second PUSCH-Config aligned with the one or more configuration parameters of the first PUSCH-Config. For example, the wireless device may expect to receive a same resource allocation type indicated via the first PUSCH-Config and the second PUSCH-Config. The base station may skip configuring one or more third configuration parameters for the second PUSCH-Config, for example, the base station may skip configuration of a resource allocation type for the second PUSCH-Config. The wireless device may determine values of the one or more third configuration parameters of the second PUSCH-Config based on the first PUSCH-Config.

In an example, a base station may transmit configuration parameters indicating a first plurality of uplink BWPs for a first uplink carrier. The configuration parameters may comprise/indicate a second plurality of uplink BWPs for a second uplink carrier. The base station may transmit a first DCI, based on a multi-carrier scheduling. The first DCI may comprise a BWP index. In response to receiving the first DCI, a wireless device may switch to an indicated BWP of the first plurality of uplink BWPs by the BWP index for the first uplink carrier. The wireless device may determine a second BWP of the second plurality of uplink BWPs based on the indicated BWP. The configuration parameters may comprise/indicate a mapping between each of the first plurality of uplink BWPs and each of the second plurality of uplink BWPs. The wireless device may determine the second BWP based on the mapping. For example, the wireless device may determine the second BWP. The second BWP may be mapped to the indicated BWP of the first uplink carrier.

In an example, the configuration parameters may comprise/indicate a frequency offset. The wireless device may apply the frequency offset to determine a starting RB based on a frequency domain resource assignment field. For example, the wireless device may determine the starting RB of the second active UL BWP of the second uplink carrier as a starting RB of the first active UL BWP of the first uplink carrier+the frequency offset (e.g., the frequency offset may be a gap between the starting RB and an actual starting RB of the second active UL BWP of the second carrier).

In an example, the wireless device may determine a field size of a frequency domain resource assignment field based on a sum of the first bandwidth of the first active UL BWP of the first uplink carrier and the second bandwidth of the second active UL BWP of the second uplink carrier. The wireless device may determine a number of RBGs over the sum. The resource allocation type 0 is configured. The wireless device may determine a bit size of RIVs wherein the resource allocation type 1 is configured.

In an example, the wireless device may determine a field size of a frequency domain resource assignment field based on a sum of a first bandwidth (or a first number of RBGs) of a first UL BWP of the first uplink carrier and a second bandwidth (or a second number of RBGs) of a second UL BWP of the second uplink carrier. In an example, the wireless device may determine a field size of a frequency domain resource assignment field based on a larger value between a first bandwidth (or a first number of RBGs) of a first UL BWP of the first uplink carrier and a second bandwidth (or a second number of RBGs) of a second UL BWP of the second uplink carrier. For example, the first UL BWP may be one of one or more first UL BWPs of the first carrier. The first UL BWP may have a largest (or smallest) bandwidth among the one or more first UL BWPs. The first bandwidth may be determined based on a largest bandwidth of the one or more first UL BWPs of the first uplink carrier. For example, the second UL BWP may be one of one or more second UL BWPs of the second carrier. The second UL BWP may have a largest (or smallest) bandwidth among the one or more second UL BWPs. The second bandwidth may be determined based on a largest bandwidth of the one or more second UL BWPs of the second uplink carrier.

The wireless device may determine a number of RBGs over the sum of the first bandwidth and the second bandwidth (e.g., a total RBs of the first UL BWP and the second UL BWP) when the resource allocation type 0 is configured. A bandwidth may refer a number of RBs. The wireless device may determine a bit size of RIVs based on the sum of the first bandwidth and the second bandwidth (e.g., a total RBs of the first UL BWP and the second UL BWP) when the resource allocation type 1 is configured.

Figure 24:
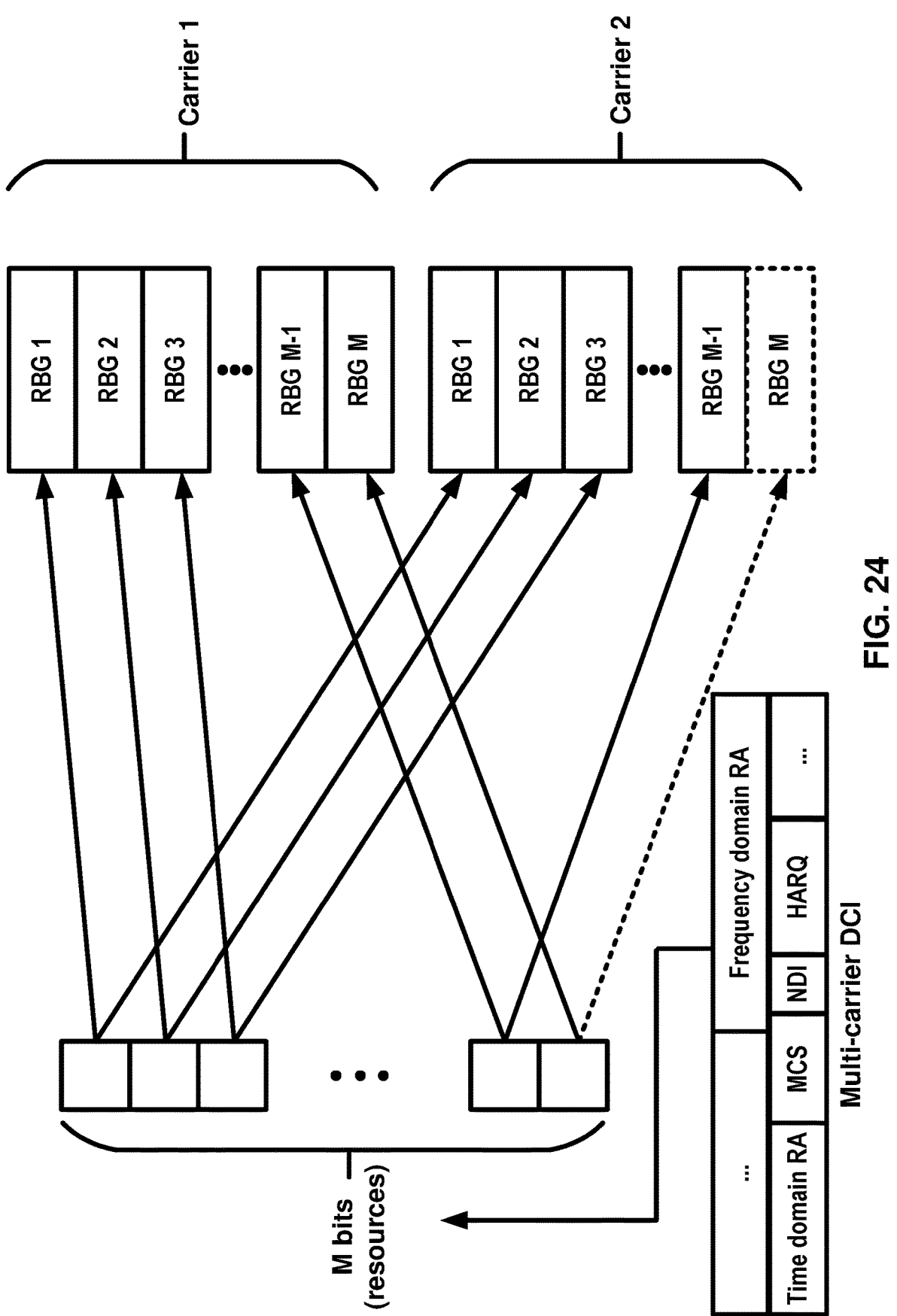
FIG. 24 illustrates an example of a duplicate indication of a frequency domain resource assignment field of a DCI as per an aspect of an embodiment of the present disclosure.

FIG. 24 illustrates an example of a duplicate indication of a frequency domain resource assignment field of a DCI as per an aspect of an embodiment of the present disclosure. For example, the base station may transmit a first DCI comprising a first frequency domain resource assignment, for example based on a resource allocation type 0, indicating a first resource of a first uplink carrier and a second resource of a second uplink carrier. a bit of a bitmap used for the resource allocation type 0 may indicate a first RBG of the first uplink carrier and a second RBG of the second uplink carrier. N-th bit of the bitmap may indicate whether N-th RBG of a first active UL BWP of the first uplink carrier and N-th RBG of a second active UL BWP of the second uplink carrier. The wireless device may determine a size of a bitmap for the first frequency domain resource assignment field (M bits shown in FIG. 24) based on a rbg-Size of the first active UL BWP of the first uplink carrier and a first bandwidth of the first active UL BWP and second bandwidth of the second active UL BWP. For example, the first active UL BWP may have M RBGs. An RBG may comprise the rbg-Size RBs. The second active UL BWP may have K RBGs. An RBG may comprise the rbg-Size RBs. K may be smaller than M. The wireless device may determine the size of the bitmap as M, a larger value between M and K. A bit of the bitmap may indicate a RBG of the first uplink carrier and the second uplink carrier. For example, as shown in FIG. 24, a first bit of the bitmap may indicate a first RBG of the first uplink carrier (carrier 1) and a first RBG of the second uplink carrier (carrier 2). For example, M-th bit of the bitmap may indicate M-th RBG of the first uplink carrier. The second uplink carrier may not comprise M-th RBG, wherein only the M-th RBG of the first uplink carrier may be allocated in response to being indicated as '1' in the M-th bit of the bitmap. For example, embodiments of sharing a frequency domain resource assignment field value among a plurality of carriers based on a DCI may reduce a DCI overhead. In the specification, a carrier may represent an active BWP or a BWP of the carrier (e.g., a first active BWP of the first carrier (carrier 1) and a second active BWP of the second carrier (carrier 2)). RBGs may be formed within an active BWP of the carrier.

Figure 25:
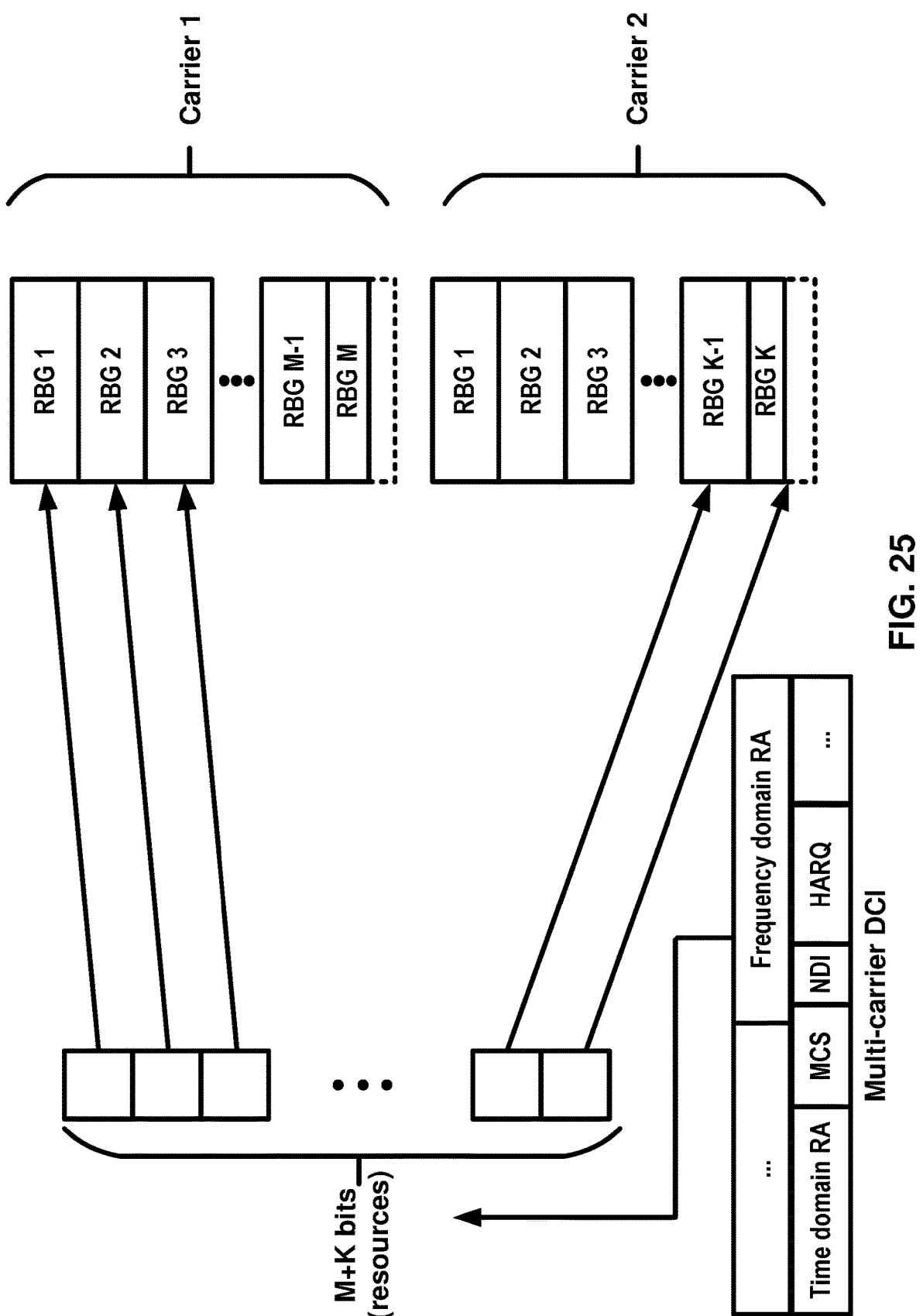
FIG. 25 illustrates an example of an extended frequency domain resource allocation field as per an aspect of an embodiment of the present disclosure.

FIG. 25 illustrates an example of an extended frequency domain resource allocation field as per an aspect of an embodiment of the present disclosure. For example, a DCI, based on a multi-carrier scheduling, may comprise a frequency domain resource assignment field. A size of a bitmap for the frequency domain resource assignment field may be determined based on a sum of a first number (M) of RBGs of a first uplink carrier (Carrier 1) and a second number (K) of RBGs of a second uplink carrier (Carrier 2). For example, M-th RBG may have a smaller number of RBs than a rbg-Size RBs. The wireless device may determine RBGs of the first uplink carrier and the second uplink carrier based on the rbg-Size. The size of the bitmap may be M+K bits. A first bit to M−1 th bit of the bitmap may indicate M RBGs of the first link carrier. M-th bit to M+K−1 th bit of the bitmap may indicate K RBGs of the second uplink carrier.

By extending the bitmap across the first uplink carrier and the second uplink carrier, the base station may flexibly schedule resource blocks from both the first uplink carrier and the second uplink carrier. For example, the base station may transmit configuration parameters indicating a first rbg-Size for the first uplink carrier, where M is determined based on the first rbg-Size and a first bandwidth of a first active UL BWP of the first uplink carrier. The configuration parameters may comprise/indicate a second rbg-Size for the second uplink carrier, where K is determined based on the second rbg-Size and a second bandwidth of a second active UL BWP of the second uplink carrier. In an example, the wireless device may determine a rbg-Size based on a total bandwidth that is a sum of a first bandwidth of the first uplink carrier and a second bandwidth of the second uplink carrier. For example, the rbg-Size may be equal to or larger than the first rbg-Size and the second rbg-Size. The rbg-Size may be determined based on the total bandwidth, that may lead a larger rbg-Size compared to individual rbg-Size determined for each carrier. For example, embodiments of extending a frequency domain resource assignment field value to cover resources across a plurality of carriers based on a DCI may increase a resource allocation flexibility.

In an example, a base station may transmit to a wireless device configuration parameters for one or more cells. Configuration parameters may indicate one or more time domain resource allocation tables (TDRA-tables). A TDRA-table of the one or more TDRA-tables may comprise one or more rows (entries) of time domain resource allocations (TDRAs). An i-th row (entry) of a TDRA-table may be represented as TDRA-i or i-th TDRA entry. A TDRA entry of the TDRA-table (e.g., TDRA-i, a row of the TDRA-table) may comprise a scheduling/slot offset (K0 for a downlink, K2 for an uplink), a data mapping type (a PDSCH mapping type for the downlink, a PUSCH mapping type for the uplink), and a SLIV (startSymbolAndLength indicator value). The TDRA entry may comprise one or more SLIV values, where each of the one or more SLIV values may correspond to a transport block or a channel (e.g., PDSCH, PUSCH).

In an example, the configuration parameters may indicate a first TDRA-table for a multi-carrier scheduling, used for scheduling an uplink transport block for a first uplink BWP of a first uplink carrier. The configuration parameters may indicate the first TDRA-table for a second uplink BWP of a second uplink carrier. A DCI, based on the multi-carrier scheduling, may schedule resources for the first uplink carrier and the second uplink carrier. The first uplink BWP is an active BWP of the first uplink carrier and the second uplink BWP is an active BWP of the second uplink carrier. In an example, the base station may not configure the first TDRA-table for the second uplink BWP. A wireless device may use the first TDRA-table configured for the first uplink BWP for the DCI based on the multi-carrier scheduling. For example, a TDRA entry of the first TDRA-table may comprise a scheduling offset (e.g., K2), a PUSCH mapping type and a SLIV. The TDRA entry may comprise one or more SLIV values, where each of the one or more SLIV values may correspond to a transport block or a channel (e.g., PDSCH, PUSCH).

In utilizing the first TDRA-table for the first uplink carrier and the second uplink carrier, the wireless device may determine a numerology/subcarrier spacing for interpreting the first TDRA-table. For example, the wireless device may be configured with a first numerology for the first uplink BWP and a second numerology for the second uplink BWP. The configuration parameters may indicate a same cyclic prefix (CP) for the first numerology and the second numerology. The configuration parameters may indicate a first subcarrier spacing for the first numerology and a second subcarrier spacing for the second numerology. The base station and the wireless device may determine a smaller subcarrier spacing between the first subcarrier spacing and the second subcarrier spacing. The base station and the wireless device may use the determined subcarrier spacing for the first TDRA-table. For example, the wireless device may determine the second subcarrier spacing of the second uplink carrier as the smaller subcarrier spacing. The wireless device may determine/interpret an entry of the first TDRA-table based on the second subcarrier spacing. For example, the first subcarrier may be two times or four times of the second subcarrier spacing. One slot of the second subcarrier spacing/numerology may correspond to two slots or four slots of the second subcarrier spacing/numerology. Based on the second numerology, one or more TDRA entries of the first TDRA-table may span more than one slot of the first uplink BWP/the first uplink carrier. For example, embodiments of sharing a time domain resource assignment field value among a plurality of carriers based on a DCI may reduce a DCI overhead.

Figure 26:
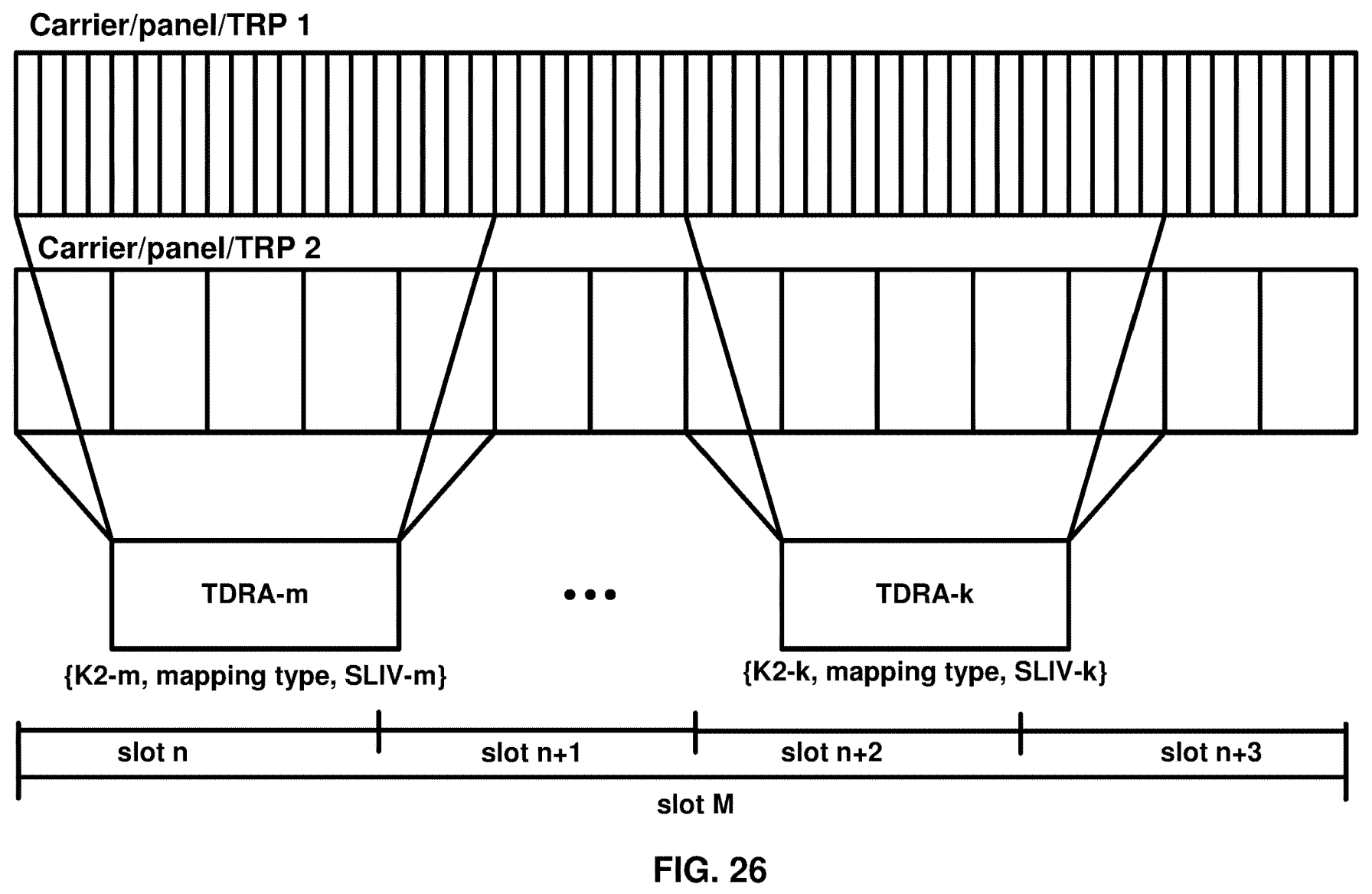

FIG. 26 illustrates an example of a TDRA-table applied for a first uplink carrier/panel/TRP (Carrier/panel/TRP 1) and a second uplink carrier/panel/TRP (Carrier/panel/TRP 2) as per an aspect of an embodiment of the present disclosure. For example, the TDRA-table comprise two entries (TDRA-m and TDRA-k). TDRA-m is a m-th row of the TDRA-table and TDRA-k is a k-th row of the TDRA-table. A row of the TDRA table may comprise a scheduling offset (K2) between a DCI and a scheduled PUSCH, a PUSCH mapping type (mapping type), and a SLIV. For example, a first numerology of the first uplink carrier may be 60 kHz subcarrier spacing with a normal CP. A second numerology of the second uplink carrier may be 15 kHz subcarrier spacing with the normal CP. For example, the first uplink carrier may operate in a frequency range 2. The second uplink carrier may operate in a frequency range 1. For example, FIG. 26 illustrates a slot for the second uplink carrier (slot M). The slot M may overlap with four slots of the first uplink carrier (slot n to slot n+3). For example, the base station may transmit a first DCI comprising a time domain resource allocation field indicating m-th entry of the TDRA-table at a slot n−5 via a downlink carrier. The downlink carrier and the first uplink carrier are associated with a first cell. The second uplink carrier may be associated with the first cell as a supplemental uplink carrier, or the second uplink carrier may be associated with a second cell as a normal uplink carrier or the second uplink carrier may be dedicated for the first cell for supporting the multi-carrier scheduling.

For example, the TDRA-m may indicate {K2=2, mapping type A, SLIV indicating {a starting OFDM symbol index of 0, a length of 5}}. The wireless device may determine a slot. For example, the wireless device may determine a slot based on the K2 value and/or the second subcarrier spacing. The wireless device may apply the TDRA-m based on the second subcarrier spacing. The wireless device may determine slot M which are two slots from a slot M−2. The wireless device receives the first DCI indicating the TDRA-m. A first time domain for the first uplink carrier may span from a first OFDM symbol of a slot n to 6-th OFDM symbol of a slot n+1 (e.g., a length for the first uplink carrier may be four times of the length value).

When a resource allocation spans more than one slot, the wireless device may apply a DM-RS pattern for each slot based on the mapping type (e.g., mapping type A for the TDRA-m). For example, the DM-RS pattern may be applied in each slot where a same DM-RS pattern is used for each slot. The wireless device may determine the DM-RS pattern based on resources of first (e.g., earliest, or last/latest) slot of the more than one slot. The base station may transmit configuration parameters indicating one or more DM-RS patterns applied in each slot of the more than one slots. The wireless device may determine a DM-RS pattern of the one or more DM-RS patterns based on resources of each slot (e.g., based on a duration/length in time domain resource in each slot).

For example, the base station may transmit a second DCI, via the downlink carrier at a slot n−3 comprising a second time domain resource allocation field indicating the TDRA-k. The second DCI indicates a first resource of the first uplink carrier and a second resource of the second uplink carrier. The TDRA-k may indicate {K2=1, mapping type B, SLIV indicating {a starting OFDM symbol index of 7, a length of 5}}. The wireless device may determine the slot M based on K2=1. The slot M is a next slot from a slot n−3 based on the second subcarrier spacing. The wireless device may determine a slot based on the second subcarrier spacing wherein the wireless device receives the second DCI. The slot may be a slot M−1. The wireless device may apply the K1 value based on the determined slot to determine a slot to transmit a PUSCH. The wireless device may determine the slot as the slot M based on the second subcarrier spacing. The wireless device may determine a resource of the first uplink carrier from a first OFDM symbol of a slot n+2 to 6-th OFDM symbol of a slot n+3. The wireless device may apply a DM-RS pattern in each slot of the slot n+2 and the slot n+3. In an example, a first RV of a TB. The TB is scheduled by the second DCI, may be mapped over 20 OFDM symbols over the slot n+2 and the slot n+3 of the first uplink carrier. A second RV of the TB may be mapped over 5 OFDM symbols of the slot M of the second uplink carrier.

In an example, a base station may transmit configuration parameters indicating a TDRA table for a multi-carrier scheduling for a first cell. A first uplink carrier is associated with the first cell. One or more TDRA entries/rows of the TDRA table may comprise a set of {a scheduling offset, a SLIV}. Each pair of {a scheduling offset, a SLIV} may correspond to a carrier for a plurality of carriers scheduled by a DCI based on the multi-carrier scheduling. For example, a pair of {a scheduling offset, a SLIV} may correspond to one or more carriers of the plurality of carriers. Numerologies of the one or more carriers may be the same. For example, a mapping type of a TDRA entry/row may apply to the plurality of carriers. For example, a mapping type of a TDRA entry/row may be configured/indicated separately for a carrier of the plurality of carriers. For example, a mapping type of a TDRA entry/row may be configured/indicated for a numerology of numerologies of the plurality of carriers. For example, a repetition number of a TDRA entry/row may apply to the plurality of carriers. For example, a repetition number of a TDRA entry/row may be configured/indicated separately for a carrier of the plurality of carriers. For example, a repetition number of a TDRA entry/row may be configured/indicated separately for a numerology/subcarrier spacing of numerologies/subcarrier spacings of the plurality of carriers. For example, the wireless device may be configured with the multi-carrier scheduling for the first uplink carrier and a second uplink carrier. A first numerology of the first uplink carrier and a second numerology of the second uplink carrier may be same, a single repetition number for the first uplink carrier and the second uplink carrier may be configured for a TDRA entry/row. The wireless device may apply the single repetition number for the first uplink carrier and the second uplink carrier.

For example, a base station may transmit configuration parameters indicating a first uplink carrier and a second uplink carrier for a multi-carrier scheduling, based on a DCI indicating a first resource of the first uplink carrier and a second resource of the second uplink carrier. The configuration parameters may comprise/indicate a repetition of a TB via the first uplink carrier and the second uplink carrier. The wireless device may determine whether a first numerology of the first uplink carrier (e.g., based on a numerology of an active UL BWP of the first uplink carrier) and a second numerology of the second uplink carrier (e.g., based on a numerology of an active UL BWP of the second uplink carrier) may be same. In response to the same numerologies between the first numerology and the second numerology, the wireless device may determine a TDRA entry, of a first TDRA table, comprising a scheduling offset, a mapping type, and a SLIV value. The wireless device may apply the scheduling offset, the mapping type and the SLIV value to determine the first resource of the first uplink carrier and the second resource of the second uplink carrier. In an example, the first numerology may be different from the second numerology. The configuration parameters may comprise/indicate a second TDRA table. A second TDRA entry of the second TDRA table may comprise {a first scheduling offset, a first SLIV}, mapping type, and {a second scheduling offset, a second SLIV}. The TDRA entry may comprise a repetition number applied for both carriers. The TDRA entry may comprise a first repetition number for the first uplink carrier and a second repetition number for the second uplink carrier. The TDRA entry may comprise a first starting symbol and a first length for the first uplink carrier and a second starting symbol and a second length for the second uplink carrier.

The wireless device may determine the first resource based on the first scheduling offset and the first SLIV for the first uplink carrier. The wireless device may determine the second resource based on the second scheduling offset and the second SLIV for the second uplink carrier. For example, embodiments of extending a TDRA entry of a TDRA table to cover resources across a plurality of carriers based on a DCI may increase a resource allocation flexibility.

Figure 27:
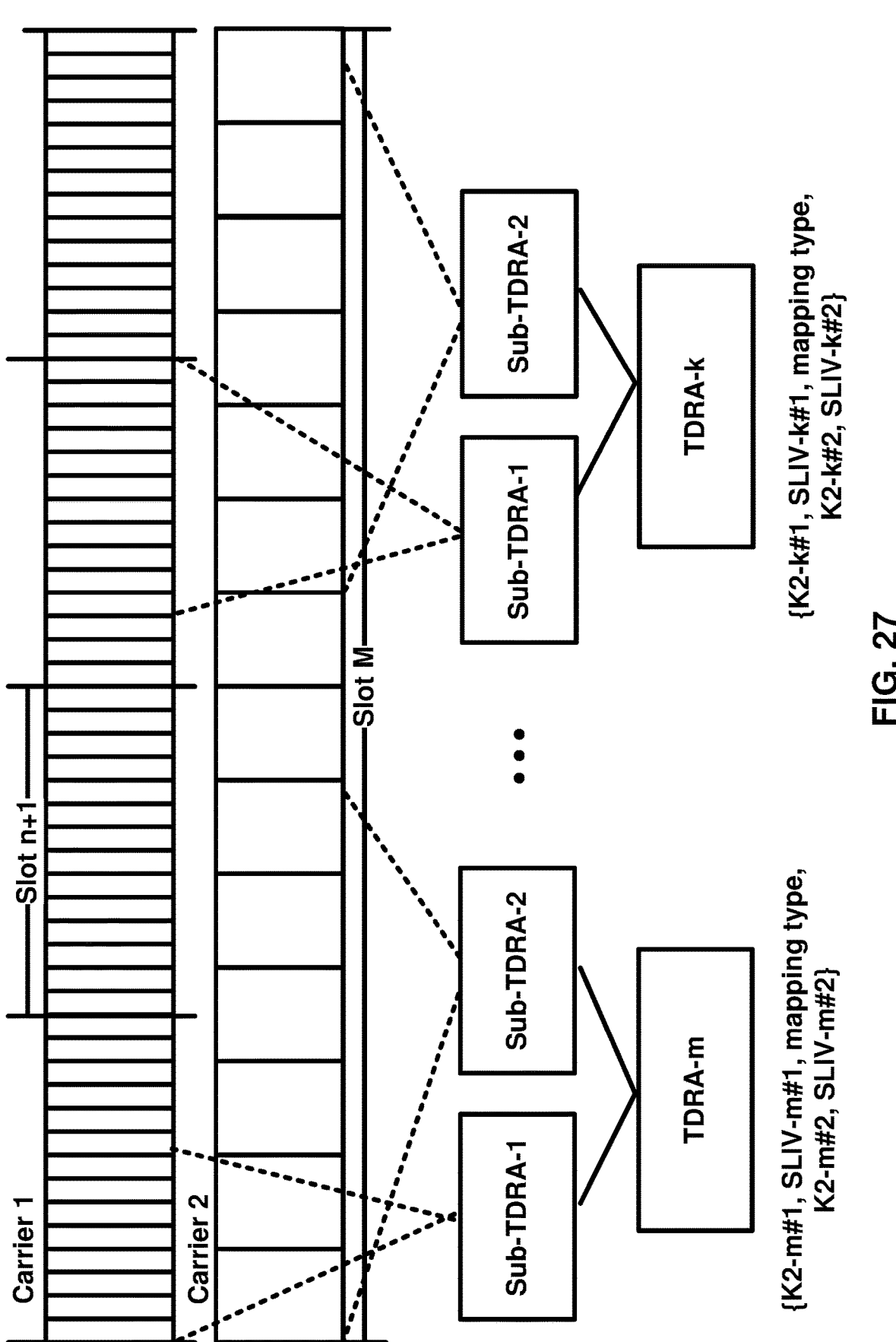
FIG. 27 illustrates an example of an extended TDRA entry as per an aspect of an embodiment of the present disclosure.

FIG. 27 illustrates an example of a TDRA entry comprising two sets as per an aspect of an embodiment of the present disclosure. The TDRA entry of a TDRA table may comprise a first sub-TDRA entry and a second sub-TDRA entry. For example, the first sub-TDRA entry may comprise a first scheduling offset and a first SLIV for the first uplink carrier (Carrier 1). For example, the second sub-TDRA entry may comprise a second scheduling offset and a second SLIV for the second uplink carrier (Carrier 2). In an example, the base station may transmit a first DCI, at a slot n−3 of a downlink carrier, comprising a time domain resource allocation field indicating a m-th row of the TDRA table (TDRA-m). The TDRA-m may comprise a sub-TDRA-1 and a sub-TDRA-2 for the first uplink carrier and the second uplink carrier respectively. The downlink carrier may be associated with a first cell. The first uplink carrier is associated with the first cell. The base station may transmit the first DCI based on self-carrier scheduling. For example, the sub-TDRA-1 may indicate {a first scheduling offset (K2−m #1), a first SLIV value (SLIV-m #1)} and the sub-TDRA-2 may indicate {a second scheduling offset (K2−m #2), a second SLIV value (SLIV-m #2)}.

In the example, the first scheduling offset is 3. The wireless device may determine a slot n for transmission of a first PUSCH based on the first DCI via the first uplink carrier. The first SLIV value may indicate a starting OFDM symbol index of 0 and a length of 8 OFDM symbols. The wireless device may transmit a first RV of a TB scheduled by the first DCI via the first PUSCH via the first uplink carrier with a time domain resource from a first OFDM symbol to an eighth OFDM symbol of the slot n. In the example, the second scheduling offset is 1. The wireless device may determine a slot M for the transmission of a second PUCH based on the first DCI via the second uplink carrier. The second SLIV value may indicate a starting OFDM symbol index of 0 and a length of 6 OFDM symbols. The wireless device may transmit a second RV of the TB scheduled by the first DCI via the second PUSCH via the second uplink carrier with a time domain resource from a first OFDM symbol to a sixth OFDM symbol of the slot n.

In an example, the base station may transmit a second DCI, at a slot n−2 of the downlink carrier, comprising a time domain resource allocation field indicating a k-th entry (TDRA-k) of the TDRA table. The TDRA-k may comprise {a first scheduling offset=4, a first SLIV indicating a stating OFDM symbol index of 3, a length of 11 OFDM symbols}, a PUSCH mapping type B, and {a second scheduling offset=1, a second SLIV indicating a starting OFDM symbol index of 8 and a length of 6 OFDM symbols}. Based on the TDRA-k, the wireless device may transmit a first PUSCH, carrying a first RV of a TB, based on the second DCI via the first carrier at a slot n+2. The wireless device may transmit a second PUCH, carrying a second RV of the TB, based on the second DCI via the second carrier at the slot M. The wireless device may determine/apply a scheduling offset based on a numerology of an uplink carrier. The wireless device may first determine a downlink slot index based on the numerology of the uplink carrier. For example, the wireless device may determine a slot M−1 for the first DCI and the second DCI based on the second numerology of the second uplink carrier.

The base station may transmit configuration parameters indicating a second TDRA-table for supporting a multi-carrier scheduling for downlink scheduling. Embodiments applied for the first TDRA-table may be also applied to the second TDRA-table. For example, an entry of the second TDRA-table may comprise a scheduling offset (K0), a PDSCH mapping type, and a SLIV value. For example, an entry of the second TDRA-table may comprise a first scheduling offset for a first downlink carrier (a first K0), a first SLIV value for the first downlink carrier (a first SLIV), a PDSCH mapping type, a second scheduling offset for a second downlink carrier (a second K0), and a second SLIV value for the second downlink carrier (a second SLIV).

In an example, a base station may transmit configuration parameters indicating a first TDRA table for a first uplink carrier (e.g., the first TDRA table may be configured for an active UL BWP of the first uplink carrier). The base station may transmit configuration parameters indicating a second TDRA table for a second uplink carrier (e.g., the second TDRA table may be configured for an active UL BWP of the second uplink carrier). The base station may transmit a time domain resource allocation field indicating a value X, wherein X may represent a X-th entry of a TDRA-table. A wireless device may, in response to receiving the DCI, determine a first entry of the first TDRA table. The first entry is a X-th row of the first TDRA table. The wireless device may determine a second entry of the second TDRA-table. The second entry is a X-th row of the second TDRA table. In an example, the wireless device may not have the X-th row in the second TDRA table. The wireless device may determine a first PUSCH via the first uplink carrier in such a case.

In an example, the base station may transmit configuration parameters indicating a mapping between each entry of the first TDRA table and each entry of the second TDRA table. For example, for each entry of the first TDRA table, the configuration parameters may comprise/indicate an index of the second TDRA. An entry of the index of the second TDRA table is associated/mapped to the each of the first TDRA table. Embodiments may allow a flexible configuration of the first TDRA table and the second TDRA table for the first uplink carrier and the second uplink carrier respectively.

In an example, a base station may transmit configuration parameters indicating a number of repetition (N for a data transmission or reception. A wireless device may apply the number of repetitions for a first uplink carrier and a second uplink carrier respectively. For example, the wireless device may transmit one or more first PUSCHs carrying one or more RVs of a TB via the first uplink carrier over N slots. The wireless device may transmit one or more second PUSCHs carrying one or more second RVs of the TB via the second uplink carrier over N slots. In an example, the configuration parameters may comprise/indicate a first number of repetition for the first uplink carrier and a second number of repetition for the second uplink carrier. The wireless device may apply the first number of repetition for the first uplink carrier. In an example, the configuration parameters may comprise/indicate a starting OFDM symbol and a length in a TDRA entry for the first uplink carrier. The wireless device may apply the starting OFDM symbol and the length for the first uplink carrier if configured. The configuration parameters may comprise/indicate a second starting OFDM symbol and a second length for the second uplink carrier. The wireless device may apply the second starting OFDM symbol and the second length for the second uplink carrier if configured.

In an example, the wireless device may not support a simultaneous transmission via the first uplink carrier and the second uplink carrier. For example, the wireless device may be configured not to support the simultaneous transmission via the first uplink carrier and the second uplink carrier. The wireless device may support the non-simultaneous transmission for a repeated transmission of a TB over the first uplink carrier and the second uplink carrier. A first numerology of the first uplink carrier (based on an active UL BWP of the first uplink carrier) and a second numerology of the second uplink carrier (based on an active UL BWP of the second uplink carrier) are same. Otherwise, the wireless device may expect to be configured with the simultaneous transmission. A multi-carrier scheduling based repetition is configured.

In an example, when the wireless device may not support a simultaneous transmission, the wireless device may transmit a first PUSCH via a slot n of the first uplink carrier and transmit a second PUSCH via a slot m of the second uplink carrier. The wireless device may transmit a third PUSCH via a slot n+k+1, wherein k is a ratio between the first numerology and the second numerology (k if k>=1, otherwise k=1). The wireless device may transmit a fourth PUSCH via a slot m+k+1. For example, a first numerology of the first uplink carrier is 15 kHz and a second numerology of the second uplink carrier is 50 kHz, a k is 4 for the second uplink carrier (60/15=4) and k is 0 for the first uplink carrier (15/60=4/1→0). The third PUSCH may be transmitted in a slot n+2. The fourth PUSCH may be scheduled in a slot m+5.

In an example, a entry of a DM-RS pattern may comprise two DM-RS patterns. A first DM-RS pattern of the two DM-RS patterns may correspond to a first carrier and a second DM-RS pattern of the two DM-RS patterns may correspond to a second carrier. Similarly, an entry of a TCI state may comprise two TCI states. A first TCI state of the two TCI states may correspond to the first carrier and a second TCI state of the two TCI states may correspond to the second carrier.

The DM-RS pattern may be indicated by a DMRS field in a DCI format 0_1 or 0_2 (or a fallback DCI format 0_0, or a DCI format 1_1 or 1_2 or 1_0 for downlink data). The two TCI states may be indicated by the SRI field (SRI) or TCI state (TCI) field in a DCI format (refer to FIG. 17 and FIG. 18).

FIG. 28A-28C illustrates an example of a RV mapping. For example, FIG. 28A illustrate an example of a RV mapping sequence over one or more repetitions of a TB. For example, a DCI may comprise a RV index ($rv_{id}$) indicates 0, then 0, 2, 3 and 1 are applied for the repetitions in sequence. FIG. 28B illustrates an example of a RV sequence of encoded bits. The circle may represent encoded bits where systematic bits may present in a beginning. The wireless device may determine a first RV (RV0) to include the systematic bits, and may determine RV 1, RV2 and RV3 sequentially. FIG. 28C may illustrates a RV mapping of a multi-carrier scheduling via a first uplink carrier (Carrier 1) and a second uplink carrier (Carrier 2). For example, a DCI comprising a RV index of 00 (indicates a RV=0). The base station may transmit configuration parameters indicating a RV offset for the second uplink carrier as 3. Based on RV=0, the wireless device may determine a RV sequence of 0, 2, 3, 1 as shown in FIG. 28A for the first uplink carrier. The wireless device may determine a second RV sequence for the second uplink carrier by adding the RV offset to each RV value (e.g., (0+RV offset) mod 4, (2+RV offset) mod 4, (3+RV offset) mod 4, (1+RV offset) mod 4). In case the DCI may indicate a RV index of 3, the wireless device may determine the second sequence as ((3+RV offset) mod 4, (1+RV offset) mod 4, (0+RV offset) mod 4, (2+RV offset) mod 4).

FIG. 29 illustrates a flow diagram as per an aspect of an embodiment of the present disclosure.

In an example, a wireless device may receive configuration parameters. The wireless device may receive configuration parameters via one or more RRC messages and/or MAC CE and/or DCI signaling. The configuration parameters may indicate a first bandwidth of a first bandwidth part of a first uplink carrier. The configuration parameters may indicate a second bandwidth of a second bandwidth part of a second uplink carrier. The wireless device may determine a size of a frequency domain resource allocation field based on the first bandwidth and the second bandwidth. For example, the size of the frequency domain resource allocation field may be determined based on a sum of the first bandwidth and the second bandwidth. For example, the size of the frequency domain resource allocation field may be determined based on a larger value between the first bandwidth and the second bandwidth. For example, the size of the frequency domain resource allocation field may be determined based on a number of resource block groups (RBGs) determined based on a sum of the first bandwidth and the second bandwidth.

The wireless device may receive a DCI. The DCI may comprise the frequency domain resource field indicating frequency domain resources of the first bandwidth part of the first uplink carrier and the second bandwidth part of the second uplink carrier. The wireless device may transmit one or more uplink signals via the frequency domain resources.

For example, the one or more uplink signals may be one or more repetitions of a transport block. For example, the one or more uplink signals may be one or more transport blocks. For example, the one or more uplink signals may be uplink control information. For example, the one or more uplink signals may be reference signals.

In an example, a wireless device may receive a downlink control information (DCI). The DCI may indicate a first resource assignment of a first resource via a first uplink carrier. The DCI may further indicate a second resource assignment of a second resource via a second uplink carrier. The DCI may further indicate a hybrid automatic repeat request (HARM) process identifier for transmission of a transport block via the first uplink carrier and the second uplink carrier. In response to the receiving the DCI, the wireless device may transmit the transport block via the first resource of a first PUSCH associated with the first uplink carrier. In response to the receiving the DCI, the wireless device may transmit the transport block via the second resource of a second PUSCH associated with the second uplink carrier.

For example, the DCI further may indicate a first redundancy version (RV) for the first PUSCH and a second RV for the second PUSCH. Based on the first RV and the second RV, the wireless device may transmit the first RV of the transport block via the first resource based on the DCI and may transmit the second RV of the transport block via the second resource based on the DCI.

For example, the DCI may comprise a first DCI field of a first frequency domain resource assignment field indicating the first resource assignment and a second DCI field of a second frequency domain resource assignment field indicating the second resource assignment. The wireless device may determine the first resource of the first PUSCH based on the first frequency domain resource assignment field. The wireless device may determine the second resource of the second PUSCH based on the second frequency domain resource assignment field.

For example, the DCI may comprise a DCI field indicating a frequency resource allocation entry comprising the first resource assignment of the first resource and the second resource assignment of the second resource. The wireless device may determine a bitfield size of the DCI field based on a first active uplink BWP of the first uplink carrier and a second active uplink BWP of the second uplink carrier. For example, the field size may be a larger size between a first size of a number of RBGs of the first active uplink BWP and a second size of a number of RBGs of the second active uplink BWP, when a resource allocation type 0 based on a RBG is configured. For example, the field size may be determined based a larger number between a first number of RBs of the first active uplink BWP and a second number of RBs of the second active uplink BWP, when a resource allocation type 1 based on resource indicator vector is configured.

For example, the wireless device may receive one or more second RRC messages comprising a first size of a resource block group (RBG) of the first carrier. The wireless device may determine a second size of an RBG of the second carrier based on the first size of the RBG of the first carrier. For example, the second size is same as the first size.

For example, the wireless device may receive the DCI comprising a frequency resource allocation, based on a resource allocation type 0, wherein each bit of the frequency resource allocation indicates whether a corresponding RBG is scheduled. The wireless device may determine a first RBG of the first carrier and a second RBG of the second carrier being scheduled, wherein a bit of the frequency resource allocation indicates the first RBG and the second RBG are scheduled. For example, a first RBG index of the first RBG is same to a second RBG index of the second RBG.

For example, a first number of RBs of the first resource and a second number of RBs of the second resource are equal. For example, the wireless device may receive message(s) comprising one or more configuration parameters indicating an RB offset for the second uplink carrier. The wireless device may determine the second resource assignment based on the RB offset and the first resource assignment. For example, a second RB index of a starting PRB of the second resource may be equal to a sum of a starting RB index of a first PRB of the first resource and the RB offset. For example, a third RB index of an ending PRB of the second resource may be equal to a sum of the second RB index and a number of RBs of the first resource.

For example, the wireless device may receive one or more radio resource control (RRC) messages. The one or more RRC messages may comprise configuration parameters of a frequency domain resource assignment and a time domain resource assignment for the second resource of the second uplink carrier. The wireless device may determine the second resource based on the configuration parameters and the DCI.

For example, the DCI may comprise a time domain resource allocation (TDRA) field indicating a first time domain resource of the first carrier and a second time domain resource of the second carrier. For example, the first time domain resource is fully overlapped with the second time domain resource. For example, a TDRA entry, of one or more time domain resource allocation entries, may comprise the first time domain resource of the first carrier and the second time domain resource of the second carrier. The may comprise comprises the time domain resource allocation indicating the TDRA entry. The wireless device may determine the first time domain resource of the first carrier based on a first numerology of the first carrier and determining the second time domain resource of the second carrier based on a second numerology of the second carrier.

For example, the DCI comprises a BWP index, wherein the wireless device may switch to a first BWP of the first uplink carrier from an active UL BWP of the first uplink carrier. An index of the first BWP may be indicated by the BWP index. For example, the DCI may not comprise a BWP index.

For example, the first carrier is an uplink carrier associated with a cell and the second carrier is a supplemental uplink carrier associated with the cell.

For example, the wireless device may transmit a capability by the wireless device whether the wireless device supports transmission of the first PUSCH via the first uplink carrier and the second PUSCH via the second uplink carrier simultaneously. The wireless device may transmit the capability for a band or a band combination. For example, the wireless device may receive one or more second RRC messages indicating enabling a simultaneous transmission via the first uplink carrier and the second uplink carrier. For example, the wireless device may determine the simultaneous transmission via the first uplink carrier and the second uplink carrier of the transport block in response to the first uplink carrier operating in a first frequency range and the second uplink carrier operating in a second frequency range. For example, the first frequency range is different from the second frequency range. The first frequency range may belong to a frequency range 1 or a frequency range 2 or a frequency range 3. For example, the second frequency range may belong to the frequency range 1 or the frequency range 2 or the frequency range 3.

For example, the DCI may comprise a DCI field indicating a data demodulation reference signal (DMRS) pattern.

The DMRS pattern may comprise, for the first resource of the first uplink carrier, one or more first OFDM symbols and a first set of DMRS configuration parameters. The DMRS pattern may comprise, for the second resource of the second uplink carrier, one or more second OFDM symbols and a second set of DMRS configuration parameters.

For example, the wireless device may receive a second DCI indicating a third resource assignment of a third resource via a first downlink carrier, a fourth resource assignment of a fourth resource via a second downlink carrier, and a second HARQ process identifier for reception of a second transport block via the first downlink carrier and the second downlink carrier. The wireless device may receive the transport block via the third resource with the first downlink carrier and the transport block via the fourth resource with the second downlink carrier. The wireless device may combine a first signal of the transport block via the third resource and a second signal of the transport block via the fourth resource.

For example, the second PUSCH may be same as the first PUSCH. The wireless device may map information bits of the transport block via the first resource and the second resource based on a rule. For example, the wireless device may determine one or more resource units via the first resource and the second resource, wherein each resource unit comprises one or more OFDM symbols, overlapping with a second OFDM symbol of the second carrier, over one or more resource blocks in either the first carrier or the second carrier. The wireless device may map the information bits of the transport block in each resource unit of the one or more resource units sequentially, wherein the wireless device determines a sequence of one or more resource units based on a frequency location and a time of each resource unit. The wireless device may determine the sequence based on the frequency location first and the time second.

For example, a carrier comprises a plurality of resource blocks, wherein a resource block comprises a set of subcarriers.

The first carrier and the second carrier may be associated with a cell. The first carrier may be same to the second carrier. For example, the first carrier is associated with a first control resource set (coreset) pool and the second carrier is associated with a second coreset pool. The first carrier may be associated with a first uplink panel and the second carrier may be associated with a second uplink panel.

In an example, a wireless device may receive one or more downlink control information (DCIs). The one or more DCIs may indicate a first resource assignment of a first resource via an uplink carrier associated with a cell. The one or more DCIs may further indicate a second resource assignment of a second resource via a supplemental uplink carrier associated with the cell. The one or more DCIs may further indicate an NDI indicating a new transport block via the uplink carrier and the supplemental uplink carrier. The one or more DCIs may further indicate a hybrid automatic repeat request (HARQ) process identifier for transmission of the transport block. In response to the receiving the one or more DCIs, the wireless device may transmit the transport block via the first resource of a first PUSCH associated with the uplink carrier and may transmit the transport block via the second resource of a second PUSCH associated with the supplemental uplink carrier.

For example, the one or more DCIs may comprise a first DCI and a second DCI. For example, the first DCI may comprise the first resource assignment, the NDI, a first indication of the first resource of the uplink carrier, and the HARQ process identifier. For example, the second DCI may comprise the second resource assignment, the NDI, a second indication of the second resource of the supplemental uplink carrier, and the HARQ process identifier. For example, the wireless device may receive the first DCI and the second DCI at a slot.

For example, the wireless device may receive one or more second DCIs. The one or more second DCIs may indicate a third resource assignment of a third resource via an downlink carrier associated with a second cell; a fourth resource assignment of a fourth resource via a supplemental downlink carrier associated with the second cell; a second NDI indicating a new second transport block via the downlink carrier and the supplemental downlink carrier; and a second HARQ process identifier for transmission of the second transport block. In response to the receiving the one or more second DCIs, the wireless device may receive the transport block via the third resource of a first PUDSCH associated with the downlink carrier and the wireless device may receive the transport block via the fourth resource of a second PDSCH associated with the supplemental downlink carrier. For example, the one or more second DCIs may comprise a first DCI and a second DCI. For example, the first DCI comprises the first resource assignment, the second NDI, a first indication of the third resource of the downlink carrier, and the second HARQ process identifier. For example, the second DCI comprises the fourth resource assignment, the second NDI, a second indication of the fourth resource of the supplemental downlink carrier, and the second HARQ process identifier. The wireless device may receive the first DCI and the second DCI at a second slot. The wireless device may transmit a capability indicating whether the wireless device may support transmission of the first PUSCH via the uplink carrier and transmission of the second PUSCH via the supplemental uplink carrier. The first PUSCH and the second PUSCH may carry the transport block.

For example, the first DCI of the one or more first DCIs or the one or more second DCIs is cyclic redundancy check (CRC) scrambled based on a first RNTI and the second DCI of the one or more first DCIs or the one or more second DCIs is CRC scrambled based on second RNTI, wherein the first RNTI is different from the second RNTI In an example, a wireless device may receive a downlink control information (DCI). The DCI may indicate a first resource assignment of a first resource via a first uplink carrier. The DCI may further indicate a second resource assignment of a second resource via a second uplink carrier. The DCI may further indicate a hybrid automatic repeat request (HARQ) process identifier for transmission of a transport block via the first uplink carrier and the second uplink carrier. In response to the receiving the DCI, the wireless device may transmit a first redundancy version (RV) of the transport block via the first resource of a first PUSCH associated with the first uplink carrier. In response to the receiving the DCI, the wireless device may transmit a second RV of the transport block via the second resource of a second PUSCH associated with the second uplink carrier.

In an example, a wireless device may receive a downlink control information (DCI). The DCI may comprise a resource assignment field. The resource assignment field may indicate a first resource via a first uplink carrier and a second resource via a second uplink carrier. The DCI may further indicate a hybrid automatic repeat request (HARQ) process identifier for transmission of a transport block via the first uplink carrier and the second uplink carrier. In response to the receiving the DCI, the wireless device may transmit a first redundancy version (RV) of the transport block via the first resource of a first PUSCH associated with the first uplink carrier. In response to the receiving the DCI, the wireless device may transmit a second RV of the transport block via the second resource of a second PUSCH associated with the second uplink carrier.

What is claimed is:

1. A method comprising:
determining, by a wireless device, a size of a resource allocation field based on:
    a first bandwidth part of a first uplink carrier; and
    a second bandwidth part of a second uplink carrier;
receiving a downlink control information (DCI) comprising the resource allocation field comprising one or more bits, wherein the one or more bits indicate:
    one or more resources of the first uplink carrier; and
    one or more resources of the second uplink carrier; and
transmitting one or more uplink signals via the resources of the first uplink carrier and of the second uplink carrier, wherein the determining the size of the resource allocation field is based on a sum of:
    a first number of one or more first time domain resource allocations of a first time domain resource allocation table; and
    a second number of one or more second time domain resource allocations of a second time domain resource allocation table.

2. The method of claim 1, further comprising receiving one or more configuration parameters indicating at least one of:
    a first bandwidth of the first bandwidth part of the first uplink carrier;
    a second bandwidth of the second bandwidth part of the second uplink carrier; or
    a time domain resource allocation table comprising one or more time domain resource allocations, wherein the determining the size of the resource allocation field is based on a number of the one or more time domain resource allocations.

3. The method of claim 1, wherein:
    the first bandwidth part has a largest number of resource blocks among bandwidth parts of the first uplink carrier; and
    the second bandwidth part has a largest number of resource among bandwidth parts of the second uplink carrier.

4. The method of claim 1, wherein:
    the resources comprise frequency domain resources;
    the frequency domain resources are of the first bandwidth part of the first uplink carrier and the second bandwidth part of the second uplink carrier; and
    the first bandwidth part is a first active bandwidth part of the first uplink carrier and the second bandwidth part is a second active bandwidth part of the second uplink carrier.

5. The method of claim 1, wherein the DCI further indicates:
    a first redundancy version (RV) for a first physical uplink shared channel (PUSCH) of a plurality of PUSCHs; and
    a second RV for a second PUSCH of the plurality of PUSCHs, wherein the transmitting the one or more uplink signals is based on transmitting the one or more uplink signals via the plurality of PUSCHs.

6. The method of claim 1, wherein:
    the first uplink carrier is associated with a first control resource set (coreset) pool of a cell; and the second uplink carrier is associated with a second coreset pool of the cell.

7. The method of claim 1, wherein:
    the DCI comprises a DCI field indicating a data demodulation reference signal (DMRS) pattern; and
    the DMRS pattern indicates:
        a first DMRS configuration for the first bandwidth part; and
        a second DMRS configuration for the second bandwidth part.

8. The method of claim 1, wherein:
    the DCI comprises a DCI field indicating a transmission configuration indicator (TCI) state; and
    the TCI state comprises:
        a first TCI state of the first bandwidth part; and
        a second TCI state of the second bandwidth part.

9. A wireless device comprising:
one or more processors; and
memory storing instructions that, when executed by the one or more processors, cause the wireless device to:
    determine a size of a resource allocation field based on:
        a first bandwidth part of a first uplink carrier; and
        a second bandwidth part of a second uplink carrier;
    receive a downlink control information (DCI) comprising the resource allocation field comprising one or more bits, wherein the one or more bits indicate:
        one or more resources of the first uplink carrier; and
        one or more resources of the second uplink carrier; and
    transmit one or more uplink signals via the resources of the first uplink carrier and of the second uplink carrier, wherein the determining the size of the resource allocation field is based on a sum of:
        a first number of one or more first time domain resource allocations of a first time domain resource allocation table; and
        a second number of one or more second time domain resource allocations of a second time domain resource allocation table.

10. The wireless device of claim 9, wherein the instructions, when executed by the one or more processors, further cause the wireless device to receive one or more configuration parameters indicating at least one of:
    a first bandwidth of the first bandwidth part of the first uplink carrier;
    a second bandwidth of the second bandwidth part of the second uplink carrier; or
    a time domain resource allocation table comprising one or more time domain resource allocations, wherein the determining the size of the resource allocation field is based on a number of the one or more time domain resource allocations.

11. The wireless device of claim 9, wherein:
    the first bandwidth part has a largest number of resource blocks among bandwidth parts of the first uplink carrier; and
    the second bandwidth part has a largest number of resource among bandwidth parts of the second uplink carrier.

12. The wireless device of claim 9, wherein:
    the resources comprise frequency domain resources;
    the frequency domain resources are of the first bandwidth part of the first uplink carrier and the second bandwidth part of the second uplink carrier; and

the first bandwidth part is a first active bandwidth part of the first uplink carrier and the second bandwidth part is a second active bandwidth part of the second uplink carrier.

13. The wireless device of claim 9, wherein the DCI further indicates:

a first redundancy version (RV) for a first physical uplink shared channel (PUSCH) of a plurality of PUSCHs; and a second RV for a second PUSCH of the plurality of PUSCHs, wherein the transmitting the one or more uplink signals is based on transmitting the one or more uplink signals via the plurality of PUSCHs.

14. The wireless device of claim 9, wherein:

the first uplink carrier is associated with a first control resource set (coreset) pool of a cell; and the second uplink carrier is associated with a second coreset pool of the cell.

15. The wireless device of claim 9, wherein:

the DCI comprises a DCI field indicating a data demodulation reference signal (DMRS) pattern; and the DMRS pattern indicates:

a first DMRS configuration for the first bandwidth part; and

a second DMRS configuration for the second bandwidth part.

16. A non-transitory computer-readable medium comprising instructions that, when executed by one or more processors of a wireless device, cause the wireless device to:

determining, by a wireless device, a size of a resource allocation field based on:

a first bandwidth part of a first uplink carrier; and a second bandwidth part of a second uplink carrier;

receiving a downlink control information (DCI) comprising the resource allocation field comprising one or more bits, wherein the one or more bits indicate:

one or more resources of the first uplink carrier; and one or more resources of the second uplink carrier; and transmitting one or more uplink signals via the resources of the first uplink carrier and of the second uplink carrier, wherein the determining the size of the resource allocation field is based on a sum of:

a first number of one or more first time domain resource allocations of a first time domain resource allocation table; and a second number of one or more second time domain resource allocations of a second time domain resource allocation table.

* * * * *